(12) United States Patent
DeMaster et al.

(10) Patent No.: US 12,193,440 B2
(45) Date of Patent: Jan. 14, 2025

(54) SHELF-LIFE EXTENDER COMPOSITIONS FOR LIVE PLANT ITEMS AND METHODS, KITS, AND COATED LIVE PLANT ITEMS RELATED THEREOF

(71) Applicant: COMESTAAG LLC, Osceola, WI (US)

(72) Inventors: Eugene G. DeMaster, Spooner, WI (US); T. Howard Killilea, North Oaks, MN (US); Andrew A. DeMaster, Pacific Grove, CA (US)

(73) Assignee: COMESTAAG LLC, Osceola, WI (US)

( * ) Notice: Subject to any disclaimer, the term of this patent is extended or adjusted under 35 U.S.C. 154(b) by 0 days.

(21) Appl. No.: 18/076,028

(22) Filed: Dec. 6, 2022

(65) Prior Publication Data
US 2023/0132183 A1 Apr. 27, 2023

Related U.S. Application Data

(63) Continuation-in-part of application No. PCT/US2021/036239, filed on Jun. 7, 2021.

(60) Provisional application No. 63/035,818, filed on Jun. 7, 2020, provisional application No. 63/045,155, filed on Jun. 28, 2020, provisional application No. 63/065,484, filed on Aug. 13, 2020, provisional application No. 63/138,774, filed on Jan. 18, 2021.

(51) Int. Cl.
*A01N 3/00* (2006.01)
*B65B 25/02* (2006.01)
*B65D 85/52* (2006.01)

(52) U.S. Cl.
CPC ............... *A01N 3/00* (2013.01); *B65B 25/02* (2013.01); *B65D 85/52* (2013.01)

(58) Field of Classification Search
None
See application file for complete search history.

(56) References Cited

U.S. PATENT DOCUMENTS

| | | |
|---|---|---|
| 5,143,536 A | 9/1992 | Runkis |
| 7,607,259 B2 | 10/2009 | Savich |
| 8,752,328 B2 | 6/2014 | Kaiser |
| 2008/0216404 A1 | 9/2008 | Jarvis |
| 2015/0150162 A1 | 5/2015 | Carver |
| 2017/0156356 A1 | 6/2017 | Omenetto |
| 2017/0164607 A1 | 6/2017 | Polge |
| 2018/0007842 A1 | 1/2018 | Van Der |
| 2018/0064124 A1 | 3/2018 | Demir |
| 2019/0021312 A1 | 1/2019 | Dhonukshe |
| 2019/0159446 A1 | 5/2019 | Hernandez |
| 2019/0281844 A1 | 9/2019 | Vergara |
| 2020/0281219 A1 | 9/2020 | Demir |
| 2021/0298298 A1 | 9/2021 | Person |

FOREIGN PATENT DOCUMENTS

| | | | |
|---|---|---|---|
| CN | 104686642 A | * | 6/2015 |
| CN | 105076353 A | * | 11/2015 |
| CN | 108076929 A | * | 5/2018 |
| CN | 108617757 A | * | 10/2018 |
| WO | WO 00/52996 | | 9/2000 |
| WO | WO 2011/162608 | | 12/2011 |
| WO | WO 2012/101132 | | 8/2012 |
| WO | WO 2016/153413 | | 9/2016 |
| WO | WO 2017/132281 | | 8/2017 |
| WO | WO 2019/143248 | | 7/2019 |
| WO | WO 2020/122798 | | 6/2020 |

OTHER PUBLICATIONS

PCT International Search Report and Written Opinion for Application No. PCT/US2021/036239 dated Sep. 24, 2021 (9 pages).
Lopez et al., "Geranium Cutting Propagation-Reducing Lower-Leaf Yellowing," e-Grow Alert-2014 (4 pages).
Faust et al., "Germanium Leaf Yellowing: Causes and Solutions," Special Research Report #451: Post Production, 2011 (2 pages).
Currey et al., "Exogenous Applications of Benzyladenine and Gibberellic Acid Inhibit Lower-Leaf Senescence of Geraniums During Propagation,", HortScience 48(11): 1352-1357, 2013 (6 pages).
AutoStix™, Syngenta Flowers Genetics Now Available in AutoSix, 2018 (1 page).
Cutting Time™ Production: Tango™ Geranium, Callused Cutting (CC) Direct Stick-Quart Finish, GoldFisch Vegetative, 2014 (2 pages).
Garden Mum Propagation Powerpoint presentation, 2012 (18 pages).
General Rooting Requirements, Syngenta Vegetative Cuttings (1 page).
Druege et al., "Nitrogen- and Storage-Affected Carbohydrate Partitioning in High-Light-Adapted Pelargonium Cuttings in Relation to Survival and Adventitious Root Formation under Low Light," Annals of Botany, 94:831-842, 2004 (12 pages).
Jahnke et al., "Prolonged Shipping and Fluctuating Temperatures Promote Gray Mold Development and Leaf Yellowing on Geranium Liners," Horttechnology, Dec. 2018 28(6) (8 pages).

(Continued)

*Primary Examiner* — Alton N Pryor
(74) *Attorney, Agent, or Firm* — MUETING RAASCH GROUP

(57) ABSTRACT

Shelf-life extender compositions, kits, and methods are provided for use with live plant items such as, for example, rootless plant cuttings and plant liners. The shelf-life extender composition is preferably applied on at least a portion of the surfaces of a live plant item prior to shipping the treated live plant item.

28 Claims, 1 Drawing Sheet

(56) References Cited

OTHER PUBLICATIONS

Kadner et al., "Role of Ethylene Action in Ethylene Production and Poststorage Leaf Senescence and Survival of Pelargonium Cuttings," Plant Growth Regulation, 43: 187-196 (2004), 10 pages).
OptiCept Process in Use at Kenya Cuttings, 2019 (1 page).
How Global Suppliers of Unrooted Cuttings are Working to Improve the Pipeline, 2016 (13 pages).
U.S. Appl. No. 15/577,125, filed May 25, 2016, entitled: Partially Encapsulated Plant Cuttings, Inventor: Pankaj Bacharam Dhonukshe.
Response to European Written Opinion for Application No. 16727652.6 dated Jul. 9, 2018 (21 pages).

\* cited by examiner

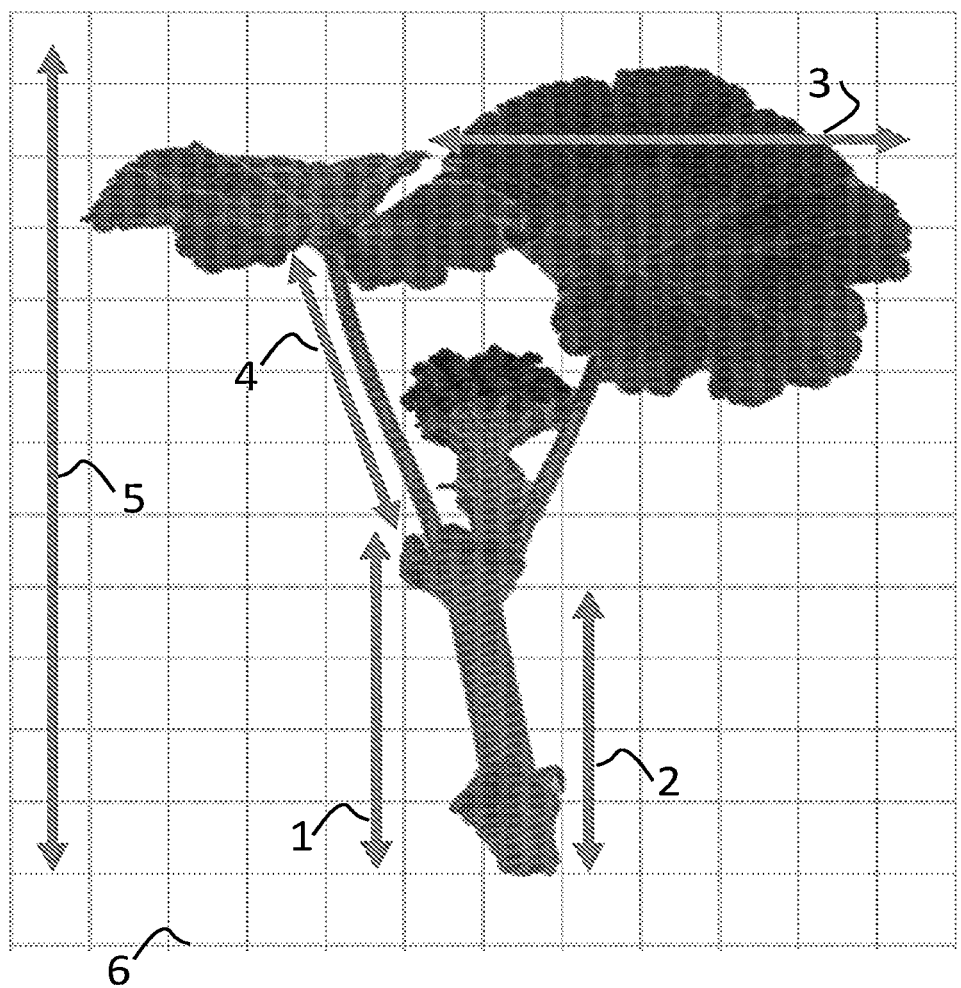

SHELF-LIFE EXTENDER COMPOSITIONS FOR LIVE PLANT ITEMS AND METHODS, KITS, AND COATED LIVE PLANT ITEMS RELATED THEREOF

CROSS-REFERENCE TO RELATED APPLICATIONS

This application claims the benefit of U.S. Provisional Application Ser. No. 63/035,818, titled "Barrier Coating Compositions and Wash Compositions for Perishables and Method and Systems Relating Thereto," filed by DeMaster et al. on Jun. 7, 2020, U.S. Provisional Application Ser. No. 63/045,155, titled "Barrier Coating Compositions, Wash Compositions, and Other Compositions for Perishables and Methods, Systems, Kits, and Coated Items Relating Thereto," filed by DeMaster et al. on Jun. 28, 2020; and U.S. Provisional Application Ser. No. 63/065,484, titled "Barrier Coating Compositions. Wash Compositions, and Other Compositions for Perishables and Methods, Systems, Kits, and Coated Items Relating Thereto," filed by DeMaster et al. on Aug. 13, 2020; U.S. Provisional Application Ser. No. 63,138,774 titled "Shelf-life Extender Compositions for Live Plant Items and Methods. Kits, and Coated Live Plant Items Relating Thereto," filed on Jan. 18, 2021 by DeMaster et al.; and is a continuation-in-part of International Application No. PCT/US2021/036239 filed by Killilea et al. on Jun. 7, 2021 and entitled "Shelf-Life Extender Compositions for Live Plant Items and Methods, Kits, and Coated Live Plant Items Related Thereto" the entire contents of each of which are herein incorporated by reference.

BACKGROUND OF THE INVENTION

Asexual plant propagation, also commonly referred to as vegetative plant propagation, is a common technique used in the horticulture industry to propagate new plants for commercial sale. Vegetative propagation techniques entail producing new plants from progenitor plants (commonly referred to as "mother" or "source" plants) using vegetative parts of the progenitor plants. Depending upon the particular plant type, such vegetative parts may be, for example, leaves, stems, or roots. Because the new plants are propagated via asexual means, the new plants contain the same genetic material as the source plants and are essentially clones of the source plants, unlike, for example, plants propagated via seeds taken from the source plants.

A wide variety of plants in the horticulture industry are commonly propagated using vegetative techniques, including, for example, ornamental plants such as poinsettias, geraniums, and mums; tea plants; coffee plants; sugar cane; herbs; and *Cannabis*. Vegetative propagation can provide multiple advantages over sexual propagation, with the primary advantage being enhanced consistency and quality due to the genetics being the same as that of the source plants. For example, in the case of tea plants, the flavor profiles of the tea leaves remain consistent between plant generations due to identical genetics. In addition, the use of vegetative propagation can reduce the time and cost required to propagate a plant of sufficient size for commercial sale by bypassing the seeding and seedling phases and reaching a mature phase sooner.

A downside to vegetative propagation, however, is the frequent need for shipping sensitive plant cuttings long distances. In the ornamental horticulture supply chain, the source plants for northern retail markets (e.g., the United States and Europe) are often maintained in distant warm weather locations such as Africa or Central and South America. Because the shelf-life of the plant cuttings is transient, the plant cuttings are typically harvested from the source plants, refrigerated prior to shipping, shipped via airfreight with ice or gel packs, refrigerated after receipt by the commercial greenhouse, and stuck in growing media all within two days or less. Even then, the plant cuttings are often stressed due to, for example, exposure to temperature extremes and/or unexpected time delays. Such stress can result in undesirable quality problems if not addressed, for example, by application of expensive treatments after sticking (i.e., positioning plant cuttings in growth media for rooting) or removal of dead or yellowed leaves, thereby incurring additional labor expenses. In addition, it can also be costly and challenging to coordinate a sufficient number of workers to both harvest and stick the plant cuttings in such a narrow time window.

Moreover, in the supply chain, once the plant cuttings have been rooted to form so called "plant liners", it is common for the plant liners to be shipped long distances to another greenhouse for growth to final retail size. Such plant liners are also frequently air-shipped or trucked long distances and can be subjected to similar stressors as were the plant cuttings, which can negatively impact quality and increase costs.

From the foregoing, it will be appreciated that what is needed in the art is improved means for handling live sensitive plant items such as plant cuttings and plant liners.

SUMMARY

The present disclosure provides treatment compositions for harvested and soon-to-be harvested plant items, particularly plant cuttings for vegetative propagation of a new plant and rooted plant cuttings (i.e., plant liners), and methods, equipment, and kits relating thereto.

In one embodiment, the present disclosure provides a shelf-life extender composition, and particularly a plant cutting and/or plant liner shelf-life extender composition (or alternatively a cut flower shelf-life extender composition), comprising at least one of (i) an organic binder component, which preferably comprises one or more of an organic water-barrier material or an organic water-donating material, or (ii) an additive preferably selected from one or more of an antimicrobial agent, a plant growth regulator, a plant energy source, an ethylene inhibitor, a nitrogen-containing compound, an inorganic plant nutrient (e.g., an inorganic essential nutrient), a crosslinking agent, or a combination thereof. Preferably, the composition includes both one or more of (i) and one of more of (ii).

In another embodiment, the present disclosure provides a treated live plant item preferably comprising a treated plant cutting or a treated plant liner (or alternatively a treated cut flower) that preferably includes one or more leaves, wherein at least a portion of the surface of the plant item has deposited thereon an exogenous shelf-life extender composition comprising at least one of: (i) an organic binder component preferably comprising one or more of an organic water-barrier material or an organic water-donating material, or (ii) an additive preferably selected from one or more of an antimicrobial agent, a plant growth regulator, a plant energy source, an ethylene inhibitor, a nitrogen-containing compound, an inorganic plant nutrient (e.g., an inorganic essential nutrient), a crosslinking agent, or a combination thereof.

In another embodiment, the present disclosure provides a plant cutting or plant liner shelf-life extender kit (or alternatively a cut flower shelf-extender kit) that includes a liquid shelf-life extender composition or a liquid concentrate or a dry concentrate (e.g., a powder or tablet) for combining with solvent (e.g., water and/or organic solvent such as, e.g., ethanol) to form a liquid shelf-life extender composition. The kit optionally includes instructions for preparing the liquid shelf-life extender composition from a dry or liquid concentrate. The kit preferably includes instructions for applying the liquid shelf-life extender composition on a live plant item comprising a plant cutting or a plant liner (or alternatively a cut flower), preferably prior to shipping of the plant cutting or plant liner. The kit optionally further includes a container (e.g., a bottle, bag, pouch, or other container).

In another embodiment, the present disclosure provides a method comprising applying a shelf-life extender composition (e.g., any of those disclosed herein) on at least a portion of a live plant item, preferably not under vacuum, more preferably under atmospheric pressure conditions, such that the composition is surface deposited thereon, wherein the live plant item comprises (a) an unrooted plant cutting prior to or after harvest of the plant cutting from a progenitor plant or (b) a plant liner (i.e., a rooted plant cutting). The method preferably further includes one or both of packaging the live plant item for shipping and causing the packaged live plant item to be shipped (e.g., via air transport, typically non-refrigerated air transport; or truck, which may or may not be a refrigerated truck) to a grower to grow the plant cutting or plant liner.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

Terminology

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful, and is not intended to exclude other embodiments from the scope of the disclosure.

In this application, terms such as "a." "an," and "the" are not intended to refer to only a singular entity, but include the general class of which a specific example may be used for illustration. The terms "a." "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints and all subranges (e.g., 1 to 5 includes 1, 1.5, 2, 2.75, 3, 3.80, 4, 5, etc. as well as 2 to 5, 1 to 4, 2 to 4, 1.5 to 3, etc.).

As used herein, the terms "room temperature" or "ambient temperature" refers to a temperature of 20° C. to 25° C. If humidity can affect a given parameter measured at room temperature or ambient temperature and a relative humidity is needed, then a relative humidity of 50% should be used, unless indicated otherwise herein.

The phrases "free of". "does not include", "does not include any", "does not contain" and the like used herein are not intended to preclude the presence of trace amounts (e.g., parts-per-billion (ppb) or parts-per-trillion (ppt) levels) of the pertinent structure or compound that may be unintentionally present, for example, as environmental contaminants.

As used herein, the terms "harden" and "hardened" are used in their broadest contexts as understood by persons of skill in the art. The terms are not intended to require any particular level of rigidity, firmness, scratch resistance, crosslinking, or the like. Rather, the terms are used for convenience to allow for efficient differentiation between liquid coating compositions and coatings subsequently formed from the liquid coating compositions in which all or substantially all of a liquid carrier is no longer present in the composition (e.g., due to evaporation or other drying or curing).

As used herein parts-per-million ("ppm") is used merely for convenience as an alternative means to express small weight percentages. An analytical methodology to determine ppm is not required. Rather, a ppm value for an ingredient in a composition can be determined based on the starting ingredients used to make the composition.

As used herein, the terms "spray" or "sprayed" are used broadly and encompass misting and fogging, as well as droplets with linear or substantially linear paths of travel. The terms also encompass so called "flood coating" in which a heavy spray-like application, which may be so heavy that spray atomization does not occur, is applied via, for example, via flood bars, guns, or nozzle and the like often in combination with an air blower, with the excess coating composition typically collected and re-used. (For an example of equipment and techniques for fogging to enable coating of three-dimensional substrate, see, for example, WO2020247667.)

As used herein, "active ingredient" refers to an ingredient that, either itself or via a metabolite, directly interacts with the plant physiology of a live plant item (e.g., a biochemical pathway of the plant item) and through that interaction results in a beneficial effect (e.g., protection against abiotic stressors that can lead to, e.g., leaf yellowing and/or necrosis of plant cuttings or liners). Thus, by way of example, an antimicrobial agent that merely acts against an exogenous bacteria, fungus, or the like is not considered to be an active ingredient.

Unless indicated otherwise, the term "carboxyl-functional compound" as used herein refers to compounds having one or more carboxyl groups (—COOH), one or more salt groups formed from carboxyl groups (typically base-neutralized carboxyl groups), or a combination thereof.

Unless indicated otherwise, the term hydroxyl-functional compound" as used herein refers to compounds having one or more hydroxyl groups (—OH), one or more salt groups formed from hydroxyl groups (typically base-neutralized acidic hydroxyl groups, e.g. on ascorbic acid), or a combination thereof.

The term treatment" is used broadly herein encompasses both wash compositions and coating compositions. Unless specifically indicated otherwise herein, pure water (e.g., tap water) does not constitute a wash treatment"or wash composition".

The term coating composition" as used herein does not encompass the application of water alone to a substrate to be coated. By way of example, dipping a plant cutting into tap water or well water does not constitute coating the plant item or applying a coating composition to the plant cutting. However, by way of further example, an aqueous composition constituting 99% by weight water and 1% by weight of a lipid constitutes a coating composition.

The term "aqueous" is broadly used herein to encompass a substance, solution or system having water as a medium, including, for example, substances, solutions or systems that are water-soluble, water-dispersible, and emulsions, including "oil-in-water" and "water-in-oil" microemulsions, nanoemulsions, microdispersions, nanodispersions, and the like.

The terms "crosslink" or "crosslinking" are used broadly used herein to encompass one or more compounds capable of preferentially interacting or associating with another component of the coating composition such as, for example, via a functional group (e.g., an active hydrogen group) present on the component (e.g., the active hydrogen group), which preferably results in one or more desirable coating properties when enough such interactions occur. Such interactions include covalent bonding, chelation, electrostatic complexation, and the like.

In some embodiments, a material may qualify as one or more different recited materials of an embodiment. For example, a compound may be (i) both an antimicrobial agent and an organic binder component, (ii) both a nitrogen-containing compound and an antimicrobial agent, (iii) both a plant energy source and an antimicrobial agent, and so forth. Unless indicated otherwise herein, such materials should be considered in determining the concentrations or amounts of any material categories in which they fit under. Thus, for example, a composition that includes 0.25% by weight ("wt-%") of monolaurin is considered to be a composition that includes 0.25 wt-% of an organic binder component (i.e., an organic water-barrier material) and 0.25 wt-% of an antimicrobial agent, even if such composition does not include any other organic binder component or antimicrobial agent. The discussions herein should be understood to explicitly disclose both "over-lapping" embodiments, e.g., as described above in which an ingredient can fulfill two or more material categories and "non-overlapping" embodiments in which each recited ingredient is fulfilled by a separate ingredient (e.g., where a composition indicated to include both an active hydrogen component and an anti-microbial agent includes at least two ingredients—as opposed to merely one that fulfills both material categories).

For purposes of this application, unless specifically indicated otherwise, the term "plant cutting" is not intended to encompass cut flowers—that is, portions of plants with flowers that have been cut for ornamental display and are not intended for use in forming an additional plant via vegetative propagation. Rather, the term "plant cutting" is intended to refer to rootless plant cuttings for vegetative propagation of a new plant. Nonetheless, it is contemplated that the shelf-life extender compositions may also have utility for extending the shelf-life of cut flowers and certain edible live plant items not intended for vegetative propagation but rather direct human consumption (e.g., herbs, lettuces, leafy greens, and the like) in an analogous manner to protecting unrooted plant cuttings intended for vegetative propagation.

The term "ethylene inhibitor" as used herein refers to an ethylene scavenger, an ethylene receptor antagonist, or an ethylene biosynthesis inhibitor.

BRIEF DESCRIPTION OF DRAWINGS

FIG. 1 is a photograph of a geranium plant cutting overlayed on a measuring grid.

DETAILED DESCRIPTION

The compositions of the present disclosure can be delivered onto the surface of the plant items to be treated (preferably coated) in any suitable form. Typically, however, the compositions will be liquid compositions, and more typically liquid coating compositions that include a sufficient amount of solids (i.e., non-volatiles) to form a surface deposited coating on treated plant surfaces. Such compositions may be organic-solvent-based or water-based compositions (i.e., aqueous compositions that may optionally include one or more organic solvents).

In presently preferred embodiments, the shelf-life extender composition of the present disclosure includes an organic binder component. The organic binder component preferably facilitates formation of a coating, which also may be referred to as a "film", on the treated surfaces of a live plant item. The organic binder component is preferably a component capable of film formation, although in some embodiments it may not be necessary that film coalescence occurs during formation (e.g., hardening under ambient conditions) of a coating (after application of the shelf-life extender composition to substrate) to achieve a desired minimum balance of coating properties. Typically, the organic binder component constitutes at least a majority (i.e., more than 50% by weight) of the total solids present in the shelf-life extender composition. The organic binder component can provide numerous benefits, including, for example, (i) in protecting and/or retaining one or more active ingredients to, for example, extend a desired level of activity over a longer time period and/or control exposure of the live plant item to the active ingredient; (ii) in inhibiting dehydration of the treated live plant item; (iii) as a passive barrier offering protection against biotic stressors; (iv) or as a passive barrier for, for example, reducing exposure to external ethylene or oxygen.

The organic binder component preferably includes one or more organic water-barrier materials, one or more organic water-donating materials, or a combination thereof. Examples of organic water-donating materials for use in formulating coating compositions of the present disclosure include, for example, particles (e.g., fibrous particles and/or micro-gel particles) and other coating materials that are capable of providing water to the treated live plant item (e.g., via absorption over time, e.g., hours and/or days, through a treated surface of the plant item such as a coated leaf surface). In some embodiments, the organic binder component is selected and included in a sufficient amount in the shelf-life extender composition, to be capable of forming a continuous or substantially continuous coating on a treated substrate surface to provide at least a partial barrier capable of reducing the transmission of one or more of water, water vapor, ethylene gas, or oxygen. While not intending to be bound by theory, it is believed that mass loss (e.g., via dehydration) can contribute to negative quality issues, for example, during shipping for live plant items such as plant cuttings, plant liners, and cut flowers. It is believed that a suitable organic water-barrier material and/or organic water-donating material present in the shelf-life extender composition can reduce such mass loss.

The organic binder component can be present in the shelf-life extender composition in any suitable amount to achieve a desired balance of coating properties. Preferably, the shelf-life extender composition includes at least 0.05, at least 0.1, at least 0.15, at least 0.20, at least 0.25, or at least 0.50% by weight ("wt-%") of the organic binder component. The maximum amount of organic binder component present in such liquid compositions, as applied, is not particularly restricted. In some embodiments, the organic binder component is present in the shelf-life extender composition in an amount of less than 5, less than 4, less than 3, less than 2, less than 1, or less than 0.75, or less than 0.50 wt-%, based on the total weight of the coating composition.

The organic binder component may include a lipid, an oligosaccharide, a polysaccharide, an oligopeptide, a polypeptide, or a combination thereof, preferably which include one or more active hydrogen groups. For purposes of convenience, oligopeptides and polypeptides are referred to collectively hereinafter as "polypeptides" and oligosaccharides and polysaccharides are referred to hereinafter collectively as "polysaccharides." Lipids tends to help impart hydrophobicity properties to coatings, which may be desirable, for example, to help resist water vapor permeation and, therefore, mass loss of the coated live plant item due to water loss. Examples of lipids include fatty acids, fatty acid salts, fatty-acid-containing glycerides (e.g., monoesters and/or diesters of fatty acid and glycerol), monoesters of a fatty acid such as a monoester of a fatty acid and a hydroxyl-functional compound other than glycerol, oils (e.g., triglycerides), phospholipids, glycolipids, sterols, and waxes. Such hydrophobicity may also help resist premature washing away of the coating. Polysaccharides and polypeptides tend to help impart good mechanical properties to coatings, but can sometimes suffer from poor barrier properties, especially with respect to water. Thus, in some embodiments, shelf-life extender compositions of the present disclosure are "hybrid" coating compositions that include, for example, (i) both one or more lipids and one or more polysaccharides and/or polypeptides or (ii) one or more polysaccharides and one or more polypeptides, optionally further one or more lipids. If desired, in certain preferred embodiments, cross-linking may be used to increase the mechanical properties of lipid-based coatings, the barrier properties of polypeptide- and/or polysaccharide-based coatings, and one or both of the barrier and/or mechanical properties of hybrid coatings. In some embodiments, the organic binder component is dispersible in water or soluble or at least partially soluble in water.

The shelf-life extender composition can include any suitable amount of the organic binder component (typically comprising one or more lipid, polypeptide, and/or polysaccharide) to achieve the desired result. Typically, the organic binder component will constitute at least about 25 wt-%, at least about 50 wt-%, at least about 60 wt-%, at least about 70 wt-%, at least about 80 wt-%, at least about 85 wt-%, at least about 90 wt-%, at least about 95 wt-%, at least about 96 wt-%, at least about 97 wt-%, at least about 98 wt-%, or 99 wt-% or more, based on the total weight of solids in the shelf-life extender composition. While the maximum amount of the organic binder component in the shelf-life extender composition is not restricted, it may be less than 100 wt-%, no more than about 99 wt-%, no more than about 98 wt-%, no more than about 97 wt-%, no more than about 96 wt-%, no more than about 95 wt-%, no more than about 90 wt-%, no more than about 80 wt-%, no more than about 70 wt-%, no more than about 60 wt-%, no more than about 50 wt-%, no more than about 40 wt-%, or more than about 30 wt-%, based on the total weight of solids in the shelf-life extender composition.

In certain preferred embodiments, the organic binder component includes at least one bio-sourced material. In some such embodiments, the organic binder component consists only of bio-sourced material(s). In some such embodiments, the organic binder component, and optionally the shelf-life extender composition, is not made using any ingredients from feedstocks derived from petroleum (e.g., paraffin is an example of a material that is often derived from petroleum).

In preferred embodiments, the organic binder component includes one or more compounds having one or more active hydrogen groups. Thus, in preferred embodiments, the organic binder component includes one or more active hydrogen compounds ("AHC"). While not intending to be bound by any theory, the presence of active hydrogen groups in the organic binder component can provide various benefits including, for example, polarity, hydrophilicity, water-dispersibility (e.g., via neutralized acid or base groups), hydrogen bonding or other preferential interactions (e.g., other Van der Waals bonding), and/or cross-linking sites. Examples of suitable active hydrogen groups include carboxyl groups (or anhydride groups); hydroxyl groups; amine groups (typically primary or secondary amine groups); or any other suitable active hydrogen group having a hydrogen attached to an oxygen atom (O), sulfur atom (S), or nitrogen (N) atom such as, for example, in the groups: —SH, =NH, —NH$_2$, —S(=O)$_2$(OH), —S(=O)OH, or acid groups including P, O, and H such as phosphonic or phosphinic groups; salt groups thereof (e.g., base-neutralized acid groups); or any combination thereof. Hydroxyl groups and carboxyl groups are particularly preferred. In some embodiments, the active hydrogen group is an acidic hydroxyl group capable of forming a salt group with a suitable base. In some embodiments, the organic binder component includes two or more different active hydrogen groups such as for, example, one or more carboxyl groups and/or salts thereof and one or more hydroxyl groups. The organic binder component may include one or more functional groups other than active hydrogen groups such as, for example, oxirane groups or carbon-carbon double bonds (e.g., aliphatic or cycloaliphatic carbon-carbon double bonds). In some embodiments, one or more active hydrogen groups and/or other functional groups present in the organic binder component assist with crosslinking of the composition.

The one or more active hydrogen groups can be located at any location of a compound, including, for example, at terminal ends (e.g., at an end of a polymer or oligomer backbone), at pendant locations (e.g., at locations attached at non-terminal locations of a backbone or compound), or combinations thereof. The one or more active hydrogen compounds can include one or more, two or more, three or more, or four or more active hydrogen groups located at pendant locations, and optionally in addition to one or more active hydrogen groups located at terminal locations (e.g., terminal backbone locations). In some embodiments, the organic binder component includes at least one AHC that includes two or more different types of active hydrogen groups, including any combination of the specific active hydrogen groups referenced herein (e.g., one or more hydroxyl groups and one or more carboxyl groups or salt groups thereof, one or more hydroxyl groups and one or more amine groups, one or more amine groups and one or more carboxyl groups or salt groups thereof, and so on).

The organic binder component can include compounds having any suitable acid value (i.e., greater than 0), if any. As discussed herein, in some embodiments it may be advantageous to use one or more materials including acid groups (e.g., carboxyl groups or salt groups thereof) to provide, for example, one or more of: cross-linking sites, polarity, or hydrophilicity (including, e.g., water-dispersing groups). In some embodiments, the organic binder component overall and/or one or more AHC included in the organic binder component has an acid value of at least 2, at least 5, at least 8, at least 10, at least 11, at least 12, at least 13, at least 14, at least 15, at least 16, at least 17, at least 18, at least 19, at least 20, at least 20, at least 25, at least 30, at least 40, at least 50, at least 60, at least 70, at least 80 at least 90, or at least 100 milligrams ("mg") KOH per gram ("g") of the material (whether the organic binder component or the AHC, as pertinent). Typically, the organic binder component overall and/or one or more AHC included in the organic binder component will have an acid value of less than 400, less than 300, less than 200, less than 150, less than 125, less than 100, less than 50, less than 30, less than 25, less than 20, less than 15, less than 10, less than 8, less than 5, or less than 1 mg KOH per gram of the material. In some embodiments, the organic binder component overall and/or one or more AHC included therein has an acid value of from at least about 10 to less than about 400, at least about 50 to less than about 300, or at least about 75 to less than about 250 mg KOH per gram of the material. Acid numbers are typically expressed as milligrams of KOH required to titrate a 1 gram sample to a specified end point. Methods for determining acid numbers are well known in the art, and are shown, for example, in ASTM D974-04 entitled "Standard Test Method for Acid and Base Number by Color-Indicator Titration". Acid number is conveniently measured for the feedstock(s) used to make the organic binder component, as opposed to attempting to measure the acid number of those ingredients after present in the fully formulated shelf-life extender composition.

The organic binder component overall, or one or more compounds included therein, may have any suitable hydroxyl value (i.e., non-zero), if any. As discussed herein, in some embodiments it can be advantageous to use one or more materials including hydroxyl groups to provide, for example, one or more of cross-linking sites or polarity. In some embodiments, the organic binder component overall and/or one or more AHC included therein has a hydroxyl value of at least 5, at least 8, at least 10, at least 15, at least 20, at least 25, at least 30, at least 40, at least 50, at least 60, at least 70, at least 80 at least 90, or at least 100 mg KOH per gram of the material. Typically, the organic binder component overall and/or one or more AHC included therein has a hydroxyl value of less than 400, less than 300, less than 200, less than 150, less than 125, less than 100, less than 50, less than 30, less than 25, less than 20, less than 15, less than 10, less than 5, or less than 1 mg KOH per gram of the material. In some embodiments, the organic binder component overall and/or one or more AHC included therein has a hydroxyl value of from at least about 5 to less than about 400, at least about 10 to less than about 200, or at least about 20 to less than about 100 mg KOH per gram of the active hydrogen component. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art, and are shown, for example, in ASTM D1957-86 (Reapproved 2001) entitled "Standard Test Method for Hydroxyl Value of Fatty Oils and Acids". Hydroxyl number is conveniently measured for the feedstock(s) used to make the organic binder component, as opposed to attempting to measure the acid number of those ingredients after present in the fully formulated shelf-life extender composition.

In some embodiments, the organic binder component (and/or the overall shelf-life extender composition) includes more than 50 weight percent ("wt-%") hydroxyl-functional compounds, based on total solids. In some embodiments, the organic binder component (and/or the overall shelf-life extender composition) includes more than 50 weight percent ("wt-%") of carboxyl-functional compounds, based on total solids.

In aqueous embodiments in which the organic binder component includes hydroxyl (e.g., an acidic hydroxyl group capable of forming a salt group) or carboxyl-functional groups, typically at least some of the hydroxyl or carboxyl-functional groups are neutralized with base. Any suitable base can be used, although in some embodiments it may be advantageous to use a fugitive base such as, e.g., a suitable nitrogen-containing volatile base. Examples of suitable fugitive bases may include ammonium hydroxide (resulting in ammonia), amines (e.g., morpholine, dimethylethanolamine, and the like), and combinations thereof. In some embodiments, the one or more base is a metallic salt (e.g., NaOH, KOH, $Ca(OH)_2$, $Mg(OH)_2$, etc.), either alone or in combination with a fugitive base. Non-limiting examples of such bases include sodium bases (e.g., NaOH), potassium bases (e.g., KOH), and combination thereof, which may be optionally combined, for example, with non-metallic bases such as ammonia. In certain preferred embodiments, a base is used that forms a water-emulsifiable or water-soluble salt with a carboxyl-functional compound (e.g., a fatty acid having 7 or more, 8 or more, or 9 or more carbon atoms).

In some embodiments, the organic binder component includes a carboxyl-functional compound and another active hydrogen compound that is chemically different (e.g., an active hydrogen compound that is not carboxyl-functional, an active hydrogen compound that is carboxyl-functional but is chemically distinct in another respect, and so on).

In some embodiments, the organic binder component includes a first AHC having one or more, more typically a plurality of cationic group (e.g., $-NH_3^+$ or $=NH_2^+$) and a second AHC having one or more, more typically a plurality of anionic groups (e.g., $-COO^-$). In polypeptides, cationic groups may be provided, for example, by structural units derived from arginine, histidine, and lysine anionic groups from structural units derived from aspartic acid and glutamic acid. In some embodiments, the organic binder component includes: (i) a polysaccharide having anionic groups and a polypeptide having cationic groups and/or (ii) a polysaccharide having cationic groups and a polypeptide having anionic groups. For example, one such combination is pectin having carboxylate anionic groups and a polypeptide having, for example, structural units with cationic groups formed from arginine, histidine, and/or lysine. While not intending to be bound by theory, it is believed that pairing of such anionic and cationic groups can lead to beneficial electrostatic complexation, for example, between a polypeptide having cationic groups and a polysaccharide having anionic groups, or vice versa, which can lead to improved coating properties.

The organic binder component can be any suitable compound, or combination of compounds, such as a monomer or other low-molecular-weight compound (e.g., a compound having a number average molecular weight (Mn) of less than 500, less than 400, less than 300, less than 200, or less than 100 Daltons), an oligomer, a polymer, or any combination thereof. Compound(s) of the organic binder component can exhibit any suitable molecular weight. In some embodiments, the one or more compounds (preferably one or more AHC) exhibit an Mn of less than 100,000, less than 50,000, less than 20.000, less than 10,000, less than 8,000, less than 6,000, less than 4,000, less than 3,000, less than 2,000, less than 1,000, less than 500, or less than 200. The organic binder component may include one or more compounds (preferably one or more AHC) that exhibit an Mn of at least 100, at least 200, at least 500, at least 1,000, at least 2,000, at least 3,000, at least 4,000, at least 6,000, at least 8,000, at least 10.000, at least 15.000, at least 20,000, or at least 50,000. Gel permeation chromatography (GPC) using polystyrene standards is a useful method for determining Mn.

The one or more compounds of the organic binder component can be saturated or unsaturated. In some embodiments, the organic binder component includes one or more compounds having one or more non-aromatic carbon-carbon double bonds such as one or more aliphatic and/or cycloaliphatic carbon-carbon double bonds. Examples of preferred such unsaturated compounds include unsaturated fatty acids (e.g., mono- or poly-unsaturated fatty acids) and/or salts thereof, esterified compounds of such unsaturated fatty acids (e.g., glycerides), and combinations thereof. Cis double bonds are preferred double bonds for edible shelf-life extender composition embodiments.

In some embodiments, the organic binder component includes one or more of fatty acids and/or salts of fatty acids, which may be saturated, unsaturated (i.e., may contain one or more non-aromatic carbon-carbon double bonds), or a mixture thereof (i.e., one or more saturated fatty acids and/or salts thereof and one or more unsaturated fatty acids and/or salts thereof). The total fatty acid content of the shelf-life extender composition, if any is present, typically exhibits an iodine value of less than 400, less than 350, less than 300, less than 250, less than 200, less than 150, than 120, less than 100, less than 70, less than 50, less than 40, less than 30, less than 20, less than 15, less than 10, less than 5, less than 1, or 0 centigrams of iodine per gram of total fatty acid contents. In some embodiments, the total fatty acid content of the shelf-life extender composition, if any is present, exhibits an iodine value of greater than 0, greater than 1, greater than 5, greater than 10, greater than 15, greater than 20, greater than 30, greater than 40, greater than 50, greater than 60, greater than 70, greater than 80, greater than 90, greater than 100, greater than 120, or greater than 150 centigrams of iodine per gram of total fatty acid contents. The iodine value corresponding to total fatty acid content of the shelf-life extender composition can conveniently be determined, for example, based on iodine values of fatty acid feedstock(s) used to make the composition and the proportion of such feedstock(s) relative to one another if more than one is used. In some embodiments, the shelf-life extender composition does not include any unsaturated fatty acids or salts thereof.

In some embodiments, the shelf-life extender composition includes one or more glycerides, also commonly referred to as acylglycerols or acylglycerides. If desired, the composition can include any combination of mono-glycerides (monoacylglycerols such as 1-monoacylglycerols or 2-monoacylglycerols), di-glycerides (diacylglycerols such as 1,3-diacylglycerols or 1,2-diacylglycerols), or triglycerides (triacylglycerols). Mono-glycerides are preferred glycerides, with fatty-acid-containing mono-glycerides being particularly preferred. Preferred fatty-acid-containing mono-glycerides include 2,3-dihydroxypropyl palmitate, 1,3-dihydroxypropan-2-yl palmitate, a monolaurin (1-monolaurin and/or 2-monolaurin), and mixtures thereof. The total glyceride content in the shelf-life extender composition, if any is present, typically exhibits an iodine value of less than less than 400, less than 350, less than 300, less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride content. In some embodiments, the total glyceride content in the shelf-life extender composition, if any is present, exhibits an iodine value of greater than 0, greater than 1, greater than 5, greater than 10, greater than 15, greater than 20, greater than 30, greater than 40, greater than 50, greater than 60, greater than 70, greater than 80, greater than 90, or greater than 100, greater than 120, or greater than 150 centigrams of iodine per gram of total glyceride content. The iodine value corresponding to total glyceride content of the shelf-life extender composition can conveniently be determined, for example, based on iodine values of glyceride feedstock(s) used to make the shelf-life extender composition and the proportion of such feedstock(s) relative to one another if more than one is used. In some embodiments, the shelf-life extender composition does not include any unsaturated glycerides.

In some embodiments, the total glyceride and fatty acid content in the shelf-life extender composition, if any of either are present, exhibits an iodine value of less than 250, less than 200, less than 150, less than 120, less than 100, less than 70, less than 50, less than 40, less than 30, less than 20, less than 15, less than 10, less than 5, less than 1, or 0 centigrams of iodine per gram of total glyceride and fatty acid content. In some such embodiments, the total glyceride and fatty acid content of the shelf-life extender composition exhibits an iodine value, if any, of greater than 0, greater than 1, greater than 5, greater than 10, greater than 15, greater than 20, greater than 30, greater than 40, greater than 50, greater than 60, greater than 70, greater than 80, greater than 90, or greater than 100, greater than 120, or greater than 150 centigrams iodine per gram of total glyceride content. The iodine value corresponding to total glyceride and fatty acid content of the shelf-life extender composition can conveniently be determined, for example, based on iodine values of glyceride and fatty acid feedstock(s) used to make the composition and the proportion of such feedstock(s) relative to one another. In some embodiments, the shelf-life extender composition does not include any unsaturated glycerides or fatty acids.

The overall shelf-life extender composition can exhibit any suitable iodine value, if any. In some embodiments, the composition exhibits an iodine value of greater than 0.1, greater than 1, greater than 2, greater than 3, greater than 4, greater than 5, greater than 6, greater than 7, greater than 8, greater than 9, greater than 10, greater than 15, greater than 20, greater than 30, greater than 40, greater than 50, greater than 60, greater than 70, greater than 80, or greater than 90 or greater than 100, greater than 120, or greater than 150 centigrams of iodine per gram of solids in the shelf-life extender composition. Typically, the shelf-life extender composition exhibits an iodine value, if any, of less than 250, less than 200, less than 150, less than 100, less than 70, less than 50, less than 40, less than 30, less than 20, less than 15, less than 10, less than 5, or less than 1 centigrams of iodine per gram of solids in the shelf-life extender composition. The overall iodine value can conveniently be determined using the test method provided herein.

As discussed above, in some embodiments the organic binder component includes a saturated or unsaturated fatty acid, both, and/or salt(s) thereof. The fatty acids can be a short-chain fatty acid (SCFA), medium-chain fatty acid (MCFA), long-chain fatty acid (LCFA), very long-chain fatty acid (VLCFA), or combination thereof. In some embodiments, one or more fatty acids are used that have a carbon chain length (including the carbonyl carbon atom) of 8 or more, 9 or more, 10 or more, 11 or more, 12 or more, 13 or more, 14 or more, 15 or more, 16 or more, 17 or more, or 18 or more carbon atoms. The one or more fatty acids typically have a carbon chain length (including the carbonyl carbon atom) of 25 or less, 22 or less, 20 or less, 19 or less, 18 or less, 17 or less, 16 or less, 15 or less, or 14 or less. In some embodiments, one or more fatty acids are used that have a carbon chain length (including the carbonyl atom) of 12 to 18 (i.e., 12, 13, 14, 15, 16, 17, and/or 18). In some embodiment even-numbered fatty acids are preferred, with C12, C16 and C18 fatty acids being particularly preferred. The organic binder component may also, or alternatively, include one or more fatty acids having a carbon chain length (including the carbonyl atom) of 7 to 13 (i.e., 7, 8, 9, 10, 11, 12, and/or 13).

Examples of suitable saturated fatty acids for the organic binder component include capronic acid, caprylic acid, capric acid, lauric acid, myristic acid, palmitic acid, stearic acid, arachic acid, behenic acid, and combinations thereof. Preferred saturated fatty acids include myristic acid, palmitic acid, stearic acid, lauric acid, and combinations thereof. In certain preferred embodiments, the organic binder component includes one or more antimicrobial fatty acids or salts or esters thereof, with lauric acid being particularly desirable because it is an antimicrobial agent effective against both bacteria, including gram positive and gram negative bacteria, and fungus.

In some embodiments, the organic binder component includes one or more unsaturated fatty acids, which can be mono-unsaturated fatty acids, polyunsaturated fatty acids, or a combination thereof. Preferred unsaturated fatty acids for edible embodiments include one or more or two or more cis carbon-carbon double bonds, and more preferably are free of trans carbon-carbon double bonds. Examples of preferred cis configuration monounsaturated fatty acids include 9-cis-hexadenoic acid (also referred to as palmitoleic acid), 9-cis-octadenoic acid (also referred to as oleic acid), 13-cis-decosenoic acid (also referred to as erucic acid), and combinations thereof, with oleic acid being particularly preferred due to its ample supply and low cost. In some embodiments, for health benefits when treating edible substrate (e.g., herb cuttings, leafy greens, etc.), it may be advantageous to use one or more polyunsaturated fatty acids selected from omega-3-fatty acids, omega-6-fatty acids, or a mixture thereof—typically, one or more isomer of linoleic acid, one or more isomer of linolenic acid, or a combination thereof. In certain edible embodiments, it is preferred to use only isomers of linoleic acid and/or linolenic acid in which all of the carbon-carbon double bonds are in the cis configuration. Other suitable cis configuration poly unsaturated acids may include 5,8,11,14-all-cis-eicosatetraenoic acid (also referred to as arachidonic acid), eicosapentaenoic acid ("EPA") ($C_{20}H_{30}O_2$), and docosahexaenoic acid ("DHA", $C_{22}H_{32}O_2$). Examples of preferred polyunsaturated fatty acids include a non-conjugated linoleic fatty acid (preferably a cis, cis isomer), a conjugated linoleic fatty acid (preferably a cis, cis isomer), an alpha-linolenic fatty acid (preferably a cis, cis, cis isomer), a gamma-linolenic fatty acid (preferably a cis, cis, cis isomer), isomers of any of these, or a combination thereof. Examples of feedstock sources of linoleic fatty acid include safflower, sunflower, soya, rapeseed, and canola. Examples of feedstock sources of linolenic acid include flaxseed, walnut, chia, hemp, rapeseed, canola, and perilla.

In some embodiments, at least some, a majority, or even all of the fatty acid included in the shelf-life extender composition is present in an at least partially esterified form (e.g., glyceride form or other esterified form such as described further below). Thus, for example, any of the fatty acids described above can be used in any suitable glyceride form, with mono-glycerides (i.e., fatty acid mono-esters of glycerol) being a preferred glyceride form.

In some embodiments, the organic binder component includes one or more, two or more, three or more, or four or more hydroxyl-functional lipids. Examples of suitable hydroxyl-functional lipids include fatty acids that include one or more hydroxyl groups and fatty acid esters that include one or more hydroxyl groups in a fatty acid portion and/or other portion. Examples of hydroxyl-functional fatty acid esters include glycerides having one or more fatty acid structural units (e.g., monoglycerides) or two or more fatty acid structural units (e.g., diglycerides). The organic binder component can include any of the fatty acids or fatty acid monoglycerides or other monoesters disclosed in WO2020/051238 (by Braden et al.), each of which is incorporated by include one or more groups or atoms in place of hydrogen and may include one, two, or three of more carbon-carbon double bonds. For example, in some embodiments, one or more active hydrogen groups (e.g., hydroxyl groups) or other functional groups (e.g., an oxygen atom to form an oxirane group) are present as substituents in place of one or more hydrogen in the depicted —$CH_2$— groups.

2,3-dihydroxypropyl palmitate, 1,3-dihydroxypropan-2-yl palmitate, 2,3-dihydroxypropyl stearate (e.g., CAS Registry No. 123-94-4), 1,3-dihydroxypropan-2-yl stearate (e.g., CAS Registry No. 621-61-4), 1-monolaurin, 2-monolaurin, and mixtures thereof are examples of preferred monoglycerides, and are each shown below:

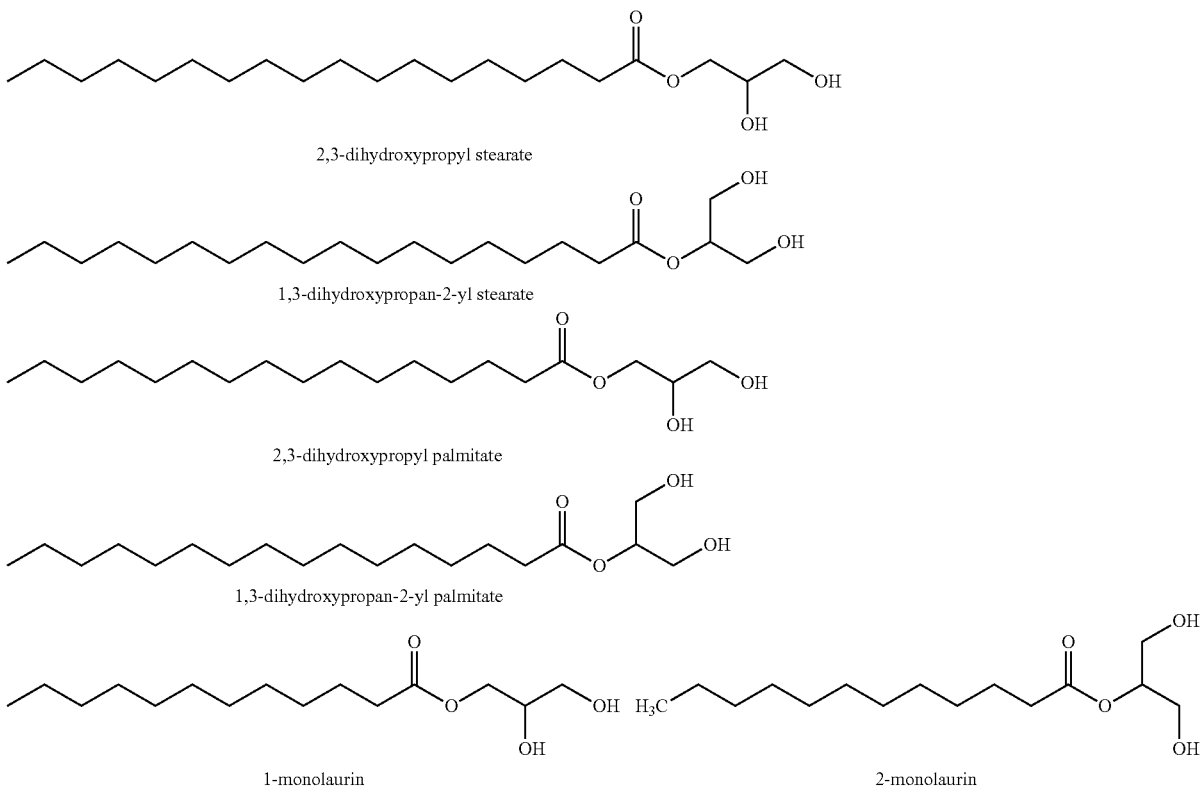

reference herein, including any of the depicted formulas or structures (see, e.g., Formula I in claims 1 or 2 and the specific compounds depicted in claims 12 or 18).

Examples of suitable monoglycerides include those having the structure of either of the structures of Formula 1a (structure on left) or 1b (structure on right) below:

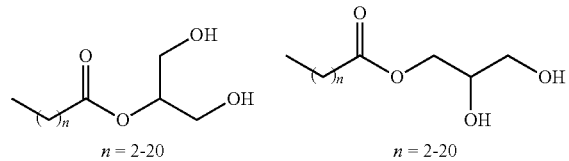

Preferred "n" are as described previously herein for the carbon chain length of fatty acids (not counting the carbonyl carbon). Although the above structures depict saturated, unsubstituted fatty acid chains, the fatty acid chains may In some embodiments, a glyceride is used having one or more fatty acid portions that includes a functional group, preferably a reactive functional group. Examples of suitable functional groups include functional groups including one or more heteroatoms (e.g., O, N, P, S, or Si) or aliphatic or cycloaliphatic carbon-carbon double bonds. Examples of such glyceride compounds are provided in U.S. Prov. App. Ser. No. 63/065,484, which are incorporated herein by reference.

In some embodiments one or more of the glycerides, preferably monoglycerides, are derived from grape seeds. A representative manufacturing process for preparation of a mixture of monoacylglycerides is provided in FIG. 2.3 of GRAS Notice No. 886, which is accessible online on the FDA's website at https://www.accessdata.fda.gov/scripts/fdcc/?set=GRASNotices&id=886. See also, for example, GRAS Notice No. 648, which is accessible online on the FDA's website at https://www.accessdata.fda.gov/scripts/fdcc/index.cfm?set=GRASNotices&id=648). The EDIPEEL product commercially available from Apeel Sciences of Goleta. California is an example of a commercially available coating product based on such materials, and according to GRAS Notice No. 648 is a mixture of monoacylglycerides and primarily containing 2,3-dihydroxypropyl palmitate and 1,3-dihydroxypropan-2-yl palmitate. In some embodiments, the EDIPEEL product or a similar chemical composition is the base shelf-life extender composition to which one or more additional ingredients (e.g., biologically active ingredients) disclosed herein are included.

In some embodiments, the coating composition includes one or more mono-, di-, and/or tri-esters (more typically monoesters) of a fatty acid and a hydroxyl-functional compound other than glycerol, where the monoester (and/or di-ester and/or tri-ester) includes one or more, preferably two or more, more preferably three of more active hydrogen groups (e.g., hydroxyl group(s)). Preferably, the monoester comprises an active hydrogen group capable of forming a salt (e.g., a carboxyl group or an acidic hydroxyl group), with such group preferably located on a structural unit derived from the hydroxyl-functional compound. The hydroxyl-functional compound is preferably one or both of: i) more polar than glycerol and (ii) more soluble in water than glycerol (e.g., under ambient conditions). The hydroxyl-functional compound other than glycerol may be saturated or unsaturated and preferably has three or more active hydrogen groups, more preferably four or more (e.g., for our more hydroxyl groups). Ascorbic acid, or a salt thereof, is a preferred example of such a hydroxyl-functional compound other than glycerol.

The monoester, which may optionally be a salt (e.g., an ammonium salt), may be derived from any suitable saturated or unsaturated fatty acid, although typically the fatty acid will be a C12 or higher fatty acid. Typically, and especially in water-based coating embodiments, the monoester is derived from a C20 or lower fatty acid, preferably C18 or lower, more preferably C12. C14, or C16 or C18. Preferred such monoesters include ascorbyl laurate, ascorbyl myristate, ascorbyl palmitate, ascorbyl stearate, a salt thereof (e.g., an ammonium salt of ascorbyl palmitate and/or an ammonium salt of ascorbyl stearate), or a combination thereof. The coating composition can include any suitable amount of one or more such monoesters. In some embodiments, more than 50 wt-%, more then 60 wt-%, more than 70 wt-%, more than 80 wt-%, more than 90 wt-%, more than 95 wt-%, more than 99 wt-%, or up to about 100 wt-% of the lipid (or the total solids) present in the shelf-life extender composition is a monoester of a fatty acid and a hydroxyl-functional compound other than glycerol.

In some embodiments, the organic binder component includes one or more of lauric acid and/or a salt thereof, one or more of a glycerol laureate (i.e., a monoacylglyceride, diacylglyceride, or triacylglyceride in which at least one fatty acid chain, or all fatty acid chains, is a lauric acid fatty acid chain) or a combination thereof. Monolaurin is a preferred glycerol laureate. As used herein, unless indicated otherwise, the term "monolaurin" refers to 1-monolaurin (i.e., in which the fatty acid chain is positioned at the 1 or 3 position of glycerol), 2-monolaurin, or a mixture thereof in any proportion. In preferred embodiments, the one or more lauric acid and/or glycerol laureates are bio-sourced (e.g., derived from coconuts).

In some embodiments, the shelf-life extender composition includes (a) one or more monoesters, typically one or more fatty acid monoesters, more typically one or more monoacylglycerols and/or one or more fatty-acid monoester of ascrobic acid or salts thereof and (b) one or more fatty acids and/or salts thereof. In some such embodiments, the shelf-life extender composition includes more than 50 wt-% of (a), based on the combined weights of (a) and (b). For example, the shelf-life extender composition can include (a) from 50 to 99 wt-% (e.g., 60 to 95 wt-% or 70 to 90 wt-%) of a first group of compounds selected from one or more monoesters of fatty acids (e.g., fatty acid monoglycerides) and (b) from 1 to 50 wt-% (e.g., 5 to 40 wt-% or 10 to 30 wt-%) of a second group of compounds selected from one or more fatty acids and/or fatty acid salts (preferably fatty acid salts), based on the total combined weight of components (a) and (b). In other such embodiments, the shelf-life extender composition include more than 50 wt-% of (b) (e.g., from 50 to 99 wt-%, 60 to 95 wt-% or 70 to 90 wt-% of (b)), based on the combined weights of (a) and (b). When used, the total combined amounts of components (a) and (b) in the shelf-life extender composition typically comprises at least 50 wt-%, at least 60 wt-%, at least 70 wt-%, at least 80 wt-%, at least 85 wt-%, at least 90 wt-%, at least 95 wt-%, at least 96 wt-%, at least 97 wt-%, at least 98 wt-%, at least 99 wt-%, or at least 99.9 wt-% of the total solids present in the shelf-life extender composition.

In some embodiments, the shelf-life extender composition, based on total solids, includes at most 10 wt-%, at most 5 wt-%, at most 2 wt-%, at most 1 wt-%, or at most 0.1 wt-%, if any, monoester compounds not having an active hydrogen group (e.g., waxes such as monoesters of a fatty acid and fatty alcohol).

In some embodiments, the shelf-life extender composition includes, based on the combined weight of glyceride (preferably a glyceride of a saturated or unsaturated fatty acid, more preferably a mono-glyceride of a saturated or unsaturated fatty acid) and carboxyl-functional AHC(s), at least: 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent of one or more carboxyl-functional AHC.

In some embodiments, the shelf-life extender composition includes, based on the combined weight of glyceride (preferably a glyceride of a saturated or unsaturated fatty acid, more preferably a mono-glyceride of a saturated or unsaturated fatty acid) and carboxyl-functional active hydrogen component, no more than: 99.9, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, or 0.5 weight percent of one or more carboxyl-functional AHC.

In some embodiments, the shelf-life extender composition, based on total solids, includes a minority amount of one or more carboxyl-functional AHC (i.e., less than 50 weight percent) and exhibits a decreased water vapor permeability relative to an otherwise identical coating omitting the one or more carboxyl-functional AHC.

In preferred embodiments, the shelf-life extender composition comprises less than 10 wt-%, less than 5 wt-%, or less than 1 wt-%, if any, of diacylglycerides, based on the weight of total solids present in the shelf-life extender composition.

In some embodiments, the shelf-life extender composition includes less than 10 wt-%, less than 5 wt-%, or less than 1 wt-%, if any, of triacylglycerides, based on the weight of total solids present in the shelf-life extender composition.

In some embodiments, the shelf-life extender composition comprises less than 10 wt-%, less than 5 wt-%, or less than 1 wt-%, if any, of monoacylglycerides, based on the weight of total solids present in the shelf-life extender composition.

In some embodiments, the organic binder component include one or more polysaccharides, one or more polypeptides, or a combination thereof, which typically include a plurality of active hydrogen groups. Preferred such materials include carboxyl-functional polysaccharides and carboxyl-functional polypeptides, which may optionally contain one or more active hydrogen groups in addition to carboxyl groups or salt groups thereof, with pectin and derivatives thereof and gelatin and derivatives thereof being exemplary such compounds. In some embodiments, the organic binder component includes one or more carboxyl-functional lipids and one or more carboxyl-functional polysaccharides and/or carboxyl-functional polypeptides.

Examples of polypeptides for use in the organic binder component include gelatin, zein, globulin, albumin, whey protein, casein, hemp protein, brown rice protein, alfalfa protein, chia protein, pea protein, flax protein, silk fibroin (e.g., silk fibroin), soy protein, other protein isolates, and mixtures thereof. In some embodiments, the organic binder component includes an amphiphilic polypeptide. Examples of silk fibroin and barrier coating compositions including silk fibroin are provided in U.S. Publ. No. 2020/0178576. In some embodiments, preferred polypeptides are carboxyl-functional poly peptides such as those containing, and more preferably rich in, structural units provided by amino acids such as aspartic acid and/or glutamic acid. In some embodiments, preferred polypeptides are amino- and amide-functional polypeptides such as those containing, and more preferably rich in, structural units provided by amino acids such as arginine, asparagine, glutamine, histidine, lysine, and combinations thereof.

Examples of suitable polysaccharides may include pectin, alginate, carrageenan, arabinoxylan, chitosan, psyllium, carboxy methyl cellulose, hyaluronic acid, agarose, agaropectin, cyclodextrin, salts or derivatives thereof, and mixtures thereof. Pectin is an example of a preferred polysaccharide. In some embodiments, the organic binder component includes a polysaccharide including xylose structural units, arabinose structural units, or combinations thereof. Polysaccharides included in the coating compositions of the present disclosure can include any suitable side functional groups including, for example, one or more, two or more, or three or more selected from hydroxyl groups, carboxyl groups (or salts or alkyl esters thereof), amine group, and amide groups. Carboxyl-functional polysaccharides are preferred in some embodiments such as, for example, polysaccharides having any of the acid number disclosed herein. The pectin used may be either high methoxy ("HM") pectin having a degree of esterification ("DE") of 50 or above (e.g., 60 or above, 70 or above, 80 or above, etc.) or low methoxy ("LM") pectin having a DE of less than 50 (e.g., less than 40, less than 30, less than 20, less than 10, etc.), or a mixture thereof. The pectin may also be either amidated or non-amidated, or a mixture thereof. While not intending to be bound by theory, an advantage of using pectin in the AHC is pectin can provide a clean mouth feel (e.g., as opposed to a slimy mouth feel), as well as enable crosslinking. Preferred pectins for use in food-contact and/or edible embodiments of the present disclosure are derived from edible feedstocks (e.g., apple pomace, citrus peels, plums, or gooseberries).

As discussed above, in some embodiments, the shelf-life extender composition is a hybrid coating composition that includes one or more lipids and one or more non-lipid oligomers or polymers. In preferred such embodiments, the organic binder component includes both a lipid having one or more active hydrogen groups and a non-lipid material (e.g., a non-lipid oligomer or polymer) having one or more, and preferably a plurality, of active hydrogen groups. Preferred non-lipid materials include polypeptides, polysaccharides, and combinations thereof. The one or more lipids (e.g., a saturated or unsaturated: fatty acid, monoglyceride, diglyceride, oil, wax, phospholipid, derivative thereof (e.g., salt thereof), or mixture thereof) are preferably present in the hybrid shelf-life extender coating composition in an amount of at least 1 wt-%, at least 2 wt-%, at least 5 wt-%, least 10 wt-%, at least 15 wt-%, at least 20 wt-%, at least 25 wt-%, or at least 30 wt-% to no more than 80 wt-%, no more than 70 wt-%, no more than 60 wt-%, no more than 55 wt-%, no more than 50 wt-%, no more than 45 wt-%, no more than 40 wt-%, no more than 35 wt-%, or no more than 30 wt-%. The one or more non-lipid material (preferably non-lipid oligomer or polymer AHC (e.g., a saturated or unsaturated biopolymer having one or more active hydrogen groups) such as, for example, a polysaccharide (e.g., pectin, alginate, carrageenan, arabinoxylan, chitosan, carboxy methyl cellulose and/or psyllium), a polypeptide (e.g., gelatin, zein, albumin. globulin, whey protein, casein, hemp protein, brown rice protein, alfalfa protein, chia protein, pea protein, silk fibroin, soy protein, and/or flax protein), or a combination thereof) are preferably present in an amount of at least 20 wt-%, at least 30 wt-%, at least 40 wt-%, at least 45 wt-%, at least 50 wt-%, at least 55 wt-%, at least 60 wt-%, at least 65 wt-%, or at least 70 wt-% to no more than 99 wt-%, no more than 98 wt-%, no more than 95 wt-%, no more than 90 wt-%, no more than 85 wt-%, no more than 80 wt-%, no more than 75 wt-%, to more than 70 wt-%. The above weight percentages (wt-%) for (i) lipid and (ii) non-lipid materials in hybrid coating compositions are based on the total combined amounts of components (i) and (ii) in the shelf-life extender coating composition. In preferred such hybrid coating embodiments, the total combined amounts of components (i) and (ii) in the shelf-life extender coating composition comprises at least 50 wt-%, at least 60 wt-%, at least 70 wt-%, at least 80 wt-%, at least 85 wt-%, at least 90 wt-%, at least 95 wt-%, at least 96 wt-%, at least 97 wt-%, at least 98 wt-%, at least 99 wt-%, or at least 99.9 wt-% of the total solids present in the coating composition. To ensure good compatibility between the lipid and non-lipid materials, in some embodiments, it may be advantageous to include one or more compatibilizers in the shelf-life extender composition that show good affinity to both one or more of the lipid and one or more of the non-lipid materials (e.g., polysaccharides and/or polypeptides). For example, a suitable compatibilizer may be a compound (preferably an edible compound in some embodiments) that includes one or more structural portions showing good compatibility with polysaccharides and/or poly peptides and one or more other structural portions showing good compatibility with lipids. For example, such a compatibilizer may have one or more structural portions with polarity properties that are substantially matched to that of the polysaccharide and/or polypeptide and one or more other structural portions have polarity properties that are substantially matched to that of the lipid material.

In some embodiments, the shelf-life extender composition includes a cyclodextrin, an oligomer or polymer including cyclodextrin groups (e.g., polymerized cyclodextrin), or a combination thereof. Oligomers and polymers having cyclodextrin structural units are known and may be used, including, for example, oligomers and polymers formed via polymerization of cyclodextrin with one or more other reactive materials (e.g., a hydroxyl-reactive material such as a polyisocyanate). Preferred cyclodextrins and cyclodextrin groups include alpha-cyclodextrin, beta-cyclodextrin, gamma-cyclodextrin, modified versions thereof, and mixtures thereof. Unmodified versions of cyclodextrin are typically referred to as "natural" or "native" cyclodextrins and may be used. In some embodiments, at least 50%, at least 60%, at least 70%, at least 80%, at least 90%, at least 95%, or at least 99%, or at least 99.9%, of the cyclodextrin molecules are uncomplexed and available for binding compounds such as, for example, ethylene (typically in gaseous form), which may negatively impact plant cuttings. For purposes of binding ethylene, alpha-cyclodextrin or modified alpha-cyclodextrin (or oligomers or polymers containing such structural units), may be preferred due to the smaller cavity size. Modified cyclodextrins and cyclodextrin groups may be used. When modified, cyclodextrins are typically modified via reaction and/or substitution of one or more of the hydroxyl groups. Any suitable amount of hydroxyl groups may be replaced/substituted such as, for example, from about 1 to about 18, or from about 3 to about 16. Such modifications may be used, for example, to modify the cavity size, to modify the cavity complexing chemical properties, to modify the solubility in water (e.g., increase the solubility so more cyclodextrin may be dissolved), and/or to provide crosslinking properties. Examples of modified cyclodextrins include alkylated cyclodextrins (e.g., methylated cyclodextrins), hydroxyalkyl-modified cyclodextrins (e.g., a hydroxypropyl cyclodextrin), and cyclodextrins modified to include one or more acetyl groups, one or more alkoxyalkyl groups, one or more sulfoalkyl groups, one or more sulfoalkyl ether groups, one or more sugar groups, one or more nitrile groups, one or more phosphine groups, one or more alkylammonium groups, or a combination thereof. Such modifications are well known to persons of skill in the art in the pharmaceutical area for purposes of using cyclodextrin for complexing with pharmaceutical compounds, pharmaceutical delivery and/or release purposes. Wacker-Chemie markets a variety of modified cyclodextrins under its CAVAMAX line of commercial cyclodextrin products. In some embodiments, one or more cyclodextrins may be used having a water solubility, at room temperature, of at least 10 grams (g) in 100 milliliters (ml) of water, at least 20 g in 100 ml of water, or at least 25 g in 100 ml of water.

In some embodiments, at least some, or substantially all or all, of the organic binder component is provided by one or more of: coconut milk, coconut water, dehydrated coconut milk, dehydrated coconut water, a coconut milk extract (e.g., with one or more compounds removed or reduced other than water), a coconut water extract (e.g., with one more compounds removed or reduced other than water), a nut extract, or a combination thereof.

In some embodiments, the organic binder component includes a synthetic dimer (e.g., a dimer fatty acid), synthetic oligomer, synthetic polymer, or a combination thereof. Such materials can be included in addition, or as an alternative, to the other ingredients for the organic binder component disclosed herein (e.g., biosourced polysaccharides, polypeptides, and/or lipids). Examples of useful synthetic polymers may include a polyester, an alkyd, an addition polymer (e.g., a free-radical polymerized addition polymer such as a vinyl polymer, an emulsion polymerized latex polymer, an organic-solution polymerized acrylic, a poly (acrylic acid), or the like), or a copolymer and/or mixture thereof.

As previously discussed, in some embodiments, the shelf-life extender composition includes one or more additives, preferably at least one of which is an active ingredient. The one or more additives may be in addition to, or as an alternative to, the organic binder component. For example, as discussed herein, various beneficial effects on the treated live plant item may be achieved through the inclusion of one or more active ingredients in the composition. Preferred active ingredients include those that mitigate stress on the live plant item (e.g., rootless plant cutting) during handling and shipment (e.g., at least through to sticking in growth media for purposes of root formation in the case of plant cuttings) by, for example, inhibiting nitrogen and/or carbohydrate depletion, inhibiting oxidative stress, and/or inhibiting other negative changes in plant physiology (e.g., negative changes in hormone activity and/or enzyme activity). In some embodiments, such beneficial effect attributable to the one or more active ingredients may be sufficient such that an organic binder component may not be necessary to achieve a desired level of shelf-life extension. Examples of suitable additives include one or more of an antimicrobial agent, a plant growth regulator, a plant energy source, an ethylene inhibitor, a nitrogen-containing compound, an inorganic plant nutrient (e.g., an inorganic essential nutrient), or a combination thereof.

The one or more additives may be present alone in the shelf-life extender composition; more typically, however, the one or more additives are used in combination with an organic binder component. While a single ingredient may function both as an organic binder component and as an active ingredient, when both are included, typically they are present as separate compounds (i.e., chemically different compounds).

The shelf-life extender composition can include any suitable amount of one or more additives. Preferably, each of the one or more additives is present in an efficacious amount (e.g., an amount sufficient for the shelf-life extender composition to exhibit activity with respect to the treated plant item attributable to the active ingredient).

In some embodiments, the shelf-life extender composition includes one or more additive in a concentration of least 0.01 parts-per-million ("ppm"), at least 0.1 ppm, at least 1 ppm, at least 10 ppm, at least 20 ppm, at least 50 ppm, at least 100 ppm, at least 250 ppm, at least 500 ppm, at least 1,000 ppm, at least 1,500 ppm, at least 2.000 ppm, or at least 2,500 ppm, based on the total weight of the composition. In some embodiments, the additive(s) are selected from one or more, two or more, three or more, four or more, or all of an antimicrobial agent, a plant growth regulator, a plant energy source, an ethylene inhibitor, a nitrogen-containing compound, or an inorganic plant nutrient.

In some embodiments, the shelf-life extender composition includes one or more nitrogen-containing compounds (e.g., other than any nitrogen-containing compounds that may be present in the organic binder component such as polypeptides or nitrogen-containing polysaccharides), preferably in an efficacious amount for facilitating the health of the live plant item to be treated.

The nitrogen-containing compound is preferably a nitrogen-donating compound for live plant items. While not intending to be bound by any theory, it is believed that an excessive amount of nitrogen may inhibit rooting of certain plant cuttings, accordingly care is preferably taken to avoid including excessive amounts of nitrogen-donating compounds in the shelf-life extender composition. The nitrogen-containing compound may include one or more carbon atoms, although in some embodiments a nitrogen-containing compound may be used that doesn't include any carbon atoms (e.g., ammonia and/or ammonium). The nitrogen-containing compound may be of any suitable size. In some embodiments, it has a molar mass of about 200 or less, about 150 or less, about 100 or less, about 75 or less, about 60 or less, or about 42 grams per mole. The nitrogen-containing compound may include one or more nitrile groups. Examples of nitrogen-containing compounds include cyanamide and/or a cyanamide salt (e.g., calcium cyanamide), another nitrile-group-containing compound, urea and/or a urea-forming compound, ammonia and/or ammonium, an ammonia-forming and/or ammonium-forming compound, a nitrate and/or a nitrate-forming compound (e.g., a nitrate salt such as ammonium nitrate, sodium nitrate, calcium nitrate, potassium nitrate, and/or magnesium nitrate), nitrite and/or a nitrite-forming compound (e.g., a nitrite salt such as ammonium nitrite, sodium nitrite, calcium nitrite, potassium nitrite, and/or magnesium nitrite), a nitric-oxide-forming compound, a nitroxyl-forming compound, an amino acid (e.g., glycine, cysteine, etc.), or a combination thereof. Preferred nitrogen-containing compounds are capable of being metabolized by a live plant item (e.g., when topically applied to a plant cutting such as a geranium cutting) in one or more steps to yield nitric oxide (NO), which is believed to help limit plant stress and plant quality degradation associated therewith, for example, during shipping. As an additional benefit, in some embodiments, the inclusion of one or more nitrogen-containing compounds in an efficacious amount can reduce the need for fertilizer (e.g., by at least 5%, at least 10%, at least 25%, or at least 50%) application post-sticking to grow a plant cutting into a plant liner or beyond.

In some embodiments, an in situ nitrogen-forming component such as, for example, a beneficial (e.g., symbiotic) nitrogen-fixating microbial agent such as a rhizobacteria is included in the composition as an alternative to, or in addition to, the nitrogen-containing compound.

In embodiments in which the nitrogen-containing compound is present, the shelf-life extender composition typically includes the nitrogen-containing compound in an amount of at least 0.01 parts-per-million ("ppm"), at least 0.1 ppm, at least 1 ppm, at least 10 ppm, at least 20 ppm, at least 50 ppm, at least 100 ppm, at least 250 ppm, at least 500 ppm, at least 1.000 ppm, at least 1,500 ppm, at least 2,000 ppm, or at least 2,500 ppm. The upper amount is not particularly restricted, so long as the health of the treated live plant item is not negatively impacted, or the rooting of a treated live plant cutting is not negatively impacted (e.g., to an unsuitable amount).

In some embodiments, the shelf-life extender composition includes one or more antimicrobial agents (e.g., in addition to any ethanol that may be present in the composition and/or antimicrobial fatty acids and/or fatty acid esters that may be present in the organic binder component), preferably in an efficacious amount for antimicrobial activity (e.g., to kill or inhibit the growth of one or more problematic bacteria and/or fungus). The amount of antimicrobial agent may vary depending in a variety of factors including, for example, the potency of the antimicrobial agent, the end use, and the desired level of performance. When an antimicrobial agent is used, the shelf-life extender composition will typically include the one or more antimicrobial agents in an amount of at least 0.01 part-per-million ("ppm"), at least 0.1 ppm, at least 1 ppm, at least 10 ppm, at least 20 ppm, at least 50 ppm, at least 100 ppm, at least 250 ppm, at least 500 ppm, at least 1,000 ppm, at least 1.500 ppm, at least 2,000 ppm, or at least 2,500 ppm, based on the total weight of the composition.

In some embodiments, a fungicide is used, more preferably a fungicide that shows antimicrobial activity against one or more members of the *Botrytis* genus of funguses, and preferably against *Botrytis cinerea*, at a concentration of less than 10,000 ppm, preferably less than 5,000 ppm, even more preferably less than 1,000 ppm, and in some embodiments, at less than 100 ppm, 50 ppm, 20 ppm, or 1 ppm.

The antimicrobial agent can be an inorganic compound, an organic compound, an organometallic compound, or a mixture thereof. In some embodiments, the antimicrobial agent is an acid (e.g., an organic acid) or a salt thereof (e.g., a salt of an organic acid). Examples of suitable antimicrobial agents include citric acid, malic acid, ascorbic acid, erythorbic acid, sorbic acid, thiodipropionic acid, ascorbyl palmitate, lauric acid, parabens (e.g., methyl and ethyl parabens), nisin, benzoic acid, triclosan, potassium bicarbonate, other weak acids or salts thereof (e.g., calcium ascorbate and/or potassium sorbat), or a combination thereof. In some embodiments, the one or more antimicrobial agents are GRAS listed for direct or indirect food-contact. Additional examples of antimicrobial agents that may have utility include clove oil, clove extract, vanilla extract, lemongrass oil, a terpene, a terpenoid, a phenol compound, a spearmint oil, thyme, curcumin, carvacrol, bay leaf oil, peppermint oil, acacia oil, oil of winter green, limonene, eugenol, eucalyptol, menthol, farnecol, carvone, hexanal, thyme oil, dill oil, oregano oil, orange peel oil, neem oil, lemon peel oil, cumin seed extract, rosemary oil, thymol, eugenyl acetate, vanilla oil, citronellal, methyl salicylate, methyl jasmonate, vanilla, zinc and/or a zinc-continuing compound (e.g., zinc oxide), silver and/or a silver-containing compound (e.g., silver nitrate, silver acetate, silver thiosulfate, and the like), iron and/or an iron-containing compound (e.g., potassium ferrocyanide, potassium ferricyanide, and the like), and derivatives and combinations thereof. Examples of suitable fungicides, in addition or alternative to the aforementioned antimicrobials, some of which are fungicides, may include thiabendazole ("TBZ"), ortho-phenylphenol ("OPP"), sodium ortho-phenylphenate ("SOPP"), enilconazole, fludioxonil, propiconazole, azoxystrobin, difenoconazole, and mixtures thereof. In some embodiments, honey; a honey or honeycomb extract; processed (e.g., crushed, ground, and/or pulverized) honeycomb; or a mixture thereof may be used as an antimicrobial agent; with "raw" honey and/or honey products being preferred for their enhanced antimicrobial activity relative to conventional processed honey. Because heat pasteurization can attenuate the antimicrobial properties of honey and/or honeycomb extract, preferably the honey and/or honeycomb extract has not been processed in a manner that substantially attenuates the antimicrobial activity.

In some embodiments, the one or more optional antimicrobial agent comprises a peroxide-generating component. A preferred such example is glucose in combination with an enzyme, with glucose oxidase enzyme being a preferred enzyme.

In some embodiments, a selenium-containing antimicrobial agent can be used such as, for example, the SELDOX materials available from SelenBio of Austin, Texas. Preferred selenium-containing antimicrobial agents are organoselenium compounds that are preferably capable of catalytically creating an anti-microbial effect via, for example, reactions between oxygen and thiols. Examples of such selenium-containing antimicrobial agents are provided in U.S. Pat. Nos. 8,236,337 and 9,370,187. When present, such antimicrobials are typically used in a concentration of at least about 10 part-per billion (ppb), at least about 50 ppb, at least about 100 ppb, at least about 500 ppb, at least 1 part-per-million (ppm), or at least 10 ppm, based on the total weight of the shelf-life extender composition. The maximum amount can vary widely depending upon the particular antimicrobial compound(s) used, but will typically be less than about 2 wt-%, less than about 1 wt-%, less than about 0.1 wt-%, less than about 100 ppm, less than about 50 ppm, less than about 20 ppm, less than about 10 ppm, or less than about 5 ppm, based on the total weight of the shelf-life extender composition.

The shelf-life extender composition can exhibit any suitable overall acid value, if any. For example, the composition can have an acid value of at least 2, at least 3, at least 4, at least 5, at least 6, at least 7, at least 8, at least 9, at least 10, at least 15, at least 20, at least 30, at least 40, at least 50, at least 60, at least 70, at least 80 at least 90, or at least 100 mg KOH per gram of shelf-life extender composition solids. Typically, the overall shelf-life extender composition and/or the organic binder component will have an acid value of less than 400, less than 300, less than 200, less than 150, less than 125, less than 100, less than 50, less than 30, less than 20, less than 15, less than 10, less than 5, less than 4, less than 3, less than 2, or less than 1 mg KOH per gram of solids. In some embodiments, the shelf-life extender composition has an acid value of from at least about 10 to less than about 400, at least about 25 to less than about 300, or at least about 40 to less than about 250 mg KOH per gram of solids.

The shelf-life extender composition can exhibit any pH suitable for a given embodiment. For example, in embodiments in which the composition is an aqueous coating composition, the aqueous coating composition preferably exhibits a pH of at least about 2, more preferably at least about 3, and every more preferably at least about 4, or at least about 5. In aqueous embodiments, the shelf-life extender composition typically exhibits a pH of less than about 10.5, less than about 9, less than about 8, or less than about 7. In some embodiments, the shelf-life extender composition is an aqueous coating composition having a pH of from about 4 to about 9, from about 4.5 to about 8, or from about 5 to about 7.

In organic-solvent-based embodiments, the shelf-life extender composition may, for example, exhibit a pH of at least about 1, at least about 1.5, at least about 2, at least about 2.5, at least about 3, or at least about 4. In organic-solvent-based embodiments, the shelf-life extender composition may exhibit a pH of less than about 7, less than about 6, less than about 5, less than about 4.5, or less than about 4. In some organic-solvent-based embodiments, the shelf-life extender composition exhibits a pH of from about 1.5 to 6, from about 2 to about 5, or more typically from about 2 to about 4.

Any suitable acids and/or bases may be used to achieve a desired pH for the shelf-life extender composition. One or more pH buffering compounds and/or pH adjusting compounds (e.g., sodium bicarbonate) can be included in the shelf-life extender composition. To the extent acids or bases are used to achieve the desired pH, typically a majority, and more typically all or substantially all, of such acids or bases are weak acids or weak bases. It is contemplated that, in some embodiments, strong bases, including substantial amounts of strong bases, may be used such as, for example, NaOH, KOH, or combinations thereof.

In the context of powder or other solid concentrate embodiments (e.g., pellets, tablets, and the like) capable of forming an aqueous or organic-solvent-based shelf-life extender composition when combined with liquid carrier, the solid concentrate is preferably capable of forming such a liquid composition having a pH as disclosed above.

Aqueous embodiments of the shelf-life extender composition may also include one or more emulsifiers. Examples of suitable emulsifiers may include lecithin (e.g., lecithin from soy, sunflower, or canola feedstocks), a sucrose ester of fatty acids (see, e.g., the line of food-grad sucrose ester emulsifiers commercially available from Sisterna B.V.), an ester of citric acid (e.g., an ester of citric acid and glycerol such as citric acid mono-<esterified, di-esterified, or tri-esterified with glycerol; stearyl citrate), a grape seed extract emulsifier, sucrose acetate isobutyrate, dioctyl sodium sulfosuccinate, dodecylbenzene sulfonic acid and/or a base-neutralized salt thereof, glycerol monostearate, glycerol monooleate, glycerol palmitostearate, or a combination thereof. In some embodiments, canola lecithin such as that described in GRAS Notice No. 682 (by Cargill) is used. In some embodiments, the emulsifier is a surfactant (e.g., any of those described herein), a fatty acid carboxylic acid salt (e.g., any of those described herein), a phosphate salt (e.g., any of those described herein), or a combination thereof.

The shelf-life extender composition may optionally include one or more wetting additives, preferably in efficacious additive amounts, to help improve the wetting out of the live plant surface to be coated. Examples of wetting additives may include certain monoacylglycerides, lysophospholipids, glycoglycerolipids, glycolipids, ascorbyl esters of a fatty acid, esters of lactic acid, esters of tartaric acid, esters of malic acid, esters of fumaric acid, esters of succinic acid, esters of citric acid, esters of pantothenic acid, sucrose ester of a fatty acid, dioctyl sodium sulfosuccinate, and fatty alcohol derivatives.

The shelf-life extender composition may optionally include one or more thickeners. When used, the thickener is preferably used in an efficacious amount, for example, to increase the viscosity of liquid embodiments of the shelf-life extender composition, increase stability of the liquid coating composition, and/or reducing or preventing tackiness or stickiness of the hardened coating. The one or more thickeners are typically used in an amount of at least 0.1 wt-%, at least 1 wt-%, at least 2 wt-%, or at least 5 wt-%, based on total solids in the coating composition. The one or more thickeners are typically present in an amount of less than 30 wt-%, less than 20 wt-%, less than 10 wt-%, or less than 5 wt-% of total solids in the shelf-life extender composition. Examples of thickeners include certain polysaccharides (e.g., a starch, a vegetable gum, or pectin), certain polypeptides, or a mixture thereof such as, for example, guar gum, agar-agar, arrowroot starch, cornstarch, katakuri starch, potato starch, sago starch, tapioca, alginin, guar gum, locust bean gum, xantham gum, carrageenan, carboxymethyl cellulose, and mixtures thereof.

The live plant item to be treated/coated may also be subjected to one or more sanitization steps prior to treating/coating, simultaneous to treating/coating, after treating/coating, or combinations thereof. Chemical sanitization, non-chemical sanitization, or combinations thereof, may be used. Examples of non-chemical sanitization include, for example, application of ultra violet (UV) light (e.g., with wavelengths from 100 to 400 nanometers) to the live plant item such as, for example, non-ionizing artificial UV-C light (000 to 280 nanometers wavelength, preferably 200 to 280 nanometer wavelength for enhanced antimicrobial effect). Other forms of sterilizing irradiation may also be used, if desired. For example, three sources of radiation are approved by the FDA for use on a variety of foods: gamma ray, x-ray, and electron-beam, although labeling requirements may apply and also render the treated foods ineligible for organic status. When used, such sanitization steps are preferably of a duration and/or intensity to substantially reduce (e.g., reduce by at least 50%, at least 75%, at least 90%, at least 95%, or at least 99%) or appreciably eliminate one or more of: (i) the overall microbial load of *Botrytis cinerea* or (ii) the overall microbial load. A reduction in such loads is in the context of a reduction of viable cell counts present.

In some embodiments, hardened or at least partially hardened coatings formed from shelf-life extender compositions of the present disclosure are sufficiently optically transparent so as to prevent the coatings from being detectable by the human eye. For example, the coatings can have an average transmittance of at least about 60%, at least about 65%, at least about 70%, at least about 80%, at least about 85%, at least about 90%, at least about 95%, or at least about 99%) for light in the visible range such as, e.g., sunlight (i.e., the portion of the solar spectrum having a wavelength between 400 nanometers and 700 nanometers). As used herein, "transmittance" is defined as the ratio of transmitted light power to incident light power. As used herein, "average transmittance" refers to the average value of the transmittance over the entire area of the coating. Because transmittance typically decreases with coating thickness, the coatings can be made thin enough to allow for sufficient transmittance of visible light while still being thick enough to serve as a barrier to mass/moisture loss, as previously described. For example, in some embodiments, the hardened coatings have an average thickness of less than 2 microns, less than 1.5 microns, less than 1 micron, or less than 0.5 microns.

The thickness of the hardened or at least partially hardened coating employed may vary depending upon, for example, the live plant item to be coated, the desired aesthetic properties of the coating, cost considerations, and the desired level of coating performance. Typically, the coating will be of substantially uniform thickness. Examples of typical coating thicknesses include average thicknesses of less than about than about 200 microns, less than about 75 microns, less than about 20 microns, less than about 15 microns, less than about 10 microns, less than about 9 microns, less than about 8 microns, less than about 7 microns, less than about 6 microns, less than about 5 microns, less than about 4 microns, less than about 3 microns, less than about 2 microns, or less than about 1.5 microns. The coating will typically be used at an average coating thickness of at least about 0.01 micron, at least about 0.100 micron, at least about 0.5 micron, at least about 1 micron, at least about 1.5 microns, at least about 2 microns, at least about 2.5 microns, or at least about 3 microns.

In some embodiments, the hardened or at least partially hardened coatings of the present disclosure can be appreciably removed from a plant surface (e.g., at least 50%, at least 60%, at least 70%, at least 80%, at least 90%, at least 95%, or at least 99% removed, on a mass basis) by soaking in a suitable volume of water (e.g., immersing a coated live plant item for 10 minutes in 2 liters of room-temperature deionized water). In some embodiments, an aqueous wash solution including a suitable amount (e.g., a dilute amount such as 5% or less, more typically 3% or less, or about 1 to about 3%) of a suitable base (typically a weak food-safe base) may be used to facilitate removal of certain hardened or at least partially hardened coatings of the present disclosure, preferably under normal ambient conditions. For example, certain reversibly crosslinked hardened coatings of the present disclosure can be removed (e.g., certain of those using PMCA's such as zinc-containing PMCAs and carboxyl-functional AHC) from treated live plant items prior to consumption using a 3% solution of ammonium hydroxide in water.

In some embodiments, the shelf-life extender composition includes one or more compounds capable of preferentially interacting or associating with another component of the composition such as, for example, via a functional group (e.g., an active hydrogen group) present on the component (e.g., the organic binder component), which preferably results in one or more desirable coating properties when enough such interactions occur. To achieve enhanced coating properties such as, for example, enhanced mechanical properties and/or barrier properties, it may be advantageous to formulate a coating composition that incorporates one or more different modes of crosslinking. For example, in some embodiments, the coating composition may be capable of cross-linking via one or more of: (i) interaction of a PMCA compound and active hydrogen groups, (ii) via carbon-carbon double bonds. (iii) via natural crosslinking compounds present in a plant extract included in the coating composition, (iv) via purified or exogenous and/or synthetic crosslinking compounds (e.g., phenolic or polyphenol crosslinking compounds, preferably which are naturally occurring in plant materials, more preferably edible plant materials such as grape skins, such as ferulic acid, tannic acid, and the like optionally in combination with a suitable enzyme(s) to assist in crosslinking) and/or (v) via crosslinking enzymes (e.g., transglutaminase) included in the coating composition.

In some embodiments, the shelf-life extending composition may include inorganic nutrients. These nutrients may also interact or crosslink with the organic barrier composition. Inorganic plant nutrients include calcium, magnesium, sulfur, boron, chlorine, copper, iron, manganese, molybdenum, nickel, zinc, aluminum, cobalt, selenium, and silicon.

In a preferred embodiment, the coating composition comprises (i) one or more AHC barrier materials and (ii) one or more of a PMCA, peptide, polypeptide, aglycone, polyphenol (e.g., ferulic acid, tannic acid, gallic acid, and the like), citric acid, amino acid or monoester.

Bulk rheology experiments exhibit the assembly of the system into a gel network by the onset and growth of elastic properties. In particular, oscillatory rheology can be useful in determining crosslinking of a system. As a system cross-links the storage modulus (G') increases more rapidly than the loss modulus (G"). A commercial rheometer, such as TA Instruments' Discovery Hybrid 20 rheometer or may be used to measure the storage modulus (G'), loss modulus (G") and tan delta. In some embodiments, the mole ratio of AHC to crosslinking species that delivers improved shelf-life can be determined by rheology measurements (e.g., using a rheometer). While not intended to be bound by theory, ratios of AHC to crosslinking species can be determined be measuring G' and G" and modified such that G' rises faster than G" upon drying as compared to a system that does not have a crosslinking species. In some embodiments, provided crosslinked treatments are characterized by high elasticity. Elasticity or elastic deformation generally measures a tendency of a material to return to its original size and/or shape after a force having been applied to the material and having deformed the material is subsequently removed. In contrast, plastic deformation follows application of enough stress on a material to cause a change in the size and/or shape of the material in a way, such that the material does not recover its original size and/or shape. In some embodiments, mechanical properties include, for example, storage modulus, tangent modulus, plateau modulus, swelling, and/or dynamic modulus.

In some embodiments, treatments of the present disclosure may have a storage modulus from about 1 Pascal (Pa) to about 100,000 Pa, from about 1 Pa to about 50,000 Pa, from about 1 Pa to about 25.000 Pa, from about 1 Pa to about 10.000 Pa, from about 1 Pa to about 7,500 Pa, from about 1 Pa to about 5,000 Pa, from about 1 Pa to about 2,500 Pa, from about 1 Pa to about 2,000 Pa, from about 1 Pa to about 1,500 Pa, from about 1 Pa to about 1,000 Pa, from about 1 Pa to about 500 Pa, from about 1 Pa to about 250 Pa, from about 1 Pa to about 100 Pa, from about 100 Pa to about 100.000 Pa, from about 100 Pa to about 50,000 Pa, from about 100 Pa to about 25,000 Pa, from about 100 Pa to about 10,000 Pa, from about 100 Pa to about 7.500 Pa, from about 100 Pa to about 5.000 Pa, from about 100 Pa to about 2,500 Pa, from about 100 Pa to about 2,000 Pa, from about 100 Pa to about 1.500 Pa, from about 100 Pa to about 1.000 Pa, from about 50 Pa to about 500 Pa, or from about 50 Pa to about 400 Pa. Such measurements are preferably conducted at ambient temperature.

For example, the interaction or association can be a covalent bond formation, an ionic interaction (e.g., an ionic bond formation), or another type of association that may optionally, and preferably in some embodiments, be reversible. For example, in some embodiments, the shelf-life extender composition includes one or more compounds capable of coordinating, complexing and/or chelating (hereinafter "coordinating" for brevity) with the organic binder component via, for example, one or more active hydrogen groups present in the organic binder component such as carboxyl groups and/or salts thereof. Examples of such compounds include polyvalent metal compounds. Preferred polyvalent metal compounds are capable of entering into a "crosslinking" reaction with an active hydrogen compound, which is reversible in some embodiments. While not intending to be bound by theory, in some embodiments, the crosslinking reaction may be a coordination or chelation that does not result in a covalent linkage. For convenience, herein the polyvalent metal compound is referred to as a "polyvalent metal crosslinking agent" or "PMCA" for short. Another advantage of PMCA's is many, such as zinc and calcium are essential inorganic plant nutrients.

In certain preferred embodiments, the PMCA includes a metal atom, such as, e.g., a transition metal atom, in a form (e.g., an oxidation state) capable of coordinating with an active hydrogen group (e.g., a carboxylic acid, carboxylate group, or acidic hydroxyl group) under ambient conditions (e.g., 25° C. and 50% relative humidity) to form a reversible crosslink. Preferred PMCAs include a polyvalent metal atom such as bismuth (Bi), calcium (Ca), cobalt (Co), iron (Fe), magnesium (Mg), manganese (Mn), zinc (Zn), or a combination thereof. Although edible PMCAs are preferred in some embodiments, it is within the scope of the invention, in for example embodiments in which the shelf-life extender composition is not intended for human consumption, to use PMCAs including polyvalent metals such as, for example, beryllium, cadmium, copper, zirconium, barium, strontium, aluminum, antimony, nickel, tin, tungsten, and the like. The polyvalent atom is preferably present in the PMCA in a form (e.g., an oxidation state) that facilitates crosslinking with the AHC. Although the PMCA can be of any suitable form, it is typically a complex or an oxide of a poly valent metal. Accordingly, the PMCA may be an organometallic compound, a fully inorganic compound, or a mixture thereof. In some embodiments, the PMCA is a salt. The PMCA may be either soluble, partially soluble, or insoluble in water. When insoluble and/or partially soluble, the PMCA may be provided as finely divided powder, which may optionally be suspended or otherwise dispersed in liquid shelf-life extender compositions. In some embodiments, the PMCA may be provided as a colloid.

In some embodiments the PMCA is present in a complex, such as a salt, that includes an organic anion. Examples of such organic anions include salts of organic acids, which may be amino acids, such as, e.g., acetate, glutamate, formate, carbonate, bicarbonate, salicylate, glycollate, octoate, benzoate, gluconate, oxalate, lactate, and combinations thereof. In some embodiments, the PMCA includes an amino acid (e.g., glycine or alanine), which may be present in the PMCA as a bidentate ligand.

Zinc is a preferred polyvalent metal. Examples of suitable zinc-containing PMCA include zinc acetate, zinc carbonate, zinc chloride, zinc citrate, zinc hydroxide, zinc gluconate, zinc oxide, zinc picolinate, zinc stearate, zinc sulfate, salt solutions thereof (e.g., ammonia or amine salts such as zinc ammonium carbonate, zinc ammonium acetate, zinc ammonium citrate, and the like), or a derivative or combination thereof.

Examples of calcium-containing PMCA include calcium acetate, calcium carbonate, calcium chloride, calcium citrate, calcium hydroxide, calcium glycinate, calcium glycolate, calcium gluconate, calcium lactate, calcium oxide, calcium phosphate (e.g., calcium mono-phosphate), calcium pyrophosphate, calcium propionate, calcium pyruvate, calcium silicate, tricalcium silicate, calcium sorbate, calcium stearate, calcium sulfate, calcium acid pyrophosphate, a derivative thereof (e.g., calcium lactate gluconate), or a combination thereof.

Examples of manganese-containing PMCA include manganese chloride, manganese citrate, manganese gluconate, manganese sulfate, base complexes thereof (e.g., amine or ammonia complexes thereof), or a derivative or combination thereof.

Examples of magnesium-containing PMCA include magnesium carbonate, magnesium chloride, magnesium hydroxide, magnesium oxide, magnesium phosphate, magnesium stearate, magnesium sulfate, or a derivative or combination thereof.

Examples of iron-containing PMCA include ferric ammonium citrate, ferric chloride, ferric citrate, ferric phosphate, ferric pyrophosphate, ferric sulfate, ferrous ascorbate, ferrous carbonate, ferrous citrate, ferrous fumarate, ferrous gluconate, ferrous lactate, ferrous sulfonate, or a derivative or a mixture thereof.

Examples of bismuth-containing PMCA compounds include multivalent bismuth salts of various anions, including bismuth salts of a metal oxyanion, bismuth salts of organic compounds, and the like. These compounds can include their anhydrous forms as well as various hydrates, including hemihydrate, pentahydrate, and other hydrated forms, along with mixtures and combinations thereof, and the like. Examples of bismuth-containing compounds include bismuth silicate, bismuth magnesium aluminosilicate, bismuth aluminate, bismuth borate, bismuth manganate, bismuth phosphate, bismuth aluminate, bismuth manganate, and mixtures or combinations thereof, bismuth subcarbonate, bismuth subcitrate, bismuth citrate, bismuth titrate, bismuth gallate, bismuth subgallate, bismuth salicylate, bismuth subsalicylate, bismuth hydroxide, bismuth oxide, bismuth trioxide, bismuth nitrate, bismuth subnitrate, and the like, similar bismuth salts, and derivatives and combinations thereof. Bismuth subcitrate, bismuth subsalicylate, and combinations and derivatives thereof are preferred.

Examples of suitable cobalt-containing PMCA compounds include vitamin B12, also known as cobalamin. Other cobalt-containing compounds may also be used, for example, in certain embodiments in which the shelf-life extender composition will not be directly consumed.

In some embodiments, at least some of the PMCA is present as particles. Suitable particles may have a volume average particle size of greater than about 50, greater than about 100, greater than about 500, greater than about 1,000, or greater than about 2,000 nanometers. Suitable particles may have volume average particle size of less than about 2,000, less than about 1,000, less than about 500, less than about 100 nanometers, or less than about 50 nanometers. For edible embodiments, the particles are preferably 100 nanometers or larger in size, as indicated by volume average particle size. Laser diffraction analysis is a useful method for measuring particles sizes (e.g., volume particle sizes reported as volume equivalent sphere diameters) and distribution for PMCA particles, with ISO13320 (2020) being an example of testing conditions, with appropriate modifications made if particles below about 100 nanometers are to be measured. In some embodiments, PMCA particles having a volume average particle size sufficiently small to react with the polymer at ambient conditions (e.g., 25° C. and 50% relative humidity) are used. The PMCA particles are preferably sufficiently small so that they are not readily visible to the unaided human eye (e.g., as white particles) in applied coatings disclosed herein.

While not intending to be bound by theory, for embodiments in which the AHC (e.g., present in the organic binder component) includes one or more acid salt groups (e.g., a base-neutralized carboxylic acid group), it is believed that it is advantageous to select a PMCA including an anion that is a stronger base than the anion of acid salt group of the AHC. Again, while not intending to be bound theory, it is believed that if the PMCA employs an anion that is a weaker base than the anion of the acid salt group of the AHC, then crosslinking will not occur, or at least not as effectively, between the PMCA and the acid groups present on the AHC. In some embodiments, the conjugate acid of the anion of the PMCA is preferably either volatile or unstable. For example, acetic acid, the conjugate acid of acetate anion, is volatile, and carbonic acid, the conjugate acid of both bicarbonate and carbonate anion, is unstable (e.g., spontaneously decomposes to carbon dioxide and water). PMCA complexes containing bases are preferred in some embodiments, with fugitive bases such as, for example, ammonia and amines being particularly preferred. The bases may be used, for example, to solubilize the polyvalent metal or polyvalent metal complex.

In some embodiments, e.g., coating embodiments in which the coating is likely to be consumed, the PMCA is preferably itself edible (e.g., as a food-grade additive), with all the ingredients used to prepare the PMCA preferably being edible. In edible embodiments, the PMCAs preferably qualifies as a direct food-grade additive under U.S. Food and Drug Administration ("FDA") laws and regulations.

In some embodiments, the shelf-life extender composition includes a plant extract (e.g., an extract of an edible portion of a plant such as, e.g., a fruit or vegetable), which may be a separate ingredient from the AHC. In some embodiments, some or all of the PMCA is supplied by the plant extract, which may be a cuticle extract (e.g., a fruit cuticle extract). In some embodiments, the plant extract is an extract from an edible portion of a plant and is itself also edible. For example, the plant extract can be a fruit extract, which may be produced from any suitable portion or portions of the fruit. Examples of suitable fruit extracts include extracts of tomatoes (e.g., tomato pomace), grapes (e.g., grape skins or pomace), cranberries (e.g., cranberry skins or pomace), apples (e.g., apple skins or pomace), pomegranates (e.g., pomegranate pomace or peel extract), blueberries, (e.g., blueberry skins or pomace) or combination thereof. Typically, the plant extract will have been processed to concentrate (e.g., on a total solids basis) the amount of PMCA and/or other crosslinking compounds (e.g., polyphenols and other natural endogenous crosslinkers) present relative to the amount present in the unprocessed original plant material from which the plant extract was derived. The extract may also optionally have been processed to remove one or more undesired impurities or other compounds that may, for example, interfere with the desired crosslinking and/or cause one or more undesired organoleptic properties detectable to a typical human consumer (for edible embodiments). The plant extract may be processed such that the plant extract has concentrated levels of PMCA relative to the original plant material from which it was process such as, for example, 25% more concentrated, 50% more concentrated, 75% more concentration, 100% more concentrated, 200% more concentrated, 300% more concentrated, 400% more concentrated, and so on.

When a PMCA is used, any suitable portion of the PMCA may be provided by one or more plant extracts. In some embodiments, at least 10 wt-%, at least 20 wt-%, at least 30 wt-%, at least 40 wt-%, at least 50 wt-%, at least 60 wt-%, at least 70 wt-%, at least 80 wt-%, at least 90 wt-%, at least 95 wt-%, or up to 100 wt-% of the PMCA present in the shelf-life extender composition is provided by the plant extract.

Any suitable amount of PMCA may be included in shelf-life extender compositions of the present disclosure to achieve the desired result. In some embodiments, the shelf-life extender composition includes one or more PMCA in an amount of at least 0.1 wt-%, at least 1 wt-%, at least 3 wt-%, at least 7 wt-%, at least 10 wt-%, or at least 15 wt-%, based on the total amount of metal in the one or more PMCA relative to the non-volatile weight of the shelf-life extender composition.

The shelf-life extender composition may include any suitable stoichiometry of one or more carboxyl-functional AHC to PMCA.

For example, the shelf-life extender composition may include at least about 0.1, at least about 0.5, at least about 1, at least about 2, at least about 3, at least about 4, at least about 5, or at least about 10 moles of one or more AHC (e.g., moles of carboxyl-functional AHC such as fatty acid and/or acid-functional biopolymer) per mole of polyvalent metal in the PMCA. In some embodiments, the shelf-life extender composition includes less than about 10, less than about 5, less than about 4, less than about 3, less than about 2, less than about 1, or less than about 0.5 moles of one or more AHC (e.g., moles of carboxyl-functional AHC such as fatty acid and/or acid-functional biopolymer) per mole of polyvalent metal in the PMCA.

In some embodiments, the shelf-life extender composition includes at least about 0.01, at least about 0.05 at least about 0.1, at least about 0.15, at least about 0.2, at least about 0.25, at least about 0.35, at least about 0.5, at least about 0.6, at least about 0.8, or at least about 1 moles of the polyvalent metal per mole of carboxyl groups or salt groups thereof present in the shelf-life extender composition.

In some embodiments, no more than about 2.0, no more than about 1.5, no more than about 1.0, no more than about 0.75, no more than about 0.70, no more than about 0.5, no more than about 0.45, no more than about 0.35, no more than about 0.3, no more than about 0.2 moles of the polyvalent metal are present in the shelf-life extender composition per mole of carboxyl groups or salt groups thereof present in the shelf-life extender composition.

Suitable stoichiometries may include a ratio of moles of carboxyl-functional compound(s) and/or salts thereof, preferably capable of coordinating with the PMCA, in the organic binder component to PMCA of between about 4:1 and about 0.2:1, between about 3:1 and about 0.5:1, more preferably between about 2:1 and 1:1, and most preferably between 1.6:1 and 1:1 (carboxyl-functional compounds: PMCA). In some embodiments, the shelf-life extender composition includes a ratio of moles of fatty acids and/or salts thereof capable of coordinating with the PMCA to moles of polyvalent metal present in the PMCA pursuant to the above.

In the above discussion, reference was made to moles of polyvalent metal in the PMCA. Generally, the moles of polyvalent metal present in the PMCA will be the same as the moles of PMCA present. That is, one mole of PMCA will typically include one mole of polyvalent metal. Depending on the particular PMCA(s) employed, it is possible, however, that this ratio may be other than 1:1 in some embodiments. For example, a PMCA could include two or more atoms of polyvalent metal and, thus, 1 mole of such PMCA would include two or more moles of polyvalent metals.

While not intending to be bound by theory, in some embodiments it is believed that the presence of an efficacious amount of PMCA can enhance one or more properties of a coating.

In another aspect, the present disclosure provides a shelf-life extender composition in which one or more enhanced coating properties are achieved via inclusion of an ethylenically unsaturated component including one or more non-aromatic carbon-carbon double bonds in the shelf-life extender composition. While not intending to be bound by theory, it is believed that crosslinking can occur via the carbon-carbon double bonds present, and especially when a suitable metal drier compound is present in the shelf-life extender composition or on the surface or outer layer of the plant item to be coated (e.g., naturally occurring endogenous metals present in a plant). The ethylenically unsaturated component may be an unsaturated active hydrogen compound such as any of those disclosed herein, or alternatively, the ethylenically unsaturated component may be a compound that is free of active hydrogen groups. More typically, however, the ethylenically unsaturated component will include at least one active hydrogen group such as, e.g., any of those disclosed herein. The ethylenically unsaturated component may comprise a single ethylenically unsaturated compound, or a mixture of two or more chemically different ethylenically unsaturated compounds. The ethylenically unsaturated component can exhibit any suitable iodine value, including any of the iodine values referenced herein previously in the context of the organic binder component. All of the iodine values disclosed herein in the context of the organic binder component are specifically incorporated by reference in the context of the ethylenically unsaturated component, but are not reproduced for purposes of brevity.

The shelf-life extender composition can include any suitable amount of ethylenically unsaturated component to achieve a desired result. When used, liquid coating composition embodiments will typically include at least 0.05 wt-%, at least 0.1 wt-%, at least 0.15 wt-%, at least 0.20 wt-%, or at least 0.25 wt-% of ethylenically unsaturated component (e.g., any of the ethylenically unsaturated materials recited herein such as, e.g., unsaturated fatty acids, salts thereof, or esters thereof), based on the total weight of the final shelf-life extender composition. The ethylenically unsaturated component is typically present in the final liquid shelf-life extender composition (e.g., after dilution for liquid concentrate embodiments or after formation of the liquid composition in solid concentrate embodiments), prior to application on the plant item, in an amount of less than 5, less than 4, less than 3, less than 2, less than 1, or less than 0.75, or less than 0.50 wt-%, based on the total weight of the final shelf-life extender composition.

In certain preferred embodiments, one or more metal driers are used in combination with the ethylenically unsaturated component. The metal drier may be, for example, any of the PMCA disclosed herein. Metal driers provided by plant extracts, and especially edible plant extracts, may be preferred in some embodiments. If included, the one or more metal driers are preferably included in an efficacious amount. While not intending to be bound by any theory, it is believed the presence of an efficacious amount of metal drier may enhance crosslinking (e.g., by enhancing and/or inducing the formation of crosslinks between aliphatic carbon-carbon double bonds present in the ethylenically unsaturated component). Non-limiting examples of suitable metal driers may include aluminum (Al), antimony (Sb), barium (Ba), bismuth (Bi), calcium (Ca), cerium (Ce), chromium (Cr), cobalt (Co) (e.g., vitamin B12), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), any other suitable rare earth metal or transition metal, as well as oxides, salts (e.g., acid salts such as octoates, naphthenates, stearates, neodecanoates, etc.) or complexes of any of these, and mixtures thereof. The amount used will depend, at least partially, upon the particular drier(s) chosen for a particular end use. In general, however, the amount of metal drier present in the shelf-life extender composition, if any, may suitably be greater than about 10 parts per million ("ppm") by weight, preferably greater than about 25 ppm by weight, and more preferably greater than about 100 ppm by weight, based on the total weight of metal in the metal drier, relative to the total weight of the shelf-life extender composition. The amount of metal drier may suitably be less than about 10,000 ppm by weight, preferably less than about 1.000 ppm by weight, and more preferably less than about 600 ppm by weight, based on the total weight of metal in the metal drier relative to the total weight of the shelf-life extender composition. In embodiments in which the shelf-life extender composition is edible, the metal drier is preferably one of the edible PMCA disclosed herein. In some embodiments, iron metal driers (e.g., any of the polyvalent iron compounds referenced herein) are preferred.

To achieve enhanced coating properties such as, for example, enhanced mechanical properties and/or barrier properties, it may be advantageous to formulate a shelf-life extender composition that incorporates two or more different modes of crosslinking. For example, in some embodiments, the shelf-life extender composition may be capable of crosslinking via two or more of: (i) interaction of a PMCA compound and active hydrogen groups (e.g., carboxyl groups), (ii) via carbon-carbon double bonds, (iii) via natural crosslinking compounds present in a plant extract included in the shelf-life extender composition, (iv) via purified or exogenous and/or synthetic crosslinking compounds (e.g., phenolic or polyphenol crosslinking compounds, preferably which are naturally occurring in plant materials such as ferulic acid, tannic acid, and the like optionally in combination with a suitable enzyme(s) to assist in crosslinking) and/or (iv) via crosslinking enzymes (e.g., transglutaminase) included in the shelf-life extender composition.

In some embodiments, amino and amide groups may be useful in forming covalent crosslinks via use of enzymes such as, for example, transglutaminase (e.g., food grade plant-derived or microbial-derived transglutaminase). Transglutaminase can form stable covalent linkages via transamidation reactions between compounds having a free amine group (e.g., a primary amine group present on a structural unit formed from lysine) and the amide group (—(C=O)NH$_2$) of structural units such as peptide structural units formed from glutamine. Thus, for example, transglutaminase may be used to self-crosslink a polypeptide, may be used to form crosslinks between two different types of polypeptides, and/or may be used to form crosslinks between a poly peptide and a non-polypeptide material such as, for example, a polysaccharide having amine functionality, preferably primary amine functionality (e.g., certain chitosans, alginate amines, dextran amines, hyaluronic acid, and the like). While not intending to be bound by theory, it may also be possible to use transglutaminase to form covalent linkages between a non-polypeptide material having pendant amide groups (e.g., amidated polysaccharides such as amidated pectin) and another material having amine groups, preferably primary amine groups (e.g., amine-functional polypeptides and/or polysaccharides).

In some embodiments, the shelf-life extender composition includes a fiber (e.g., a slender, elongate "thread-like" particle). Polysaccharide fibers such as, for example, fiber derived from psyllium are preferred such fibers. While not intending to be bound by theory, certain fibers, and especially certain organic fibers such a psyllium-derived fibers can help the treated plant item avoid dehydration and/or other water-related stresses. Preferably, such fibers are sufficiently small to avoid unsightly aesthetics issues when disposed on the surface of a treated plant item.

In some embodiments, the shelf-life extender composition. e.g., as delivered to a customer to minimize on shipping and/or storage costs, comprises a dry concentrate such as a powder (or other solid form such as a tablet(s) or pellets), which is preferably capable of being combined with a liquid carrier (e.g., any of the liquid carriers recited herein) to form a liquid composition, which may be sprayable. In some such embodiments, the powder or other solid is capable of being combined with an aqueous carrier liquid to form an aqueous coating composition, preferably a homogenous or substantially homogeneous aqueous coating composition. Such powder concentrates can be formed using any suitable method including, for example, combining powder ingredients or spray drying a liquid coating composition (e.g., an aqueous coating composition) to produce a powder.

As also disclosed herein, in some embodiments the shelf-life extender composition is provided as a liquid concentrate that users dilute with solvent (e.g., water and/or organic solvent such as ethanol) prior to application to live plant items.

In some embodiments, the coating composition is an emulsion such as, for example a so called "oil-in-water" emulsion or a "water-in-oil" emulsion, with oil in water being preferred due to cost and VOC considerations. Thus, for liquid coating composition embodiments, the continuous phase may be either organic-solvent-based or water-based. In some embodiments, the composition comprises a miniemulsion (preferably oil-in-water), which is also sometimes referred to as a nanoemulsion. The emulsion may also be modified to include a dispersant or colloid stabilizer (e.g., glycerol, lipid, lecithin, sodium lauryl sulfate, an oligosaccharide, a polysaccharide, etc.).

Treatments of the present disclosure are preferably capable of reducing the mass loss of treated live plant items over a commercially pertinent time period, and particularly unrooted plant cuttings for vegetative propagation and/or plant liners, or even cut flowers or edible plant items (e.g., culinary herbs and leafy greens in particular such as, e.g., spring greens). For example, coatings formed from compositions of the present disclosure preferably reduce the mass loss rate of a given live plant item (e.g., zonal geranium cuttings) by at by at least: 10%, 15%, 20%, 25%, 30%, 35%, 40%, 45%, 50%, 55%, 60%, 65%, 70%, 75%, 80%, 85%, or 90% or greater compared to untreated analogous live pant items. As used herein, the term "mass loss rate" refers to the rate at which the plant item loses mass (e.g., by releasing water and other volatile compounds). The mass loss rate is typically expressed as a percentage of the original mass per unit time (e.g., percent per day) and may be determined by weighing a coated plant item at different time points. Examples of pertinent time periods for assessing mass loss rate include just prior to coating (to establish a baseline mass for the uncoated plant item), immediately after coating and hardening of the shelf-life extender composition (to establish a baseline mass for the coated perishable item such that the hardened coating weight can be determined), 24 hours after coating, 48 hours after coating, 72 hours after coating, 96 hours after coating, 120 hours after coating, and 7 days after coating. The pertinent time periods for assessing moss loss rate may vary widely depending upon the particular perishable item coated. For plant cuttings such as, for example, zonal geraniums, convenient time points may include 48 hours, 72 hours, and 96 hours.

The final shelf-life extender composition, when applied as a liquid composition to at least a portion of an exterior surface of the plant item to be treated, preferably comprises at least at least 50, at least 60, at least 70, at least 80, at least 90, at least 95, or at least 99 wt-% of a liquid carrier, based on the total weight of the composition. The liquid carrier can be either an organic-solvent-based liquid carrier or an aqueous liquid carrier (optionally including one or more organic solvents which, if present, are preferably water-miscible), with aqueous liquid carriers being particularly preferred. Ethanol and methanol are examples of water-miscible organic solvents. In certain preferred embodiments, the shelf-life extender composition (e.g., the final as applied to the plant item or a shipped concentrate that is diluted prior to application) comprises at least 50, at least 60, at least 70, at least 80, at least 90, at least 95, or at least 99 wt-% of water, based on the total weight of the composition. In some such embodiments, the shelf-life extender composition (e.g., the final as applied to the plant item or a shipped concentrate that is diluted prior to application) is substantially free of organic solvent (e.g., includes less than 5 wt-%, less than 2 wt-%, less than 1 wt-%, or less than 0.1 wt-%, if any, organic solvent).

In preferred embodiments, the shelf-life extender composition is a liquid composition that, prior to application on the plant item, includes at least 0.05, least 0.1, at least 0.15, at least 0.2, at least 0.25, at least 0.35, at least 0.5 wt-%, at least 0.75 wt-%, or at least 1.0 wt-% of total solids, based on the total weight of the final composition. The maximum total solids of such liquid compositions, as applied, is not particularly restricted, although typically the total solids is less than 5, less than 4, less than 3, less than 2, less than 1, less than 0.75, or less than 0.50 wt-%, based on the total weight of the coating composition. The total solids can vary from embodiment-to-embodiment based on a variety of factors including, for example, the particular organic binder component being employed, the type of plant item to be treated, the conditions the treated plant item will be subjected to, cost, the desired level of performance, and the like. In embodiments in which the shelf-life extender composition is a liquid concentrate that is diluted prior to application, the liquid concentrate preferably includes a sufficient amount of total solids to yield a final liquid shelf-life extender composition (after dilution with solvent (e.g., water) such as, e.g., 2-, 5-, 10-, 20- or 50-fold dilution) having a total solids as described above.

As will be appreciated by persons having ordinary skill in the art, the amount of total solids in a component or composition may be calculated based on the amount of starting material(s) employed and the amount of solids in the starting material(s). The amount of solids (or non-volatiles) in starting materials is typically provided by the manufacturer and/or supplier of the material in, for example, a technical data sheet (TDS). If for some reason a reliable calculation is not possible, standard test methods for determining solids and volatile content are well known in the art. An example of such a standard test method is ASTM D2369-20. Care should be exercised in the event a composition includes a sensitive material that chars in the test conditions (e.g., certain sensitive biopolymers). In such situations, appropriate adjustments may need to be made such as, for example, use of a modified temperature to remove volatiles that avoids charring.

The shelf-life extender composition of the present disclosure may function to reduce the amount of humidity generated by treated (e.g., coated) live plant items during storage. The term "storage" is used broadly herein, and includes also any time the treated live plant item is in transit during shipping. In storage, such coated plant items will typically be stored in close proximity to one another such as, for example, in filled bags, boxes, bins, crates or other storage or shipping containers. Certain preferred hardened or at least partially hardened coatings of the present disclosure are capable of reducing the humidity generated during storage by at least: 1%, 2%, 3%, 4%, 5%, 10%, 15%, 20%, 25%, 30%, 35%, 40%, 45%, 50%, 55%, 60%, 65%, 70%, 75%, 80%, 85%, or 90% compared to untreated analogous plant items. Thus, for example, plant items coated with preferred hardened or at least partially hardened shelf-life extender compositions of the present disclosure may exhibit a reduced respiration rate relative to analogous uncoated plant items.

In preferred embodiments, the coating composition of the present disclosure reduces the rate of leaf yellowing (e.g., for zonal geranium cuttings or liners) during one or both of (i) storage (as the term is used in the preceding paragraph) or (ii) after sticking of a treated plant cutting or planting of a treated plant linter. Certain preferred hardened or at least partially hardened coatings of the present disclosure are capable of reducing leaf yellowing (e.g., when used to coat zonal geranium cuttings or liners) during (i) and/or (ii) by at least: 1%, 2%, 3%, 4%, 5%, 10%, 15%, 20%, 25%, 30%, 35%, 40%, 45%, 50%, 55%, 60%, 65%, 70%, 75%, 80%, 85%, or 90% compared to untreated analogous plant items—thereby reducing the number of yellowed leaves that require removal, as well as the potential for problematic fungal issues.

In some embodiments, the shelf-life extender composition when hardened or at least partially hardened exhibits a contact angle with deionized water (disposed on a surface of the hardened coating) of greater than about 80, preferably greater than about 90, more preferably greater than about 95, and even more preferably greater than about 100.

Liquid shelf-life extender compositions of the present disclosure can exhibit any suitable contact angle for a given live plant item to be coated. To suitably wet out certain live plant item substrates, the liquid shelf-life extender composition preferably exhibits a contact angle of less than about 80, less than about 70, less than about 65, less than about 60, less than about 55, less than about 50, less than about 45, or less than about 40, when disposed on a surface of carnauba wax. Similarly, in some embodiments, the liquid composition preferably exhibits a contact angle of less than about 80, less than about 70, less than about 65, less than about 60, less than about 55, less than about 50, less than about 45, or less than about 40, when disposed on a surface of paraffin wax. Similarly, in some embodiments, the liquid composition preferably exhibits a contact angle of less than about 80, less than about 70, less than about 65, less than about 60, less than about 55, less than about 50, less than about 45, less than about 40, or less than about 35, when disposed on a surface of candelilla wax.

Unrooted plant cuttings for vegetative propagation and plant liners can suffer from similar shelf-life shortening and quality degradative processes, especially during shipping, including, for example, mass loss, biotic stressors (especially fungus-related), dehydration, carbohydrate loss, and ethylene-mediated processes. The use of coatings and/or other treatments on live plant items may also, for example, allow the items to be shipped and/or stored at higher temperatures without unsuitably degrading. Alternatively, or additionally, the use of coatings and/or other treatments may also extend the shelf-life and/or enhance quality under a given set of conditions, thereby enabling more flexibility in the supply chain and/or reduced waste loss. In the case of cut flowers, the longer shelf-life may allow for a longer potential display time for the end consumer. As for plant cuttings, the longer shelf-life may allow for additional storage time before sticking, which may be especially valuable at high production times of year when plant cutting inventories are high and transportation, labor, or planting resources are constrained. Alternatively, or additionally, the use of coatings on plant cuttings and cut flowers may also reduce the need for plastic packaging, such as bags or wraps, for packing purposes during shipment, thereby reducing the amount of plastic consumed in the supply chain. In addition, for plant cuttings, it is believed that applied compositions of the present disclosure can help reduce transport-related quality issues such as, for example, the occurrence of leaf browning or yellowing (especially lower leaf yellowing/browning) or fungal infection, and may increase the rate of root growth and/or reduce the time to achieve a salable plant item.

Plant cuttings are extensively used for vegetative reproduction (i.e., asexual reproduction resulting in genetically identical progenitor plants) of both annuals and perennials in the ornamental plant supply chain. The cuttings are plant portions removed from an existing plant and subsequently rooted to form a new plant. Examples of plant cuttings that may benefit from compositions of the present disclosure include stem cuttings and leaf cuttings, with stem cuttings (sometimes also referred to as tip cuttings) being more prevalent in the horticulture supply chain. The size of stem cutting can vary based on the plant species, but typically stem cuttings include a stem portion with a basal cut end and a plurality of leaves attached to the stem cutting, typically two or more, three or more, or four or more leaves (e.g., two or more leaf pairs).

The process of planting the plant cutting to produce a new plant is often referred to as "sticking" and entails placing at least a portion of the plant cutting such as a cut stem end in cultivation media to facilitate root growth. Examples of suitable cultivation media may include a soil block, a soil cube, rock wool, flower soil, or combinations thereof. Depending on the plant species, stem cuttings typically root via a cut stem end or a node on the stem. Examples of ornamental plants routinely grown from plant cuttings (typically stem cuttings unless noted otherwise) that may benefit from the shelf-life extender compositions of the present disclosure include *Aster*, Boxwood, Chrysanthemums, Poinsettias, *Lantana, Bracteantha, Calibrachoa, Dahlia, Dipladenia*, Heliotrope, Geraniums, *Pelargonium, Mandevilla, Argyranthemum, Lavandula, Aubrieta, Verbena, Impatiens, Vinca, Lobelia, Nemesia, Diascia, Osteospermum, Penstemon, Scaevola*, Ivies, Authurium, *Kalanchoe*, Roses, Callus, Carnations, *Petunia*, certain cactus (e.g., crab cactus propagated by leaf cutting), certain conifers propagated by leaf cutting, and the like. Preferred treatments of the present disclosure are particularly useful for extending the shelf-life of germanium plant cuttings and germanium plant linings, including zonal geraniums, interspecific geraniums, and peltatum geraniums (also referred to as "ivy" geraniums). Zonal geraniums in particular, and especially zonal geraniums with lighter colored foliage and/or certain flower colors (e.g., white, pink, salmon, and purple) which can be especially sensitive, can particularly benefit from preferred shelf-life extender coating compositions of the present disclosure.

Examples of other plants grown from plant cuttings that may also benefit from the compositions of the present disclosure include herbs (e.g., culinary herbs such as rosemary, basil, oregano, terragon, mint, sage, thyme, stevia, etc.), tea plants, coffee plants, sugar cane, and *Cannabis* plants. It is also contemplated that certain edible coatings of the coatings may have utility in preserving the shelf-life of products for human consumption, including edible greens such as, for examples, lettuce (e.g., spring greens, arugula, butter lettuce, romaine, iceberg, green loose leaf, red loose leaf, etc.), culinary herbs (e.g., rosemary, basil, oregano, terragon, mint, sage, thyme, stevia, etc.), leafy greens (e.g., spinach, collard greens, swiss chard, etc.), and the like.

As described herein, plant cuttings or plant liners (i.e., rooted planted cuttings) for vegetative propagation that are sensitive to degradation during, for example, shipping can especially benefit from preferred shelf-life extender compositions of the present disclosure. Geraniums, and zonal geraniums in particular, are examples of such sensitive plants. The size and nature of plant cuttings and plant liners can vary widely depending upon the particular plant type. While some plant cuttings and liners may have flowers, typically they are free of flowers. Some plant cuttings or plant liners do not have any leaves, although typically plant liners include one or more leaves, and typically a plurally of leaves (e.g., two or more, three or more, or four or more leaves).

Treated plant cuttings or plant liners may have any suitably number of internodes. In some embodiments, such as for example with geraniums, the plant cuttings preferably have one to four internodes. Depending on the plant variety, the plant cuttings may be either an apical cutting or an internode cutting. While in some embodiments the plant cutting that is at least partially coated includes a woody stem, frequently the plant cutting does not include any wood stem.

Treated plant cuttings or plant liners may have any suitable number of expanded leaves. In some embodiments (e.g., as is typically the case for geraniums), the plant cuttings include no more than four expanded leaves, no more the three expanded leaves, or no more than two expanded leaves.

The below table provides preferred cutting specifications for interspecific, zonal, and peltatum geranium cuttings representative of those commonly used in the geranium cuttings supply chain. The numbers in the far-left column correspond to the feature numbers in FIG. 1, which shows a photograph of a geranium cutting (not necessarily to size as depicted). The maximum total length (5) shown in FIG. 1 is not referenced in the below table. As shown in FIG. 1, a measuring grid (e.g., with one-centimeter-sized squares) can be used to determine that maximum total length of a cutting, with the cutting positioned relative to the grid to achieve the maximum straight-line distance between the cut basal end and the furthest distal end portion of the cutting, which in the case of the geranium cutting shown in FIG. 1 is an outermost leaf edge. For other cuttings (e.g., internode cuttings), the furthest distal end portion of the cutting may be another cut end. The geranium cutting shown in FIG. 1 has a sticking stem length somewhat longer than the preferred sticking stem length (2) referenced in the below table.

| # | Preferred Geranium Cutting Parameters | Inter-specific | Zonal | Peltatum |
|---|---|---|---|---|
| 1 | Cutting length (Stem base to top of meristem tip, excluding leaves) | 2-4 cm | 2-3 cm | 2-5 cm |
| 2 | Sticking Stem (the length of the stem, the part without leaves to the bottom petiole) | at least 1 about cm, preferably 1.0-1.5 cm | | |
| | # internodes | 1-4 | | |
| | # of expanded leaves | 1-2 | | |
| 3 | Maximum leaf width | 2.5-7 cm | | |
| 4 | Maximum petiole length | 2-7 cm | | |
| | Buds present (peduncle longer than 1 cm) | None | | |

In some embodiments, the plant cutting that is coated includes a meristem. In some such embodiments, the plant cutting (e.g., a geranium) that is at least partially coated has a cutting length, as defined from the cut stem base end to the top of the meristem tip and excluding any leaf lengths, of at least about 1.5, at least about 2, or at least about 2.5 centimeters. While the maximum size of such plant cuttings can vary significantly depending upon the plant species, typically the plant cutting has a cutting length, as defined from the cut stem base end to the top of the meristem tip and excluding any leaf lengths, of less than about 20, less than about 10, less than about 5, less than about 4, or less than about 3 centimeters.

For some cuttings, such as, for example, internode cuttings, the plant cutting may not include a meristem. Regardless of whether the plant cutting includes a mersitem, typically the maximum total length of a plant cutting (i.e., the maximum straight-line distance between the cut basal end and the furthest distal end portion of the cutting) will be less than about 40, less than about 30, less than about 20, less than about 10, or less than about 7 centimeters.

To enable sticking in growth media, typically plant cuttings of the present disclosure will have a sticking stem length of at least about 1 centimeter. That is, typically the plant cutting will have a stem length between the basal cut end and attachment point of a first leaf (if present) of at least about 1 centimeter.

Any suitable portion(s) of the live plant items (e.g., plant cuttings, plant liners or cut flowers) may be coated, and/or otherwise treated, with compositions of the present disclosure. For example, all or substantially all of the surfaces of the live plant items may be coated, or only a portion or portions thereof. Typically, application of the shelf-life extender composition occurs after harvesting the live plant item, but in some embodiments it may occur prior to harvest. In some embodiments, it may be desirable to just coat the cut portion of the plant cutting or cut flowers (e.g., basal cut stem) and adjacent surfaces to minimize mass loss through the cut surfaces. Such partial coating may, for example, reduce coating costs and/or minimize or eliminate the chances of the composition damaging the leaves or flowers and/or detracting from plant aesthetics. In some such embodiments, all or substantially all of the stem portion, including the cut stem end, is coated.

In some embodiments, it may be advantageous to remove at least some of the applied coating at any suitable point in the supply chain such as, for example, prior to or after sticking treated plant cuttings in cultivating media or prior to or after selling the cut flowers to consumers. While not intending to be bound by theory, in the case of cut flowers or plant stem cuttings, in some embodiments it may be advantageous to remove the coating applied over the cut stem end to encourage one or both of rooting or water and nutrient uptake. In some embodiments, it may be advantageous to remove at least a portion of the coating (e.g., at least 0.1%, at least 1%, at least 5%, at least 10%, at least 20%, at least 30%, at least 40%, at least 50%, at least 60%, at least 70%, at last 80%, at least 90%, at least 95%, or at least 99%) after shipping of the plant cutting, plant liner, or cut flowers. The coating removal may be done manually or via one or more steps in an automated process. For example, at least a portion of the coating overlying a stem node or a cut end may be removed (e.g., selectively removed while leaving other coating portions intact) to encourage root growth and nutrient and water uptake. The partial, substantially complete, or complete coating removal may be accomplished by any suitable means, including washing or dissolving off coating material, mechanical removal of coating material such as, for example, via abrasive forces, cutting away at least a portion of coated plant tissue to expose uncoated tissue (e.g., cutting off the coated stem end to expose a fresh cut stem portion), or a combination thereof. In automated sticking processes for plant cuttings, such as, for example, accomplished via use of automated equipment manufactured by ISO Group of Gameren. Netherlands, one or more such coating removal steps may be incorporated into the automation process used to process and stick paint cuttings. (See, for example, the "Cutting Planter" line of equipment from ISO Group such as the ISO Cutting Planter 2500, ISO Cutting and Planting 1800, and ISO Cutting Planter 4000, and the plant cutting processing automation equipment and methods disclosed in U.S. Pat. No. 9,907,235 (Struijk et at.)). One or more coating removal steps or modules may, for example, be engineered into the automation process of new generations of such equipment. Or, alternatively, a manual or automated coating removal process or module may be placed upstream of such existing automation equipment, with the input into such automation equipment being plant cuttings that already have at least a portion of the coating removed.

In certain preferred embodiments, no portions of the coating are removed prior to sticking of a plant cutting. For example, in such embodiments, either the cut end is not coated or not entirely coated, the coating breaks down (e.g., cracks or dissolves) sufficiently fast to allow for rooting after sticking, and/or roots are capable of growing through the coating.

The shelf-life extender compositions for use with plant cuttings, plant liners, or cut flowers may have any suitable degree of hydrophobicity or hydrophilicity. In some embodiments, it may be advantageous for the coating to be hydrophilic. In such embodiments, the shelf-life extender composition may include one or more hydrophilic polysaccharides and/or polypeptides such as, for example, pectin, and may exhibit a contact angle, when hardened, with deionized water of less than 90°, less than 85°, less than 80°, less than 75°, less than 70°, less than 65°, or less than 60°. While not intending to be bound by theory, it is believed the use of such coatings including one or more hydrophilic materials may facilitate washing off of the coating or facilitate water-uptake and/or rooting without the need for any coating removal steps.

In some embodiments, the compositions of the present disclosure may include one or more additives to enhance flower color, leaf color, gloss, and combinations thereof. In some embodiments in which at least a portion of the shelf-life extender composition is to be removed, it may be advantageous to include an amount of pigment or colorant or other additive to allow for easy visual detection of portions of the plant cutting or cut flower that have been coated to facilitate efficient coating removal. In other embodiments, the shelf-life extender composition is appreciably clear such that detection of coated plant portions to the unaided human eye is difficult, with some such coating embodiments exhibiting a gloss that is substantially similar to that exhibited by the leaf prior to coating.

For plant cuttings, plant liners, and cut flowers particularly sensitive to leaf discoloration due to ethylene such as, for example, geraniums, it may be particularly advantageous to include an efficacious amount of ethylene inhibitor to reduce the occurrence and/or extent of leaf yellowing/browning. Any of the ethylene inhibitors disclosed herein (e.g., later herein in the Exemplar embodiments) may be used alone or in combination in the compositions of the present disclosure, and especially substituted cyclopropane compounds such as 1-methylcyclopropene, or "1-MCP", which may optionally be complexed and/or encapsulated. When used, the ethylene inhibitor(s) are preferably present in the shelf-life extender composition in an efficacious amount sufficient to delay leaf yellowing (e.g., as compared relative to an analogous treated plant item with an otherwise identical composition lacking the ethylene inhibitor). The concentration can vary widely, but a suitable amount of one or more ethylene inhibitors may be at least 0.1 ppm, at least 1 ppm, at least 10 ppm, at least 20 ppm, at least 50 ppm, at least 100 ppm, at least 500 ppm, at least 1,000 ppm, at least 2,000 ppm, at least 3,000 ppm, at least 5,000 ppm, or at least 10,000 ppm of ethylene inhibitor, based on the total weight of the shelf-life extender composition.

In addition to ethylene-mediated damage, respiration-related issues involving the consumption of carbohydrates (e.g., relating to plant cutting temperature being too high during shipping or storage) may also lead to leaf yellowing, and especially lower leaf yellowing, in species such as geraniums. Thus, in some embodiments, it may be useful to include a plant energy source in the composition of the present disclosure. The one or more plant energy source is preferably a carbohydrate of a form suitable for plant cells to convert into energy and may comprise, for example, glucose, trehalose, sucrose, fructose, mannitol, honey and/or honey extract, or a mixture thereof. The shelf-life extender composition may additionally, or alternatively, include one or more plant hormones (e.g., one or more plant growth regulators) in an amount efficacious to reduce such issues such as, for example, benzyladenine, gibberellins (e.g., gibberellin acid such as gibberellin acid A4 and/or A7), cytokinins (e.g., kinetin), abscisic acid, salts or derivatives thereof, or combinations thereof. A suitable combination of plant regulators (e.g., for reducing yellowing of geranium cuttings and other cuttings) is commercially available under the tradename FASCINATION by Valent Biosciences LLC of Libertyville, Illinois, USA. The FASCINATION product may be incorporated into the shelf-life extender composition at any suitable combination such as, for example, about 0.1 to 50 ppm, or about 1 to 20 ppm, or about 2 to 2.5 ppm. See also e.g., U.S. Pat. No. 9,295,253, which describes compositions of abscisic acid (ABA) or salts thereof for reducing leaf yellowing in certain ornamental plants.

The shelf-life extender composition may include one or more optional additives selected from an emulsifier, a colorant, a pigment, a gloss additive, a rheology modifier, a filler, an anti-foaming agent, a crosslinker, or a rooting compound. Although it is contemplated that a rooting hormone may optionally be included, in some embodiments, the shelf-life extender composition does not include a rooting hormone (e.g., auxin or an auxin derivative).

To facilitate efficient application to substrate, the shelf-life extender composition is typically in liquid form when applied to live plant item to be protected. Any suitable liquid carrier can be used, although water-based shelf-life extender compositions are preferred due, at least in part, to cost and ease of handling and application. It can optionally be provided in dry form (e.g., powder, other particulates, and/or or tablet forms) and combined with liquid carrier to form a liquid coating composition prior to application to the live plant items. It is also contemplated that the live plant item to be protected could be coated with powder (e.g., free flowing finely-divided powder) and the liquid shelf-life extender composition formed in situ on the perishable item via, for example, endogenous water present on or in the plant item and/or subsequently applied liquid carrier (e.g., misted water, ethanol, or mixtures thereof). Alternatively, to reduce shipping and storage costs prior to application, the shelf-life extender composition can also be provided as a liquid concentrate that is diluted prior to use via addition of liquid carrier (e.g., water).

Preferably, the shelf-life extender composition, when present as a dried coating on live plant items, will not be visually perceptible to typical persons that are not already aware the plant items have been coated, via one or more, and preferably all, pertinent senses (i.e., appearance, touch, and smell). Thus, the shelf-life extender compositions are preferably clear, or substantially clear, so as not to negatively affect perceptions regarding the quality of the coated item. Alternatively, if the coating is not clear or substantially clear, it should preferably have an appearance that is substantially matched (e.g., in terms of color, gloss and/or sheen) to the substrate surface on which it is was applied. Similarly, coatings formed from the shelf-life extender compositions are preferably not overly tacky or slippery, but rather, preferably have a tactile surface feel that is similar to the substrate surface prior to coating.

In some embodiments, at least a portion of the plant cutting may be coated before or after placing the plant cuttings in a plant cutting strip holder to facilitate automated processes for processing and/or sticking plant cuttings. See, e.g., the plant cutting holding strips sold under the tradename AutoStix, which are available in sizes capable of holding 34 and 51 plant cutting, from Visser of Gravendeel. Netherlands, as well as the automated equipment available from Visser for processing and/or sticking planting cuttings using AutoStix plant cutting holding strips. See also, for example, the plant cutting strip holders disclosed in WO00/52996 (Van Tol et al.)

In some embodiments, the shelf-life extender composition may be applied to at least a portion of a plant (e.g., the portions to be harvested as cuttings) before harvesting one or more plant cuttings or cut flowers from the plant. The shelf-life extender composition may be applied (e.g., via spraying) just prior to harvesting the plant cutting or cut flower, or may be applied (e.g., via spraying) sufficiently before cutting to allow for drying of the composition prior to harvest. For example, application of the shelf-life extender to the progenitor plant prior to harvest can be applied via a hand held-sprayer or using installed spray equipment (e.g., installed spray or misting equipment, such as over-head equipment, present in a greenhouse or agricultural field). When applied prior to harvest, the shelf-life extender composition is preferably applied within 72 hours, within 48 hours, within 12 hour, or within 6 hours of harvest. Alternatively, the plant cutting or cut flower may be dipped (e.g., partially or fully), sprayed (e.g., partially or fully), or otherwise coated with the composition after harvest (e.g., immediately after harvest) in a manual or automated process. In some embodiments, the plant cuttings, plant liners, or cut flowers are sprayed in a plastic bag or other container used to facilitate shipping of the harvested product. Such post-harvest application of the shelf-life extender composition preferably occurs within 24 hours, within 12 hours, within 6 hours, within 3 hours, within 2 hours, within 1 hour, within 30 minutes, within 20 minute, within 10 minutes, within 5 minutes, or within 1 minute of harvest.

Any suitable portion(s) of the live plant items can be treated and/or coated with the shelf-life extender composition of the present disclosure. For example, the shelf-life extender composition may be applied to more than 10%, more than 20%, more than 30%, more than 40%, more than 50% more than 60%, more than 70%, more than 80%, more than 90%, or all of the total surface area and/or the maximum total length of the plant cutting or plant liner (i.e., the above-ground portion of the plant liner). In some embodiments, one or both of the following are satisfied: (i) at least the portion of the plant item distal from the basal end (e.g., an apical portion distal from the cut end or roots) has been coated with the shelf-life extender composition or (ii) at least the cut end of the plant cutting has been coated with the shelf-life extender composition. In presently preferred embodiments, the shelf-life extender composition is applied to all, or substantially all, of the exposed surfaces of a live plant item.

In preferred embodiments, no expensive and/or specialized treatment equipment is required to apply the shelf-life extender compositions of the present disclosure. This is in contrast, for example, to complex treatment procedures that require expensive specialty equipment to, for example, create pores in the outer wall of a plant item (e.g., via application of a sufficiently strong pulsed electric field) to enable an impregnation solution to impregnate the interior of the plant item using vacuum impregnation equipment. Rather, presently preferred application methods of the present disclosure occur under ambient pressure conditions and do not require application of a pulsed electric field or other electric field to effect treatment.

In some embodiments, the live plant item (e.g., plant cutting) is sanitized prior to or after application of the shelf-life extender composition (e.g., via application of ultraviolet light, electron beam, high-voltage cold plasma, and the like).

In preferred embodiments, the shelf-life extender composition is surface deposited on the live plant item, and wherein preferably 50% or more, 60% or more, 70% or more, 80% or more, 90% or more, 95% or more, 96% or more, 97% or more, 98% or more, 99% or more, or 99.9% by weight or more of the total solids weight of the shelf-life extender composition is present on a surface of the treated live plant item (as opposed, e.g., to shelf-life extender composition within the interior cells of the live plant item). In preferred embodiments, a plurality of treated plant cuttings and/or treated plant liners are packaged together for shipping in a container. To minimize shipping costs, typically the treated plant items are densely packed. The treated plant items may be oriented in any suitable direction, but are typically packed in a vertical orientation. The shelf-life extender composition can be applied to the plant items prior to, during, or after the plant items are packaged. In some embodiments, the coated plant cuttings are transported in plastic bags, which may include perforations or apertures or other features to allow for air exchange with the environment outside the bag, with a multitude of coated plant cuttings located in a given plastic bag or other packaging container (e.g., 10 or more, 20 or more, 50 or more, 75 or more, or 100 or more coated plant cuttings). Plastic bags that are recyclable, compostable, and/or made from biosourced materials are particularly preferred. The coated plant cuttings are preferably capable of being stored in such bags under ambient conditions (e.g., room temperature) for at least 24 hours, at least 48 hour, at least 72 hours, at least % hours, at least 120 hours, at least 144 hours, or 168 hours or more without appreciably discoloring. A plurality of such plastic bags (e.g., 5 or more, 10 or more, 15 or more, and so on) may be packed in a container (e.g., a box) for shipping. In some embodiments, the shipping container may optionally further include one or both (i) of an ethylene inhibitor component (e.g., a sachet, pouch, capsule, pad, or the like including 1-MCP or another ethylene inhibitor) that is separate from the shelf-life extender composition or (ii) a cooling pack (e.g., an ice pack or gel pack). In some embodiments, however, the shelf-life extender compositions may render unnecessary one or both of the aforementioned (i) and (ii), thereby avoiding the cost associated therewith. Moreover, while not intending to be bound by theory, the use of substituted cyclopropane ethylene inhibitors such as 1-MCP may cause downstream problems (e.g., after sticking of cuttings) due to ethylene receptor sites remaining blocked.

Preferred shelf-life extender compositions of the present disclosure, when applied to a zonal geranium plant cutting (e.g., using any of the methods disclosed herein) reduce (e.g., by at least 5%, at last 10%, at least 25%, at least 50%, or at least 75%) or eliminate the occurrence of fungal infections by one or more of the *Botrytis* genus (e.g., *Botrytis cinerea*).

In commerce, a first party that manufactures shelf-life extender compositions may not directly treat a live plant item with a composition, but may instead direct a second party (e.g., a source plant grower) to apply composition to a live plant item (e.g., by marketing the composition for such use and selling the composition to the second party). That is, even if the first party does not treat a live plant item pursuant to the methods and compositions described herein, the first party may still cause a composition of the present disclosure to be applied to a live plant item (e.g., a plant cutting, plant liner, or cut flower) by providing instructions or recommendations as described above, including, for example, by marketing the composition for such use. Such instructions or recommendations, even if limited only to a marketing suggestion to use the composition to coat or otherwise treat live plant items, is considered to cause the composition to be used to coat or treat the live plant items.

In some embodiments, the methods, compositions, and/or equipment of the present disclosure may be used to achieve a more standard and/or desired visual appearance across a run of treated cuttings. For example, a coating composition including a particular amount of dye and/or colorant may be applied to produce a treated plant cutting lot (or plant liner lot) with less variation in visual appearance across individual plant cuttings and/or an overall more desirable appearance on average for individual plant cuttings.

Exemplary Embodiments

Embodiment 1 is a plant cutting or plant liner shelf-life extender composition (or alternatively a cut flower shelf-life extender composition) comprising at least one of:
  (i) an organic binder component preferably comprising one or more of an organic water-barrier material or an organic water-donating material, or
  (ii) an additive selected from one or more of an antimicrobial agent, a plant growth regulator, a plant energy source, an ethylene inhibitor, a nitrogen-containing compound, an inorganic plant nutrient (e.g., an inorganic essential nutrient), or a combination thereof.

Embodiment 2 is a treated live plant item comprising a plant cutting or a plant liner (or alternatively a cut flower) that preferably includes one or more leaves, wherein at least a portion of the surface of the plant item has deposited thereon an exogenous shelf-life extender composition comprising at least one of:
  (i) an organic binder component preferably comprising one or more of an organic water-barrier material or an organic water-donating material, or
  (ii) an additive preferably selected from one or more of an antimicrobial agent, a plant growth regulator, a plant energy source, an ethylene inhibitor, a nitrogen-containing compound, an inorganic plant nutrient (e.g., an inorganic essential nutrient), or a combination thereof.

Embodiment 3 is a plant cutting or plant liner shelf-life extender kit (or alternatively a cut flower shelf-extender kit) comprising:
  a liquid shelf-life extender composition (preferably of embodiment 1) or a liquid concentrate or a dry concentrate (e.g., a powder or tablet preferably of the composition of embodiment 1) for combining with solvent (e.g., water and/or organic solvent such as, e.g., ethanol) to form a liquid shelf-life extender composition;
  optionally, instructions for preparing the liquid shelf-life extender composition from the dry or liquid concentrate;
  instructions for applying the liquid shelf-life extender composition on a live plant item comprising a plant cutting or a plant liner (or alternatively a cut flower), preferably prior to shipping of the plant cutting or plant liner, and optionally, a container (e.g., a bottle, bag, pouch, or other container).

Embodiment 4 is a method comprising:

applying a shelf-life extender composition (preferably of embodiment 1) on at least a portion of a live plant item, preferably not under vacuum, more preferably under atmospheric pressure conditions, such that the composition is surface deposited thereon, wherein the live plant item comprises (a) an unrooted plant cutting prior to or after harvest of the plant cutting from a progenitor plant or (b) a plant liner (i.e., a rooted plant cutting);

packaging the live plant item for shipping; and preferably causing the packaged live plant item to be shipped (e.g., via air transport, typically non-refrigerated air transport; or truck, which may or may not be a refrigerated truck) to a grower to grow the plant cutting or plant liner.

Embodiment 5 is the method of embodiment 4, wherein application of the shelf-life extender composition to the live plant item occurs prior to packaging for shipping.

Embodiment 6 is the method of embodiment 4, wherein application of the shelf-life extender to the live plant item occurs during packaging and/or after packaging but before shipping.

Embodiment 7 is the method of any of embodiments 4 to 6, wherein the live plant item comprises a plant cutting, and wherein the method further comprises removing (e.g., via cutting) a portion off of the progenitor plant to form the plant cutting.

Embodiment 8 is a method comprising:

providing a shelf-life extender composition, preferably of embodiment 1; and causing the shelf-life extender composition to be applied on a live plant item comprising (a) a plant cutting (or alternatively a cut flower) prior to or after harvest of the plant cutting (or cut flower) from a progenitor plant or (b) a plant liner.

Embodiment 9 is the method of embodiment 8, wherein the shelf-life extender composition is caused: (i) to be applied to the live plant item prior to harvest of the plant cutting (or cut flower), preferably within 72 hours, within 48 hours, within 12 hour, or within 6 hours of cutting harvest or (ii) to be applied to the live plant item after harvest of the plant cutting (or cut flower), preferably within 24 hours, within 12 hours, within 6 hours, within 3 hours, within 2 hours, within 1 hour, within 30 minutes, within 20 minute, within 10 minutes, within 5 minutes, or within 1 minute of harvest.

Embodiment 10 is a method comprising:

receiving (e.g., after air and/or truck transport, which may or may not be refrigerated transport) a packaged treated live plant item (typically a treated unrooted plant cutting) having a shelf-life extender composition applied (e.g., coated) on at least a portion thereof;

planting the treated live plant item in growing medium (e.g., soil, foam, rock wool, peat moss, peat-blocks or plugs). (In some embodiments, the unrooted plant cutting is planted (i.e., "stuck") in growing media two or more days, three or more days, for or more days, five or more days, six or more days, or seven or more days after treatment with the shelf-life extender composition.)

Embodiment 11 is the method of embodiment 10, wherein the treated live plant item is an unrooted plant cutting.

Embodiment 12 is the kit or method of any of embodiments 3 to 11, wherein the shelf-life extender composition is the composition of embodiment 1.

Embodiment 13 is the composition, treated live plant item, kit, or method of any of embodiments 1 to 12, wherein the organic binder component is present in the shelf-life extender composition.

Embodiment 14 is the composition, treated live plant item, kit, or method of any of embodiments 1 to 13, wherein the additive is present alone or in combination with the organic binder component.

Embodiment 15 is the composition, treated live plant item, kit, or method of embodiment 14, wherein the additive comprises one or more active ingredients, and wherein the one or more active ingredients are preferably present in an efficacious amount (e.g., an amount sufficient for the shelf-life extender composition to exhibit activity with respect to the treated plant item attributable to the active ingredient).

Embodiment 16 is the composition, treated live plant item, kit, or method of embodiment 14 or 15, wherein the additive is selected from one or more, two or more, three or more, four or more, or all of an antimicrobial agent, a plant growth regulator, a plant energy source, an ethylene inhibitor, a nitrogen-containing compound, or an inorganic plant nutrient.

Embodiment 17 is the composition, treated live plant item, kit, or method of any of embodiments 1 to 16, wherein the shelf-life extender composition is a liquid composition (or, alternatively, for embodiment 2 an at least partially dried, or fully dried, composition (e.g., coating) formed from a liquid composition).

Embodiment 18 is the treated live plant item, kit, or method of any of embodiments 2 to 17, wherein the plant item includes one or more leaves, more preferably a plurality of leaves.

Embodiment 19 is the treated live plant item, kit, or method of any of embodiments 2 to 18, wherein the plant item does not include any flowers.

Embodiment 20 is the treated live plant item, kit, or method of any of embodiments 2 to 19, wherein the plant item comprises a plant cutting (e.g., an apical cutting or an internode cutting).

Embodiment 21 is the treated live plant item, kit, or method of any of embodiments 2 to 20, wherein the plant item includes one to four internodes.

Embodiment 22 is the treated live plant item, kit, or method of any of embodiments 2 to 21, wherein the plant item includes no more than four expanded leaves, no more the three expanded leaves, or no more than two expanded leaves.

Embodiment 23 is the treated live plant item, kit, or method of any of embodiments 2 to 22, wherein the plant item includes a meristem.

Embodiment 24 is the treated live plant item, kit, or method of embodiment 23, wherein the plant item is a plant cutting having a total cutting length, as defined from a cut stem base end to the top of a meristem tip and excluding any leaf lengths, of less than 20, less than 10, less than 5, less than 4, or less than 3 centimeters.

Embodiment 25 is the treated live plant item, kit, or method of embodiment 23 or 24, wherein the plant item is a plant cutting that has a total cutting length, as defined from the cut stem base end to the top of the meristem tip and excluding any leaf lengths, of at least 1.5, at least 2, or at least 2.5 centimeters.

Embodiment 26 is the treated live plant item, kit, or method of any of embodiments 2 to 25, wherein the plant item does not include any woody stem.

Embodiment 27 is the treated live plant item, kit, or method of any of embodiments 2 to 26, wherein the live plant item is a plant cutting that includes one or more leaves and has a sticking stem length (i.e., the distance along the stem between the cut end and the petiole of the first leaf proximate to the cut end) that is less than 10, less than 5, less than 3, less than 2, or less than 1.5 centimeters.

Embodiment 28 is the treated live plant item, kit, or method of any of embodiments 2 to 27, wherein the plant item is a plant cutting and the sticking stem length is at least 1 centimeter.

Embodiment 29 is the treated live plant item, kit, or method of any of embodiments 2 to 28, wherein the plant cutting or plant liner is an annual.

Embodiment 30 is the treated live plant item, kit, or method of any of embodiments 2 to 28, wherein the plant cutting or plant liner is a perennial.

Embodiment 31 is the treated live plant item, kit, or method of any of embodiments 2 to 30, wherein the plant cutting or plant liner comprises a cutting or liner selected from: an *Aster*, a Boxwood, a Chrysanthemums, a Poinsettia, a *Lantana*, a *Bracteantha*, a *Calibrachoa*, a *Dahlia*, a *Dipladenia*, a Heliotrope, a *Pelargonium* (or geranium), a *Mandevilla*, an *Argyranthemum*, a *Lavandula*, an *Aubrieta*, a *Verbena*, an *Impatiens*, a *Vinca*, a *Lobelia*, a *Nemesia*, a *Diascia*, an *Osteospermum*, a *Penstemon*, a *Scaevola*, an Ivy, an Authurium, a *Kalanchoe*, a Rose, a Callus, a Carnation, a *Petunia*, a cactus, a conifer, or the like.

Embodiment 32 is the treated live plant item, kit, or method of any of embodiments 2 to 30, wherein the plant cutting or plant liner comprises a coffee plant, a tea plant, or a culinary herb (e.g., rosemary, basil, oregano, terragon, mint, sage, thyme, or stevia).

Embodiment 33 is the treated live plant item, kit, or method of any of embodiments 2 to 31, wherein the plant cutting or plant liner is a geranium.

Embodiment 34 is the treated live plant item, kit, or method of embodiment 33, wherein the geranium is a zonal geranium.

Embodiment 35 is the treated live plant item, kit, or method of embodiment 33, wherein the geranium is a peltatum geranium (also referred to as "ivy" geraniums).

Embodiment 36 is the treated live plant item, kit, or method of embodiment 33, wherein the geranium is an interspecific geranium.

Embodiment 37 is the treated live plant item, kit, or method of any of embodiments 2 to 28, wherein the live plant item comprises a sugarcane plant cutting or sugar cane plant liner.

Embodiment 38 is the treated live plant item, kit, or method of any of embodiments 2 to 28, wherein the live plant item comprises a *Cannabis* plant cutting or *Cannabis* plant liner.

Embodiment 39 is the composition, treated live plant item, kit, or method of any preceding embodiment, wherein the shelf-life extender composition comprises a coating composition.

Embodiment 40 is the composition, treated live plant item, kit, or method of any preceding embodiment, wherein the shelf-life extender composition is a liquid coating composition that optionally includes one or more organic solvents (e.g., ethanol).

Embodiment 41 is the composition, treated live plant item, kit, or method of any preceding embodiment, wherein the shelf-life extender composition is an aqueous composition (preferably an aqueous coating composition) that optionally includes one or more organic solvents (e.g., water-miscible organic solvents such as ethanol).

Embodiment 42 is the composition, treated live plant item, kit, or method of any preceding embodiment, wherein the shelf-life extender composition includes at least 50, at least 60, at least 70, at least 80, at least 90, at least 95, or at least 99 wt-% of water, based on the total weight of the composition.

Embodiment 43 is the composition, treated live plant item, kit, or method of any preceding embodiment, wherein the shelf-life extender composition is substantially free of organic solvent (e.g., includes less than 5 wt-%, less than 2 wt-%, less than 1 wt-%, or less than 0.1 wt-%, if any, organic solvent).

Embodiment 44 is the composition, treated live plant item, kit, or method of any preceding embodiment, wherein the shelf-life extender composition comprises a liquid composition that, prior to application on the plant item, includes at least 0.05, least 0.1, at least 0.15, at least 0.2, or at least 0.25 wt-% of total solids, based on the total weight of the coating composition. In embodiments in which the shelf-life extender composition is a liquid concentrate, the liquid concentrate preferably includes a sufficient amount of total solids to yield a final liquid shelf-life extender composition (after dilution such as, e.g., 2-, 5-, 10-, 20- or 50-fold dilution) having a total solids as disclosed above.

Embodiment 45 is the composition, treated live plant item, kit, or method of any preceding embodiment, wherein the shelf-life extender composition comprises a liquid composition that, prior to application on the plant item, includes less than 5, less than 4, less than 3, less than 2, less than 1, or less than 0.75, or less than 0.50 wt-% of total solids. In embodiments in which the shelf-life extender composition is a liquid concentrate, the liquid concentrate preferably includes a sufficient amount of total solids to yield a final liquid shelf-life extender composition (after dilution such as, e.g., 2-, 5-, 10-, 20- or 50-fold dilution) having a total solids as disclosed above.

Embodiment 46 is the treated live plant item or method of any preceding embodiment, wherein the shelf-life extender composition comprises an at least partially dried, or dried, coating composition.

Embodiment 47 is the composition, treated live plant item, kit, or method of any preceding embodiment, wherein the shelf-life extender composition, when applied as a liquid composition to plant cuttings (e.g., zonal type germanium cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) via complete dipping of the plant cuttings in the liquid composition, and wherein the treated cuttings are allowed to dry (e.g., for 90 minutes), results in reduced mass loss for the treated plant cuttings, on average on a percentage basis, as compared to an otherwise identical untreated control cuttings after storage at ambient temperature (e.g., about 25° C.) in the dark in a sealed plastic bag for: 2 days, 3 days, 5 days, or 7 days after treatment. An example of a suitable plastic bag is a re-sealable "ziplock"-style sandwich bag having dimensions of about 16.5 cm by 15 cm and having a maximum volume of about 725 cubic centimeters. A minimum of three cuttings per bag treated the same are typically evaluated (e.g., three or more control cuttings or three or more treated cuttings with a same treatment).

Embodiment 48 is the composition, treated live plant item, kit, or method of any preceding embodiment, wherein the shelf-life extender composition, when applied as a liquid composition to plant cuttings (e.g., a zonal type germanium cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) via complete dipping of the plant cuttings in the liquid composition, and wherein the treated cuttings are allowed to dry (e.g., for 9) minutes), results in reduced mass loss for the treated plant cuttings, on average on a percentage basis, as compared to otherwise identical untreated control cuttings after storage in a sealed plastic bag in the dark at a temperature of about 1015° C. for: 2 days, 3 days, 5 days, or 7 days after treatment.

Embodiment 49 is the composition, treated live plant item, kit, or method of any preceding embodiment, wherein the shelf-life extender composition, when applied as a liquid composition to plant cuttings (e.g., zonal type germanium cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) via complete dipping of the plant cuttings in the liquid composition and wherein the treated cuttings are allowed to dry (e.g., for 90 minutes), results in no leaf yellowing or reduced leaf yellowing, on average, as compared to otherwise identical untreated control cuttings, after storage at ambient temperature (e.g., 25° C.) in the dark a sealed plastic bag for: 2 days, 3 days, 5 days, or 7 days after treatment.

Embodiment 50 is the composition, treated live plant item, kit, or method of any preceding embodiment, wherein the liquid shelf-life extender composition, when applied as a liquid composition to plant cuttings (e.g., zonal type germanium cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) via complete dipping of the plant cuttings in the liquid composition, and wherein the treated cuttings are allowed to dry (e.g., for 90 minutes), results in no leaf yellowing or reduced leaf yellowing, on average, as compared to otherwise identical untreated control cuttings, after storage in the dark in a sealed plastic bag at a temperature of about 10-15° C. for: 2 days, 3 day s, 5 days, or 7 day s after treatment.

Embodiment 51 is the composition, treated live plant item, kit, or method of any preceding embodiment, wherein geranium apical cuttings (e.g., zonal type germanium apical cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) that have been completely dipped in the shelf-life extender composition and the applied composition allowed to dry (e.g., for 90 minutes), weigh more, on average, than the cuttings prior to treatment after storage in the dark at ambient conditions (e.g., 25° C.) in a sealed plastic bag for: 2 days, 3 days, 5 days, or 7 days after treatment.

Embodiment 52 is the composition, treated live plant item, kit, or method of any preceding embodiment, wherein geranium apical cuttings (e.g., zonal type germanium apical cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) that have been completely dipped in the shelf-life extender composition and the applied composition allowed to dry (e.g., for 90 minutes), weigh more, on average, than the cuttings prior to treatment after storage in the dark at a temperature of about 10-15° C. in a sealed plastic bag for: 2 days, 3 days, 5 days, or 7 days after treatment.

Embodiment 53 is the composition, treated live plant item, kit, or method of any preceding embodiment, wherein geranium apical cuttings (e.g., zonal type germanium apical cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) that have been completely dipped in the liquid shelf-life extender composition, and the applied composition allowed to dry (e.g., for 90 minutes), exhibit no leaf yellowing or reduced leaf yellowing, on average, as compared to otherwise identical untreated controls, after (i) storage in the dark at ambient conditions (e.g., 25° C.) in a sealed plastic bag for 2 days, 3 days, 5 days, or 7 days after treatment and (ii) then sticking in growing medium, wherein assessment for leaf yellowing occurs after sticking (e.g., 10 days after sticking).

Embodiment 54 is the composition, treated live plant item, kit, or method of any preceding embodiment, wherein geranium apical cuttings (e.g., zonal type germanium apical cuttings having a total cutting length of 2 to 4 cm, a sticking stem length of 1 to 1.5 cm, 1 to 4 internodes, 1 to 2 expanded leaves, a maximum petiole length of 2 to 7 cm, a maximum leaf width of 7 cm, and no buds or flowers present) that have been completely dipped in the liquid shelf-life extender composition, and the applied composition allowed to dry (e.g., for 90 minutes), exhibit no leaf yellowing or reduced leaf yellowing, on average, as compared to otherwise identical untreated controls, after (i) storage in the dark at a temperature of about 10-15° C. in a sealed plastic bag for 2 days, 3 days, 5 days, or 7 days after treatment and (ii) then sticking in growing medium, wherein assessment for leaf yellowing occurs after sticking (e.g., 10 days after sticking).

Embodiment 55 is the treated live plant item or method of any of embodiments 2 or 4 to 54, wherein the treated live plant item weighs more than the plant item immediately prior to treatment with the shelf-life extender composition after one or more, two or more, three or more, or all of: storage in the dark at ambient conditions (e.g., 25° C.) in a sealed plastic bag for 2 days, 3 days, 5 days, or 7 days after treatment.

Embodiment 56 is the treated live plant item or method of any of embodiments 2 or 4 to 55, wherein the treated live plant item exhibits no leaf yellowing or reduced leaf yellowing, on average, as compared to otherwise identical untreated controls, after one or more, two or more, three or more, or all of: storage in the dark at a temperature of about 10-15° C. in a sealed plastic bag for 2 days, 3 days, 5 days, or 7 days after treatment.

Embodiment 57 is the treated live plant item or method of any of embodiments 2 or 4 to 56, wherein the treated live plant item exhibits no leaf yellowing or reduced leaf yellowing, on average, as compared to otherwise identical untreated controls, after one or more, two or more, three or more, or all of: storage in the dark at ambient conditions (e.g., 25° C.) in a sealed plastic bag for 2 days, 3 days, 5 days, or 7 days after treatment.

Embodiment 58 is the treated live plant item or method of any of embodiments 2 or 4 to 39, wherein the treated live plant item exhibits a yellowing rating, on average, of three or less (i.e. after one or more, two or more, three or more, or all of: storage in the dark at ambient conditions (e.g., 25° C.) in a sealed plastic bag for 2 days, 3 days, 5 days, or 7 days after treatment.

Embodiment 59 is the composition, treated live plant item, kit, or method of any preceding embodiment, wherein the shelf-life extender composition includes an amount of the organic binder component effective to increase the shelf-life of a plant cutting (e.g., a statistically significant occurrence of one or both of reduced mass loss or reduced post-stick leaf yellowing of an apical cutting of a zonal geranium sensitive to leaf yellowing such as a zonal geranium having light foliage color and white flowers).

Embodiment 60 is the composition, treated live plant item, kit, or method of any preceding embodiment, wherein the liquid shelf-life extender composition includes an amount of at least one of the additive (i.e., component (ii)) that is effective to increase the shelf-life of a plant cutting (e.g., a statistically significant occurrence of one or both of reduced mass loss or post-stick leaf yellowing of an apical cutting of a zonal geranium sensitive to leaf yellowing such as a zonal geranium having light foliage color and white flowers).

Embodiment 61 is the composition, treated live plant item, kit, or method of any preceding embodiment, wherein the shelf-life extender composition does not decrease rooting (e.g., does not decrease one, or preferably both, of rooting occurrence or rooting speed).

Embodiment 62 is the composition, treated live plant item, method, or composition of any of preceding embodiment, wherein the shelf-life extender composition includes one or more of additive (i.e., component (ii)) in a concentration of least 0.01 parts-per-million ("ppm"), at least 0.1 ppm, at least 1 ppm, at least 10 ppm, at least 20 ppm, at least 50 ppm, at least 100 ppm, at least 250 ppm, at least 500 ppm, at least 1,000 ppm, at least 1,500 ppm, at least 2,000 ppm, or at least 2,500 ppm.

Embodiment 63 is the composition, treated live plant item, kit, or method of any preceding embodiment, wherein the shelf-life extender composition includes at least 0.05, at least 0.1, at least 0.15, at least 0.20, at least 0.25, or at least 0.50 wt-% of the organic binder component.

Embodiment 64 is the composition, treated live plant item, kit, or method of any preceding embodiment, wherein the organic binder component comprises a lipid, a polysaccharide, a polypeptide, another oligomer or polymer, or a combination thereof.

Embodiment 65 is the composition, treated live plant item, kit, or method of any preceding embodiment, wherein the organic binder component is dispersible in water.

Embodiment 66 is the composition, treated live plant item, kit, or method of embodiment 65, wherein the first organic opponent is at least partially soluble in water.

Embodiment 67 is the composition, treated live plant item, kit, or method of any preceding embodiment, wherein the organic binder component includes a lipid.

Embodiment 68 is the composition, treated live plant item, kit, or method of embodiment 67, wherein the lipid comprises a phospholipid, optionally in combination with one or more other lipids (e.g., one or more non-phospholipids).

Embodiment 69 is the composition, treated live plant item, kit, or method of embodiment 67 or 68, wherein the lipid comprises a fatty acid, a fatty acid salt, a dimer fatty acid, a fatty-acid-containing glyceride, a monoester of a fatty acid (e.g., a monoester of a fatty acid and a hydroxyl-functional compound other than glycerol), or a combination thereof.

Embodiment 70 is the composition, treated live plant item, kit, or method of any of embodiments 67 to 69, wherein the lipid comprises a fatty-acid-containing monoglyceride.

Embodiment 71 is the composition, treated live plant item, kit, or method of embodiment 70, wherein the fatty-acid-containing monoglyceride comprises 2,3-dihydroxypropyl palmitate, 1,3-dihydroxypropan-2-yl palmitate, a monolaurin (1-monolaurin and/or 2-monolaurin) or a mixture thereof.

Embodiment 72 is the composition, treated live plant item, kit, or method of any of embodiments 69 to 71, wherein the lipid comprises a monoester of a fatty acid and a hydroxyl-functional compound other than glycerol, and wherein the monoester has one or more, preferably two or more, more preferably three or more active hydrogen groups (e.g., hydroxyl groups).

Embodiment 73 is the composition, treated live plant item, kit, or method of any of embodiments 69 to 72, wherein the monoester comprises an active hydrogen group capable of forming a salt, preferably located on the structural unit derived from the hydroxy-functional compound.

Embodiment 74 is the composition, treated live plant item, kit, or method of any of embodiments 69 to 73, wherein the hydroxyl-functional compound is one or both of: (i) more polar than glycerol and (ii) more soluble in water than glycerol.

Embodiment 75 is the composition, treated live plant item, kit, or method of any of embodiments 69 to 74, wherein the hydroxyl-functional compound is unsaturated (i.e., includes a carbon-carbon double bond that is not aromatic).

Embodiment 76 is the composition, treated live plant item, kit, or method of any of embodiments 69 to 75, wherein the hydroxyl-functional compound has three or more active hydrogen group, preferably four or more active hydrogen groups (e.g., four or more hydroxyl groups).

Embodiment 77 is the composition, treated live plant item, kit, or method of any of embodiments 69 to 76, wherein the hydroxyl-functional compound comprises ascorbic acid.

Embodiment 78 is the composition, treated live plant item, kit, or method of any of embodiments 69 to 77, wherein the monoester is derived from a C14 or higher fatty acid.

Embodiment 79 is the composition, treated live plant item, kit, or method of any of embodiments 69 to 78, wherein the monoester is derived from a C20 or lower fatty acid, preferably C18 or lower, more preferably C16 or C18.

Embodiment 80 is the composition, treated live plant item, kit, or method of any of embodiments 69 to 79, wherein the monoester comprises a salt (e.g., an ammonium monoester salt).

Embodiment 81 is the composition, treated live plant item, kit, or method of any of embodiments 69 to 80, wherein the monoester comprises ascorbyl laurate, ascorbyl myristate, ascorbyl palmitate, ascorbyl stearate, a salt thereof (e.g., an ammonium salt of ascorbyl palmitate and/or an ammonium salt of ascorbyl stearate), or a combination thereof.

Embodiment 82 is the composition, treated live plant item, kit, or method of any of embodiments 69 to 81, wherein more than 50 wt-%, more then 60 wt-%, more than 70 wt-%, more than 80 wt-%, more than 90 wt-%, more than 95 wt-%, more than 99 wt-%, or up to about 100 wt-% of the lipid present in the coating composition is the monoester of a fatty acid and a hydroxyl-functional compound other than glycerol.

Embodiment 83 is the composition, treated live plant item, kit, or method of any of embodiments 67 to 82, wherein the organic binder component includes a lipid blend.

Embodiment 84 is the composition, treated live plant item, kit, or method of any of embodiments 67 to 83, wherein the lipid comprises a fatty-acid-containing diglyceride.

Embodiment 85 is the composition, treated live plant item, kit, or method of embodiment 84, wherein the lipid blend includes a fatty acid salt and one or more of a fatty-acid-containing monoglyceride and/or other fatty acid-containing monoester, fatty-acid-containing diglyceride, or combination thereof.

Embodiment 86 is the composition, treated live plant item, kit, or method of any preceding embodiment, wherein the coating composition, based on total solids, includes at most 10 wt-%, at most 5 wt-%, at most 2 wt-%, at most 1 wt-%, or at most 0.1 wt-%, if any, wax.

Embodiment 87 is the composition, treated live plant item, kit, or method of any preceding embodiment, wherein the coating composition, based on total solids, includes at most 10 wt-%, at most 5 wt-%, at most 2 wt-%, at most 1 wt-%, or at most 0.1 wt-%, if any, of compounds having an alkyl chain of 26 or more.

Embodiment 88 is the composition, treated live plant item, kit, or method of any preceding embodiment, wherein the coating composition, based on total solids, includes at most 10 wt-%, at most 5 wt-%, at most 2 wt-%, at most 1 wt-%, or at most 0.1 wt-%, if any, monoester compounds not having an active hydrogen group (e.g., monoesters of a fatty acid and fatty alcohol).

Embodiment 89 is the composition, treated live plant item, kit, or method of any of embodiments 67 to 88, wherein the lipid comprises one or more fatty acids (e.g., lauric acid), typically one or more at least partially-base-neutralized or fully-base-neutralized fatty acid.

Embodiment 90 is the composition, treated live plant item, kit, or method of any preceding embodiment, wherein the organic binder component comprises a polypeptide.

Embodiment 91 is the composition, treated live plant item, kit, or method of embodiment 90, wherein the polypeptide comprises a silk fibroin.

Embodiment 92 is the composition, treated live plant item, kit, or method of any preceding embodiment, wherein the organic binder component includes a synthetic dimer (e.g., a dimer fatty acid), synthetic oligomer, synthetic polymer, or a combination thereof.

Embodiment 93 is the treated live plant item, method, or composition of embodiment 92, wherein the organic binder component comprises a synthetic polymer selected from a polyester, an alkyd, an addition polymer (e.g., a free-radical polymerized addition polymer such as a vinyl polymer, an emulsion polymerized latex polymer, an organic-solution polymerized acrylic, a poly(acrylic acid), or the like), or a copolymer and/or mixture thereof.

Embodiment 94 is the composition, treated live plant item, kit, or method of any of embodiments 1 to 92, wherein the organic binder component comprises a bio-sourced material.

Embodiment 95 is the composition, treated live plant item, kit, or method of any preceding embodiment, wherein the shelf-life extender composition is not made using any polyolefin polymers (e.g., polyethylene, polypropylene, copolymers thereof, and the like).

Embodiment 96 is the composition, treated live plant item, kit, or method of any preceding embodiment, wherein the organic binder component, and preferably the shelf-life extender composition, is not made using any ingredients from feedstocks derived from petroleum (e.g., paraffin is an example of a material that is often derived from petroleum).

Embodiment 97 is the composition, treated live plant item, kit, or method of any preceding embodiments, wherein the organic binder component, and preferably the shelf-life extender composition, is not made using any halogenated ingredients (e.g., chlorinated or fluorinated materials).

Embodiment 98 is the composition, treated live plant item, kit, or method of any preceding embodiment, wherein the organic binder component includes fiber, preferably an at least partially water-soluble fiber.

Embodiment 99 is the composition, treated live plant item, kit, or method of embodiment 98, wherein the fiber is derived from psyllium.

Embodiment 100 is the composition, treated live plant item, kit, or method of any preceding embodiment, wherein the shelf-life extender composition includes an ingredient derived from psyllium (e.g., a psyllium polysaccharide component).

Embodiment 101 is the composition, treated live plant item, kit, or method of any preceding embodiment, wherein the organic binder component includes a polysaccharide including xylose structural units, arabinose structural units, or combinations thereof.

Embodiment 102 is the composition, treated live plant item, kit, or method of any preceding embodiment, wherein the shelf-life extender composition includes one or more of: coconut milk, coconut water, dehydrated coconut milk, dehydrated coconut water, a coconut milk extract (e.g., with one or more compounds removed or reduced other than water), a coconut water extract (e.g., with one more compounds removed or reduced other than water), or a combination thereof.

Embodiment 103 is the composition, treated live plant item, kit, or method of any preceding embodiment, wherein the shelf-life extender composition includes the nitrogen-containing compound, and optionally two or more such compounds. In some embodiments, an in situ nitrogen-forming compound such as, for example, a beneficial (e.g., symbiotic) nitrogen-fixating microbial agent such as a rhizobacteria is included as an alternative to, or in addition to, the nitrogen-containing compound. In some embodiments, the nitrogen-containing compound reduces the need for fertilizer (e.g., by at least 5%, at least 10%, at least 25%, or at least 50%) application post-sticking to grow a plant cutting into a plant liner.

Embodiment 104 is the composition, treated live plant item, kit, or method of embodiment 103, wherein the nitrogen-containing compound is a nitrogen-donating compound for live plant items.

Embodiment 105 is the composition, treated live plant item, kit, or method of embodiment 103 to 104, wherein the nitrogen-containing compound includes one or more carbon atoms.

Embodiment 106 is the composition, treated live plant item, kit, or method of any of embodiments 103 to 105, wherein the nitrogen-containing compounds does not include any carbon atoms.

Embodiment 107 is the composition, treated live plant item, kit, or method of and of embodiments 103 to 106, wherein the nitrogen-containing compound has a molar mass of about 200 or less, 150 or less, 100 or less, about 75 or less, about 60 or less, about 50 or less, or about 42 or less grams/mol.

Embodiment 108 is the composition, treated live plant item, kit, or method of any of embodiments 103 to 107, wherein the one or more nitrogen-containing compounds comprise a nitrile-group-containing compound.

Embodiment 109 is the composition, treated live plant item, kit, or method of embodiment 108, wherein the nitrile-group-continuing compound comprises cyanamide.

Embodiment 110 is the composition, treated live plant item, kit, or method of any of embodiments 103 to 109, wherein the nitrogen-containing compound is preferably present in an efficacious amount and comprises one or more of urea and/or a urea-forming compound, ammonia and/or ammonium, an ammonia-forming and/or an ammonium-forming compound, nitrate and/or a nitrate-forming compound (e.g., a nitrate salt such as ammonium nitrate, sodium nitrate, calcium nitrate, potassium nitrate, and/or magnesium nitrate), a nitrite and/or a nitrite-forming compound (e.g., a nitrite salt such as ammonium nitrite, sodium nitrite, calcium nitrite, potassium nitrite, and/or magnesium nitrite), a nitric-oxide forming compound, a nitroxyl-forming compound, or a combination thereof.

Embodiment 111 is the composition, treated live plant item, kit, or method of embodiments 103 to 110, wherein the nitrogen-containing compound comprises one or more amino acid.

Embodiment 112 is the composition, treated live plant item, kit, or method of embodiment 111, wherein the one or more amino acid comprises one or more of glycine or cysteine.

Embodiment 113 is the composition, treated live plant item, kit, or method of any preceding embodiment, wherein the shelf-life extender composition includes the antimicrobial agent, preferably in an efficacious amount for antimicrobial activity (e.g., to kill or inhibit the growth of one or more problematic bacteria and/or fungus). In some embodiments, the shelf-life extender composition includes one or more antimicrobial agents in an amount of least 0.01 part-per-million ("ppm"), at least 0.1 ppm, at least 1 ppm, at least 10 ppm, at least 20 ppm, at least 50 ppm, at least 100 ppm, at least 250 ppm, at least 500 ppm, at least 1,000 ppm, at least 1,500 ppm, at least 2,000 ppm, or at least 2,500 ppm.

Embodiment 114 is the composition, treated live plant item, kit, or method of embodiment 113, wherein the antimicrobial agent comprises honey; a honey or honeycomb extract; processed (e.g., crushed, ground, and/or pulverized) honeycomb; or a mixture thereof.

Embodiment 115 is the composition, treated live plant item, kit, or method of embodiment 113 or 114, wherein the antimicrobial agent comprises a peroxide-generating component.

Embodiment 116 is the composition, treated live plant item, kit, or method of embodiment 115, wherein the peroxide-generating component comprises glucose and an enzyme, preferably glucose oxidase enzyme.

Embodiment 117 is the composition, treated live plant item, kit, or method of any of embodiments 113 to 116, wherein the antimicrobial agent comprises a fungicide.

Embodiment 118 is the composition, treated live plant item, kit, or method of embodiment 117, wherein the fungicide shows antimicrobial activity against one or more members of the *Botrytis* genus of funguses, and preferably against *Botrytis cinerea*, at a concentration of less than 10,000 ppm, preferably less than 5,000 ppm, even more preferably less than 1,000 ppm, and in some embodiments, at less than 100 ppm, 50 ppm, 20 ppm, or 1 ppm.

Embodiment 119 is the composition, treated live plant item, kit, or method of any of embodiments 113 to 118, wherein the antimicrobial agent comprises an acid (e.g., an organic acid) or a salt thereof (e.g., a salt of an organic acid).

Embodiment 120, is the composition, treated live plant item, kit, or method of any of embodiments 113 to 119, wherein the antimicrobial agent comprises citric acid, lactic acid, malic acid, ascorbic acid, erythorbic acid, sorbic acid, thiodipropionic acid, ascorbyl palmitate, bismuth, lauric acid, potassium bicarbonate, a salt thereof, or a combination thereof.

Embodiment 121 is the composition, treated live plant item, kit, or method of any of embodiments 113 to 120, wherein the antimicrobial agent comprises an inorganic compound, an organometallic compound, or a combination thereof.

Embodiment 122 is the composition, treated live plant item, kit, or method of embodiment 121, wherein the antimicrobial agent comprises zinc (e.g., a zinc oxide).

Embodiment 123 is the composition, treated live plant item, kit, or method of embodiments 121 or 122, wherein the antimicrobial agent comprises silver (e.g., silver nitrate, silver acetate, silver thiosulfate, and the like), iron (e.g., potassium ferrocyanide, potassium ferricyanide, and the like), or a combination thereof.

Embodiment 124 is the composition, treated live plant item, kit, or method of any of embodiments 113 to 123, wherein the antimicrobial agent comprises sodium dodecyl-benzenesulfonate, ethanol, decyl glycoside, caprylyl/myristyl glycoside, calcium ascorbate, glycerin, potassium sorbate, or a combination thereof.

Embodiment 125 is the composition, treated live plant item, kit, or method of any preceding claim, wherein the composition, when applied to a zonal geranium plant cutting (e.g., using any of the methods disclosed herein) reduces or eliminates the occurrence of fungal infections by one or more of the *Botrytis* genus (e.g., *Botrytis cinerea*).

Embodiment 126 is the composition, treated live plant item, kit, or method of any preceding embodiment, wherein the shelf-life extender composition includes the ethylene inhibitor.

Embodiment 127 is the composition, treated live plant item, kit, or method of embodiment 126, wherein the ethylene inhibitor comprises a terpene (e.g., 3-carene, camphene, caryophyllene, humulene, isoprene, limonene, myrcene, pinene (e.g. alpha pinene and beta pinene), terpinene (e.g., alpha-terpinene), terpinolene, valencene, or a mixture thereof), a derivative thereof (e.g. a terpenoid such as alpha-bisabolol, trans-cinnamaldehyde, carveol, carvone, caryophyllene, cinnamyl alcohol, eucalyptol, estragole, eugenole, geraniol, cis-2-hexene-1-ol, trans-2-hexene-1-ol, linalool, nerolidol (e.g. cis and trans nerolidol, perillaldehyde), or a mixture thereof.

Embodiment 128 is the composition, treated live plant item, kit, or method of embodiments 126 or 127, wherein the ethylene inhibitor is present and comprises a mono-terpene, a cyclic terpene, or a combination thereof.

Embodiment 129 is the composition, treated live plant item, kit, or method of any of embodiments 126 to 128, wherein the ethylene inhibitor comprises a substituted cyclopropane compound (which may optionally be encapsulated), a complex thereof (e.g., a complex with a cyclodextrin), or a mixture thereof.

Embodiment 130 is the treated live plant item, method, or composition of embodiment 129, wherein the substituted cyclopropane compound comprises 1-methylcyclopropene (which may optionally be encapsulated), a complex thereof (e.g., a complex with a cyclodextrin), or a mixture thereof.

Embodiment 131 is the composition, treated live plant item, kit, or method of any of embodiments 126 to 130, wherein the composition includes at least 0.1 ppm, at least 1 ppm, at least 10 ppm, at least 20 ppm, at least 50 ppm, at least 100 ppm, at least 500 ppm, at least 1,000 ppm, at least 2,000 ppm, at least 3,000 ppm, at least 5,000 ppm, or at least 10,000 ppm of ethylene inhibitor.

Embodiment 132 is the composition, treated live plant item, kit, or method of any of embodiments 126 to 131, wherein the ethylene inhibitor is present in an efficacious amount sufficient to delay leaf yellowing (e.g., as compared relative to an analogous treated plant item with an otherwise identical composition lacking the ethylene inhibitor).

Embodiment 133 is the composition, treated live plant item, kit, or method of any preceding embodiment, wherein the shelf-life extender composition includes the plant energy source, which is preferably a carbohydrate of a form suitable for plant cells to convert into energy.

Embodiment 134 is the composition, treated live plant item, kit, or method of embodiment 133, wherein the plant energy source comprises glucose, trehalose, sucrose, fructose, mannitol, honey and/or honey extract, or a mixture thereof.

Embodiment 135 is the composition, treated live plant item, kit, or method of any preceding embodiment, wherein the shelf-life extender composition includes the plant growth regulator.

Embodiment 136 is the composition, treated live plant item, kit, or method of embodiment 136, wherein the plant growth regulator comprises benzyladenine, a gibberellin (e.g., gibberellin acid such as gibberellin acid A4 and/or A7), a cytokinin (e.g., kinetin), abscisic acid, a salt or derivative thereof, or a combination thereof.

Embodiment 137 is the composition, treated live plant item, kit, or method of any preceding embodiment, wherein the shelf-life extender composition does not include an auxin or an auxin derivative.

Embodiment 138 is the composition, treated live plant item, kit, or method of any preceding embodiment, wherein the shelf-life extender composition does not include a rooting hormone.

Embodiment 139 is the treated live plant item, method, or composition of any preceding embodiment, wherein the shelf-life extender composition includes one or more optional additives selected from an emulsifier, a colorant, a pigment, a gloss additive, a rheology modifier, a filler, an anti-foaming agent, a crosslinker, or a rooting compound.

Embodiment 140 is the composition, treated live plant item, kit, or method of embodiment 139, wherein the shelf-life extender composition includes a crosslinker.

Embodiment 141 is the composition, treated live plant item, kit, or method of preceding embodiment, wherein the shelf-life extender composition is a dry concentrate (e.g., powder or tablet(s)) suitable for combining with a solvent to form a liquid coating composition.

Embodiment 142 is the composition, treated live plant item, kit, or method of embodiment 141, wherein the dry concentrate is dispersible in water to form an aqueous coating composition, preferably an aqueous emulsion or dispersion, which is preferably storage stable for at least about 1, 2, 3, 4, 5, 6, 7, 10, or 14 days under ambient conditions.

Embodiment 143 is the composition, treated live plant item, kit, or method of any embodiments wherein the shelf-life extender composition is a liquid concentrate (e.g., powder or tablet(s)) suitable for combining with a solvent (preferably water) to form a liquid coating composition (e.g., an aqueous emulsion or dispersion), which is preferably storage stable for at least about 1, 2, 3, 4, 5, 6, 7, 10, or 14 days under ambient conditions.

Embodiment 144 is the composition, treated live plant item, kit, or method of any preceding embodiment, wherein the shelf-life extender composition present on the treated live plant item (e.g., as a coating formed from the coating composition) is crosslinked.

Embodiment 145 is the composition, treated live plant item, kit, or method of any preceding embodiment, wherein the shelf-life extender composition includes an organic binder component having carboxyl groups and/or base-neutralized carboxyl groups (e.g., a carboxyl-functional polysaccharide, a fatty acid, a dimer fatty acid, and/or a base-neutralized salt thereof) and a zinc compound (e.g., zinc ammonium carbonate).

Embodiment 146 is the method of any of embodiments 4 to 145, wherein at least a portion of the plant cutting is dipped into the shelf-life extender composition.

Embodiment 147 is the method of any of embodiments 4 to 146, wherein at least a portion of the plant cutting is sprayed (e.g., sprayed, misted, or fogged), or otherwise coated, with the shelf-life extender composition prior to after harvest of the plant cutting. In some such embodiments, the plant is applied to the progenitor plant, prior to removing a portion to form the plant cutting, via a misting system such, as for example, an overhead misting system of a greenhouse or an agricultural field.

Embodiment 148 is the treated live plant item, kit, or method of any of embodiments 2 to 147, wherein the shelf-life extender composition is applied on the live plant item when the live plant item is present in an atmospheric pressure environment.

Embodiment 149 is the treated live plant item, method, or kit of any embodiments 2 to 148, wherein the live plant item is not subjected to an electric field (e.g., a pulsed electron field such as a pulsed electron field of sufficient strength to form pores in the outer surface of a plant cutting) immediately prior to, during, and/or after application of the shelf-life extender composition.

Embodiment 150 is the treated live plant item, method, or kit of any embodiments 2 to 149, wherein the shelf-life extender composition is surface deposited on the live plant item, and wherein preferably 50% or more, 60% or more, 70% or more, 80% or more, 90% or more, 95% or more, 96% or more, 97% or more, 98% or more, 99% or more, or 99.9% by weight or more of the total solids weight of the shelf-life extender composition is present on a surface of the treated live plant item (as opposed, e.g., to shelf-life extender composition within the interior cells of the live plant item).

Embodiment 151 is the method of any of embodiments 4 to 150, further comprises packaging the live plant items for shipping.

Embodiment 152 is the method of embodiment 151, wherein the shelf-life extender composition is at least partially hardened prior to, or after, the treated live plant items are packaged for shipping.

Embodiment 153 is the method of embodiment 151 or 152, wherein packaging the live plant items for shipping comprises placing a plurality of the live plant items in a container.

Embodiment 154 is the method of embodiment 153, wherein the container comprises a bag (e.g., a plastic bag).

Embodiment 155 is the method of embodiment 154, wherein the bag allows for air exchange with the environment outside the bag (e.g., the bag includes a plurality of apertures or other features to allow for air exchange).

Embodiment 156 is the method of any of embodiments 151 to 155, wherein the live plant items are packaged in a box (e.g., a cardboard box), more typically inside one or more bags located inside the box.

Embodiment 157 is the method of embodiments 151 to 156, wherein the container or box includes a cooling source (e.g., one or more cooling packs such as, e.g., ice packs or gel packs).

Embodiment 158 is the method of embodiment 156 or 157, wherein the box includes a plurality of containers (e.g., perforated plastic bags or other plastic bags allowing for air exchange) that each include at least about 25, at least about 50, at least about 75, at least about 90, or at least about 100 coated plant cuttings.

Embodiment 159 is the method of embodiment 158, wherein each of the plurality of containers includes no more than about 200, no more than about 150, no more than about 125, no more than about 110, or no more than about 100 coated planted cuttings.

Embodiment 160 is the method of any of embodiments 151 to 159, wherein the plant cuttings are oriented vertically for shipping, and preferably are densely packed (e.g., side-by-side densely packed).

Embodiment 161 is the method of any of embodiments 4 to 160, wherein the live plant items are positioned in a plant holder (e.g., any of the plant cutting strip holders disclosed in WO00/52996 (Van Tol et al.)) prior to or after application of the shelf-life extender composition.

Embodiment 162 is the shipping container containing treated lived plant items resulting from the method of any of embodiments 4 to 161.

Embodiment 163 is the method of any of embodiments 4 to 162, wherein causing the shelf-life extender composition to be applied to the live plant items comprises marketing the composition for such end use.

Embodiment 164 is the method of embodiment 163, wherein the shelf-life extender composition is marketed as a treatment for extending the shelf-life of plant cuttings (e.g., geranium, poinsettia, *Cannabis*, herbs or sugar cane cuttings) or plant liners.

Embodiment 165 is the method of embodiment 164, wherein the shelf-life extender composition is marketed for extending the shelf-life of geranium plant cuttings or plant liners.

Embodiment 166 is the method of any of embodiments 163 to 165, wherein causing the shelf-life extender composition to be applied to the live plant items comprises providing instructions for such end use.

Embodiment 167 is the treated live plant item, method, or shipping containers of any of embodiments 2 or 4 to 166, wherein the plant items include one or more leaves, and wherein the one or more leaves are at least partially treated (e.g., coated) with the shelf-life extender composition.

Embodiment 168 is the treated live plant item, method, or shipping container of any of embodiments 2 or 4 to 167, wherein the plant items comprise plant cuttings, and wherein cut ends of the plant cuttings have been treated with the shelf-life extender composition.

Embodiment 169 is the treated live plant item, method, or shipping container of any of embodiments 2 or 4 to 168, the portion of the plant item distal from the basal end (e.g., an apical portion distal from the cut end or roots) has been treated with the shelf-life extender composition.

Embodiment 170 is the treated live plant item, method, or shipping container of any of embodiments 2 or 4 to 169, wherein the shelf-life extender composition has been applied to more than 10%, more than 20%, more than 30%, more than 40%, more than 50%, and more preferably, more than 60%, more than 70%, more than 80%, more than 90%, or all of the maximum total length of the plant cutting or plant liner (i.e., for the above-ground portion of the plant liner).

Embodiment 171 is the method or kit of any preceding method or kit embodiment, wherein the kit or shipping container includes an ethylene inhibitor component that is separate from the shelf-life extender composition.

Embodiment 172 is the method or kit of embodiment 171, wherein the ethylene inhibitor component comprises a pouch, a sachet, a capsule, a pad, or a combination thereof.

Embodiment 173 is the method of any preceding method embodiment, further comprising including an ethylene inhibitor that is separate from the shelf-life extender composition in the packaging for shipping and/or storing the live plant items.

Embodiment 174 is the method of any preceding method embodiment, further comprising causing an ethylene inhibitor that is separate from the shelf-life extender composition to be included in the packaging for shipping and/or storing the live plant items.

Embodiment 175 is the method of embodiment 174, wherein the ethylene inhibitor component comprises a pouch, a sachet, a capsule, a pad, or a combination thereof (e.g., containing any of the ethylene inhibitors described herein such as, e.g., 1-methyl cyclopropane and/or a complex thereof).

Embodiment 176 is the composition, coated live plant item, method or kit of any preceding embodiment, wherein the shelf-life extender composition includes a compound that inhibits oxidative stress of a live plant cutting.

Embodiment 177 is the composition, coated live plant item, method or kit of embodiment 176, wherein the compound comprises a polyphenol compound.

Embodiment 178 is the composition, coated live plant item, method or kit of embodiment 176 or 177, wherein the compound comprises a compound that is processed in situ in a live plant item to produce nitrogen oxide.

Embodiment 179 composition, coated plant item, or method of any preceding embodiment wherein the live plant item is sanitized prior to or after application of the shelf-life extender composition (e.g., (e.g., via application of ultraviolet light, electron beam, high-voltage cold plasma, and the like).

Embodiment 180 is the composition, coated live plant item, method or kit of any preceding embodiment, wherein the treatment includes one or more organic compounds, and wherein each and every one of the one or more organic compounds comprise at least about 1.5 dpm/gC (disintegrations per minute per gram carbon) of carbon-14, more preferably at least 2 dpm/gC, most preferably at least 2.5 dpm/gC, and especially at least 4 dpm/gC. Carbon-14 levels can be determined by measuring its decay process (disintegrations per minute per gram carbon or dpm/gC) through liquid scintillation counting.

Embodiment 181 is the composition, coated live plant item, method, or kit of any preceding embodiment, wherein instead of a plant cutting, the plant item is a cut flower.

Accordingly for purposes of this embodiment, in any preceding embodiment (except, e.g., those reciting a step of planting a plant cutting for purposes of rooting), the term "plant cutting" is replaced with "cut flower" in alternative such embodiments.

Embodiment 182 is the composition, coated live plant item, method, or kit of any preceding embodiment, wherein instead of a plant cutting for vegetative propagation, the live plant item is an edible food for sale and consumption by humans (e.g., cut herbs; lettuce; leafy greens; pre-washed and ready-to-eat lettuce or leafy greens; and the like). Accordingly for purposes of this embodiment, in any preceding embodiment (except, e.g., those reciting a step of planting a plant cutting for purposes of rooting), the term "plant cutting" is replaced with "live edible plant item" in alternative such embodiments.

Representative Test Methods and Procedures

IODINE VALUE: Prepare Starch Solution by dissolving 5 grams of soluble starch with 100 milliliters (ml) of deionized (D.I.) water. Add 400 ml of boiling D.I. water, stir until clear, and allow to cool. This solution will not keep for more than a few days and should be made fresh as needed. Prepare Potassium Iodide Solution by dissolving 150 grams of Potassium Iodide in 1,000 ml of D.I. water. A small portion of the sample under test shall be weighed by difference into an Erlenmeyer iodine flask, the amount of sample taken being such that from 10 to 30% of an iodine solution (Wijs Iodine Monochloride Solution—Fisher Scientific Co. Cat. No. SI106-4) will be absorbed. Pipette 20 ml of chloroform into each sample flask. Stopper the flasks, add a Teflon stirring bar and stir until the samples dissolve. Prepare two flasks for blanks by pipetting 20 ml of chloroform into separate flasks. Pipette into each flask (2 flasks for each sample and 2 flasks for blanks) 25 ml of the iodine solution. Stopper the flasks, stir for 30 seconds, then let stand with occasional swirling for 30 minutes in a dark place at room temperature. At the end of the standing time, pipette 20 ml. of Potassium Iodide Solution and 80 ml of D.I. water, stopper and stir. Add 2 ml of the Starch Solution and immediately titrate with 0.1N sodium thiosulfate (Fisher Scientific Cat. No. SS368-1). Calculate the iodine value as the difference in the average volume (in milliliters) of 0.1N sodium thiosulfate required for the blank less the average volume (in milliliters) required for the sample, multiplied by 1.269 and divided by the sample weight in grams. The iodine value is calculated using the following equation: [(Average volume blank−Average volume sample)×1.269]/[Sample Weight in grams]. The iodine value is reported as the centigrams of iodine absorbed per 1 gram of the material.

LEAF YELLOWING: The leaf yellowing rating scale described in FIG. 3 of the journal article "Prolonged Shipping and Fluctuating Temperature Promote Gray Mold Development and Leaf Yellowing on Geranium Liners" by Jahnke et. al., *HortTechnology*. December 2018 28(6), pages 711-718 is a useful test for quantitating the extent of leaf yellowing in plant cuttings and plant liners. The ratings are as follows on a 0 to 6 scale:

Rating 0=0% yellowing (no symptoms)
Rating 1=10% yellowing (or marginal yellowing)
Rating 2=11% to 25% yellow
Rating 3=26% to 50% yellow
Rating 4=51% to 75% yellow
Rating 5=75% to 100% yellow
Rating 6=Dead or abscised

EXAMPLES

These Examples are merely for illustrative purposes and are not meant to be overly limiting on the scope of the appended embodiments. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the embodiments, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example. Sigma-Aldrich Company. Saint Louis, Mo., or may be synthesized by conventional methods.

Geranium Cutting Test Procedure

The following cutting test procedure was used for all Examples (i.e., worked Examples 1 and 2).

Geraniums were cut from mother plants using small pruning scissors, which were sanitized using a 10% bleach solution between plants. Cuttings were sorted and weighed before coating to achieve more uniform samples set across treatment experiments. The geranium cuttings were held by the stem with tweezers and dipped into the liquid coating composition being evaluated. Excess coating composition was then shaken off and the treated cuttings were left to dry on paper towels for 2 hours before being placed in a quart size Ziplock-style plastic bag, sealed, and the bag labeled with the trial number. The treated bagged cuttings were placed in an ice chest with an icepack and stored for 4 days with the lid closed. The ice pack was allowed to warm up over time and is not replaced.

After storage for the 4 days, the cuttings were planted in planting media (i.e., the Seed Starting Potting Mix product from Miracle-Gro, which according to the product packaging is "excellent for starting cuttings"). The planting media was fully hydrated before use. The cuttings were taken out of the cooler and planted (i.e., "stuck") in stages to prevent unnecessary water loss. The stuck cuttings were placed in a greenhouse, misted with water on day 1, bottom watered days 2 and 3, and watered overhead on subsequent days.

Select Materials

In the examples that follow: (i) the monolaurin used was procured from Colonial Chemical of South Pittsburgh, Tennessee under the product name Colonial Monolaurin and (ii) the psyllium used was 95% purity psyllium husk powder procured from AEP Colloids of Hadley, New York.

Example 1: Zonal Geranium Cuttings Coated with Lipid Solution

Zonal Tango™ Dark Red geranium cuttings (geranium brand of Syngenta Flowers) taken from a source plant procured from The Home Depot were coated with a solution of water and 0.5 wt-% monolaurin (Example 1, Run 1 and Run 2) and stored as outlined in the cutting test procedure described above. After four days, cuttings were removed and planted and maintained as described in the cutting test procedure. Bottom leaves were rated as described using the Leaf Yellowing procedure described above (0-6 scale) with the data reported in Tables 1 and 2. No initial necrosis (i.e., Day 0) was observed. However, as shown in Tables 1 and 2, a comparison of the control cuttings with the cuttings treated with monolaurin demonstrated that a lipid can extend plant cutting viability for multiple different zonal geranium varieties.

TABLE 1

Monolaurin coating on Tango ™ Deep Red geranium cuttings

| Days After Planting | Example 1, Run 1 (Leaf Yellowing Rating) | Untreated Control (Leaf Yellowing Rating) |
|---|---|---|
| 0 | 0 | 1 |
| 2 | 0 | 2 |
| 4 | 1 | 3 |
| 7 | 1 | 4 |

TABLE 2

Repeat experiment of monolaurin coating on Tango ™ Deep Red geranium cuttings

| Days After Planting | Example 1, Run 2 (Leaf Yellowing Rating) | Untreated Control (Leaf Yellowing Rating) |
|---|---|---|
| 0 | 0 | 1 |
| 1 | 0 | 2 |
| 5 | 1 | 5 |

Example 2: Zonal Geranium Cuttings Coated with Hybrid Lipid/Polysaccharide Solution Zonal Tango™ Dark Red geranium cuttings (geranium brand of Syngenta Flowers), as well as lighter flowering zonal geraniums as indicated in Table 3 that are more susceptible to respiration distress, were taken from source plants procured from The Home Depot. The cuttings were coated with a solution of water, 0.25 wt-% monolaurin, 0.1 wt-% psyllium, and 0.05 wt-% urea (Example 2) and stored as outlined in the cutting procedure described above. After four days, cuttings were removed from the cooler and planted in growth media. Bottom leaves were rated as described using the Leaf Yellowing procedure described above (0-6 scale). No initial necrosis was observed at day 0. A comparison of treated and untreated control cuttings shows that a hybrid treatment of monolaurin, psyllium, and urea, balancing barrier properties and active chemistries, can extend plant cutting viability of multiple zonal geranium types.

TABLE 3

Geranium cuttings treated with hybrid solution

| Days after planting | Example 2: Cuttings treated with Monolaurin/Psyllium/Urea Composition | | | Untreated Control Cuttings | |
|---|---|---|---|---|---|
| | Dark Red | White | Violet | Dark Red | Hot Pink |
| 0 | 0 | 0 | 0 | 1 | 1 |
| 2 | 0 | 0 | 1 | 2 | 4 |
| 4 | 0 | 1 | 1 | 3 | 6 |
| 7 | 0 | 3 | 1 | 4 | 5 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

The entire contents of the PCT international application filed on even date herewith by DeMaster et. al. and entitled "Barrier Coating Compositions, Wash Compositions, and Other Compositions for Perishables and Methods, Systems, Kits, and Coated Items Relating Thereto" are incorporated herewith.

The invention claimed is:

1. A method comprising:
    applying a shelf-life extender composition on at least portion of the surfaces of a live plant item for vegetative propagation of a new plant such that the composition is surface deposited thereon, wherein the live plant item comprises (a) an unrooted plant cutting prior to or after harvest of the plant cutting from a progenitor plant or (b) a plant liner; and
    packaging the treated live plant item for shipping to a grower;
        wherein the plant item includes a meristem, and wherein the plant item, when an unrooted plant cutting, has a total cutting length, as defined from a cut stem base end to the top of a meristem tip and excluding any leaf lengths, of less than 20 centimeters;
        wherein the shelf-life extender composition comprises a hydroxyl-functional lipid that includes a carbon chain from a fatty acid having a carbon chain length of from 8 to 25, and wherein the hydroxyl-functional lipid comprises a fatty acid monoester; and
        wherein the shelf-life extender composition decreases leaf yellowing of the plant item, extends plant item viability, or both compared to the plant item not being treated with the shelf-life extender composition.

2. The method of claim 1, further comprising causing the packaged treated live plant item to be shipped to a grower to grow the plant cutting or plant liner.

3. The method of claim 1, wherein the live plant item comprises a plant cutting, and wherein the method further comprises removing a portion from the progenitor plant to form the plant cutting, and wherein the composition is applied to the progenitor plant prior to removing a portion to form the plant cutting.

4. The method of claim 1, wherein the plant cutting is sanitized prior to or after application of the shelf-life extender composition.

5. The method of claim 1, wherein the plant item includes a plurality of leaves, does not include any flowers, and includes one to four internodes.

6. The method of claim 1, wherein the plant cutting or plant liner is selected from a zonal geranium or an interspecific geranium.

7. The method of claim 1, wherein the plant cutting or plant liner is selected from a coffee plant, a tea plant, a culinary herb, or a *Cannabis* plant.

8. The method of claim 1, wherein the shelf-life extender composition is a liquid coating composition during treatment, wherein the liquid coating composition includes at least 50 weight percent water, and wherein the live plant item is not subjected to a pressure environment less than that of atmospheric pressure.

9. The method of claim 1, wherein the plant item comprises a plant cutting, and wherein the shelf-life extender composition does not decrease rooting.

10. The method of claim 1, wherein the shelf-life extender composition further comprises an additive selected from one or more of an antimicrobial agent, a plant growth regulator, a plant energy source, an ethylene inhibitor, a nitrogen-containing compound, an inorganic nutrient, a crosslinking agent, or a combination thereof.

11. The method of claim 1, wherein the hydroxyl-functional lipid comprises a fatty acid monoester of a hydroxyl-functional compound other than glycerol, a fatty acid monoester of glycerol, or mixture thereof.

12. The method of claim 1, wherein the shelf-life extender composition includes fibers.

13. The method of claim 10, wherein the additive comprises one or more nitrogen-containing compounds having a molar mass of about 200 or less grams/mol.

14. The method of claim 10, wherein the additive comprises one or more nitrogen-containing compounds, in an efficacious amount, selected from a nitrile-group-containing compound, urea and/or a urea-forming compound, ammonia and/or ammonium, an ammonia-forming and/or an ammonium-forming compound, a nitrate and/or a nitrate-forming compound, a nitrite and/or a nitrite-forming compound, a nitric-oxide forming compound, a nitroxyl-forming compound, or a combination thereof.

15. The method of claim 1, wherein the shelf-life extender composition comprises a liquid composition that, prior to application on the plant item, includes at least 0.05% by weight of total solids, based on the total weight of the composition.

16. The method of claim 1, wherein the shelf-life extender composition has been applied to more than 60% of the plant cutting or plant liner.

17. A shipping container including a plurality of treated unrooted plant cuttings or plant liners resulting from the method of claim 1.

18. A method comprising:
applying a shelf-life extender composition on at least portion of the surfaces of a live plant item for vegetative propagation of a new plant such that the composition is surface deposited thereon, wherein the live plant item includes a meristem and comprises (a) an unrooted plant cutting prior to or after harvest of the plant cutting from a progenitor plant or (b) a plant liner; and
packaging the treated live plant item for shipping to a grower;
wherein the plant item is sanitized prior to or after application of the shelf-life extender composition;
wherein the shelf-life extender composition comprises a hydroxyl-functional lipid that includes a carbon chain from a fatty acid having a carbon chain length of from 8 to 25, and wherein the hydroxyl-functional lipid comprises a fatty acid monoester; and
wherein the shelf-life extender composition decreases leaf yellowing of the plant item, extends plant item viability, or both compared to the plant item not being treated with the shelf-life extender composition.

19. The method of claim 18, further comprising causing the packaged treated live plant item to be shipped to a grower to grow the plant cutting or plant liner.

20. The method of claim 19, wherein the plant cutting or plant liner is selected from a coffee plant, a tea plant, a culinary herb, or a *Cannabis* plant.

21. The method of claim 19, wherein the shelf-life extender composition does not decrease rooting.

22. The method of claim 19, wherein the hydroxyl-functional lipid comprises a fatty acid monoester of a hydroxyl-functional compound other than glycerol, a fatty acid monoester of glycerol, or mixture thereof.

23. A method comprising:
applying a shelf-life extender composition on at least portion of the surfaces of a live plant item for vegetative propagation of a new plant such that the composition is surface deposited thereon, wherein the live plant item includes a meristem and comprises (a) an unrooted plant cutting prior to or after harvest of the plant cutting from a progenitor plant or (b) a plant liner; and
packaging the treated live plant item for shipping to a grower;
wherein the plant cutting or plant liner is selected from a coffee plant, a tea plant, a culinary herb, or a *Cannabis* plant;
wherein the shelf-life extender composition comprises a hydroxyl-functional lipid that includes a carbon chain from a fatty acid having a carbon chain length of from 8 to 25, and wherein the hydroxyl-functional lipid comprises a fatty acid monoester; and
wherein the shelf-life extender composition decreases leaf yellowing of the plant item, extends plant item viability, or both compared to the plant item not being treated with the shelf-life extender composition.

24. The method of claim 23, further comprising causing the packaged treated live plant item to be shipped to a grower to grow the plant cutting or plant liner.

25. The method of claim 24, wherein the plant item comprises a plant cutting, and wherein the shelf-life extender composition does not decrease rooting.

26. The method of claim 24, wherein the hydroxyl-functional lipid comprises a fatty acid monoester of a hydroxyl-functional compound other than glycerol, a fatty acid monoester of glycerol, or mixture thereof.

27. A method comprising:
applying a shelf-life extender composition on at least portion of the surfaces of a live plant item for vegetative propagation of a new plant such that the composition is surface deposited thereon, wherein the live plant item includes a meristem and comprises (a) an unrooted plant cutting prior to or after harvest of the plant cutting from a progenitor plant or (b) a plant liner; and
packaging the treated live plant item for shipping to a grower;
wherein the shelf-life extender composition does not decrease rooting;
wherein the shelf-life extender composition comprises a hydroxyl-functional lipid that includes a carbon chain from a fatty acid having a carbon chain length of from 8 to 25, and wherein the hydroxyl-functional lipid comprises a fatty acid monoester; and
wherein the shelf-life extender composition decreases leaf yellowing of the plant item, extends plant item viability, or both compared to the plant item not being treated with the shelf-life extender composition.

28. The method of claim 27, further comprising causing the packaged treated live plant item to be shipped to a grower to grow the plant cutting or plant liner, wherein the shelf-life extender composition has been applied to more than 60% of the plant cutting or plant liner.

* * * * *